US012680474B2

(12) United States Patent
Miller et al.

(10) Patent No.: US 12,680,474 B2
(45) Date of Patent: Jul. 14, 2026

(54) METHOD OF OPERATING A LUBRICATION SYSTEM FOR A TURBINE ENGINE

(71) Applicant: General Electric Company, Schenectady, NY (US)

(72) Inventors: Brandon W. Miller, Middletown, OH (US); Arthur W. Sibbach, Boxford, MA (US); Andrew Hudecki, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/537,494

(22) Filed: Dec. 12, 2023

(65) Prior Publication Data

US 2025/0035013 A1 Jan. 30, 2025

Related U.S. Application Data

(60) Provisional application No. 63/516,340, filed on Jul. 28, 2023.

(51) Int. Cl.
*F01D 25/20* (2006.01)
*F01M 1/12* (2006.01)
*F01M 11/06* (2006.01)

(52) U.S. Cl.
CPC ....... *F01D 25/20* (2013.01); *F01M 2001/123* (2013.01); *F01M 2011/068* (2013.01); *F05D 2220/323* (2013.01); *F05D 2270/301* (2013.01)

(58) Field of Classification Search
CPC .......................... F01D 25/20; F01M 2001/123
See application file for complete search history.

(56) References Cited

U.S. PATENT DOCUMENTS 3,147,821 A 9/1964 Eggenberger
4,511,016 A 4/1985 Doell
4,629,033 A 12/1986 Moore et al.
(Continued)

FOREIGN PATENT DOCUMENTS

EP 2253805 B1 11/2013
EP 3543476 A1 9/2019
(Continued)

OTHER PUBLICATIONS

Miller, et al., U.S. Appl. No. 18/481,582, filed Oct. 5, 2023.
Manzoni, et al., U.S. Appl. No. 18/510,014, filed Nov. 15, 2023.

*Primary Examiner* — Minh Truong
(74) *Attorney, Agent, or Firm* — Venable LLP; Andrew W. Bradshaw; Michele V. Frank

(57) ABSTRACT

A method of operating a lubrication system for a turbine engine having a fan and one or more rotating components. The lubrication system includes a primary lubrication system and an auxiliary lubrication system. The method includes supplying lubricant to the one or more rotating components from the primary lubrication system during a normal operation of the turbine engine, determining whether at least one of a fuel pressure is less than a fuel pressure threshold or a hydraulic pressure is less than a hydraulic pressure threshold, and activating the auxiliary lubrication system to supply the lubricant to the one or more rotating components from the auxiliary lubrication system when the fuel pressure is less than the fuel pressure threshold or the hydraulic pressure is less than the hydraulic pressure threshold.

20 Claims, 20 Drawing Sheets

(56) References Cited

U.S. PATENT DOCUMENTS

| | | | | |
|---|---|---|---|---|
| 6,886,324 | B1 | 5/2005 | Handshuh et al. | |
| 8,307,626 | B2 * | 11/2012 | Sheridan | F01D 25/20 184/29 |
| 9,347,335 | B2 | 5/2016 | Laigle et al. | |
| 10,458,330 | B2 | 10/2019 | Sheridan | |
| 10,526,931 | B2 | 1/2020 | Goll et al. | |
| 10,711,877 | B2 | 7/2020 | Fisher et al. | |
| 11,085,521 | B2 | 8/2021 | Edwards et al. | |
| 11,203,974 | B2 | 12/2021 | Sheridan | |
| 11,391,363 | B2 * | 7/2022 | Sbabo | F16H 57/0445 |
| 2002/0139345 | A1 * | 10/2002 | Takahara | F01M 1/02 123/196 R |
| 2014/0069744 | A1 | 3/2014 | Scipio et al. | |
| 2016/0376949 | A1 | 12/2016 | Parnin | |
| 2019/0128141 | A1 * | 5/2019 | Pech | F02C 7/277 |
| 2019/0195091 | A1 * | 6/2019 | Uhkoetter | F02C 7/32 |
| 2019/0292944 | A1 * | 9/2019 | Mason | F01M 1/02 |
| 2019/0323597 | A1 | 10/2019 | Sheridan | |
| 2020/0291817 | A1 * | 9/2020 | Leque | F01M 11/064 |

FOREIGN PATENT DOCUMENTS

| | | | |
|---|---|---|---|
| EP | 3708793 | A1 | 9/2020 |
| FR | 3127024 | A1 | 3/2023 |
| FR | 3127025 | A1 | 3/2023 |
| FR | 3129436 | A1 | 5/2023 |
| FR | 3129690 | A1 | 6/2023 |
| FR | 3130747 | A1 | 6/2023 |
| FR | 3130875 | A1 | 6/2023 |
| WO | 2019243710 | A1 | 12/2019 |

* cited by examiner

METHOD OF OPERATING A LUBRICATION SYSTEM FOR A TURBINE ENGINE

CROSS-REFERENCE TO RELATED APPLICATIONS

This application claims priority to U.S. Provisional Application No. 63/516,340, filed Jul. 28, 2023, the entire contents of which is hereby incorporated by reference.

TECHNICAL FIELD

The present disclosure relates generally to a method of operating a lubrication system, for example, for a turbine engine.

BACKGROUND

Turbine engines generally include a fan and a core section arranged in flow communication with one another. Turbine engines include one or more rotating components that rotate. A lubrication system provides a lubricant to the one or more rotating components of the turbine engines.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

FIG. 13A shows the gearbox assembly in a first rotational position.

FIG. 13B shows the gearbox assembly in a second rotational position.

FIG. 13C shows the gearbox assembly in a third rotational position.

FIG. 14 shows the gearbox assembly in the second rotational position.

DETAILED DESCRIPTION

Figure 1:
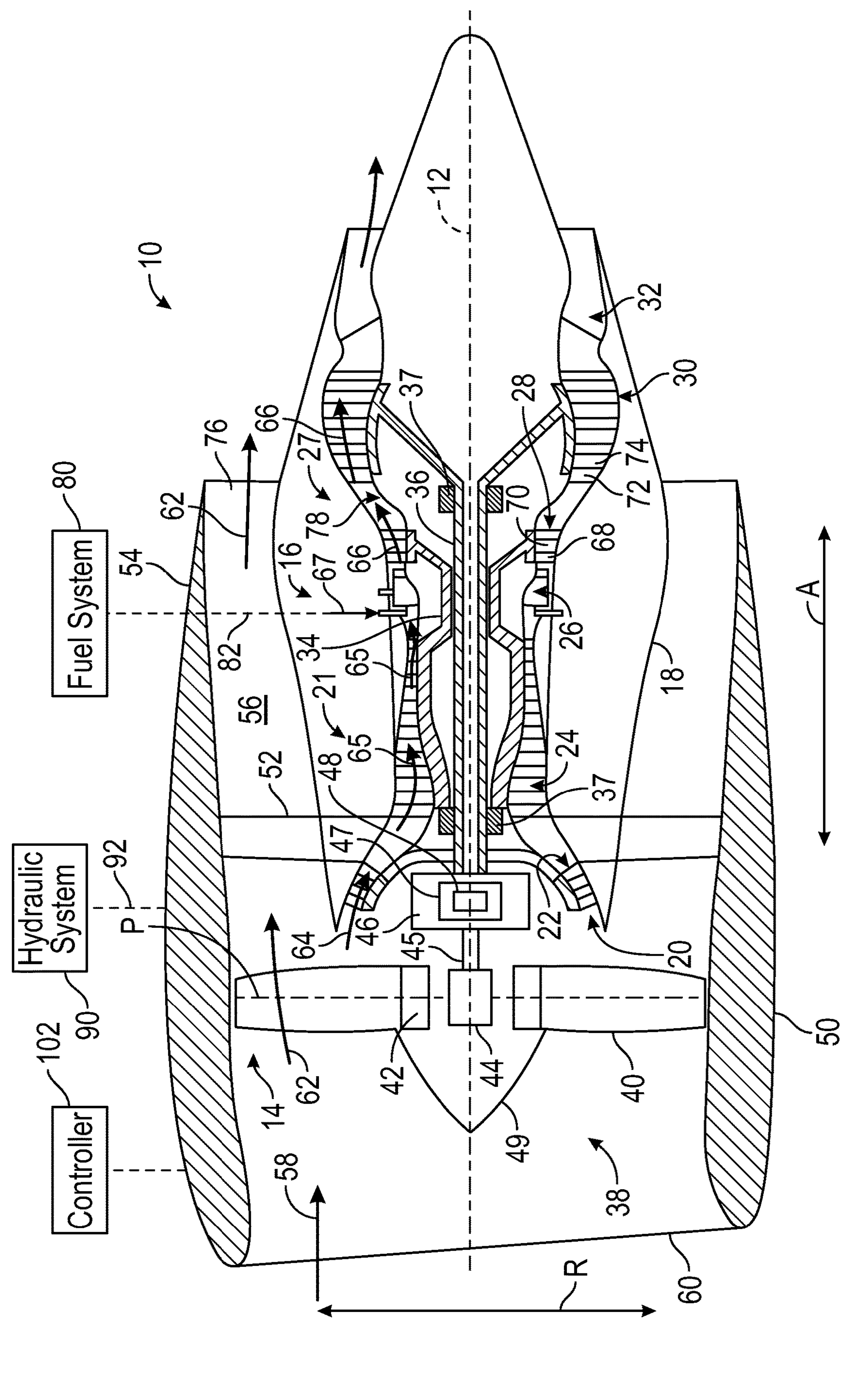
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms “axial” and “axially” refer to directions and orientations that extend substantially parallel to a centerline of the turbine engine. Moreover, the terms “radial” and “radially” refer to directions and orientations that extend substantially perpendicular to the centerline of the turbine engine. In addition, as used herein, the terms “circumferential” and “circumferentially” refer to directions and orientations that extend arcuately about the centerline of the turbine engine.

As used herein, “normal operation” of a turbine engine is intended to mean when the turbine engine is operating, and a primary lubrication system of the turbine engine is supplying lubricant to one or more rotating components of the turbine engine.

As used herein, “windmill” or “windmilling” is a condition when the fan and the low-pressure shaft of the turbine engine continue to rotate at low speeds, while the high-pressure shaft rotates slowly or even stops. Windmilling can occur when the turbine engine is shut down, but air still flows across the fan, such as during an in-flight engine shutdown or when the turbine engine is on the ground and the fan is rotating in the presence of wind when the turbine engine is shutdown. During a shutdown, e.g., while the aircraft is on the ground, the fan may also rotate in either direction depending upon the stationary position of the turbine engine relative to the ambient wind. Airflow entering the fan exhaust may exit the fan inlet in an opposite direction as a direction of operation and cause the fan to rotate in an opposite rotational direction compared to the intended operational rotational direction.

As used herein, “activate” or “activating” an auxiliary lubrication system includes causing lubricant to flow within the auxiliary lubrication system. For example, activating the auxiliary lubrication system includes powering an auxiliary pump to pump the lubricant through the auxiliary lubrication system or closing a drain valve or a scavenge valve to fill a secondary reservoir with the lubricant. In some embodiments, the drain valve or the scavenge valve is opened when the auxiliary lubrication system is active, and another valve closes to fill the secondary reservoir with lubricant.

As used herein, “inactivate” or an “inactive” auxiliary lubrication system includes preventing the lubricant from flowing within the auxiliary lubrication system. For example, when the auxiliary lubrication system is inactive, the auxiliary pump is powered off and is prevented from pumping the lubricant through the auxiliary lubrication or the drain valve is opened to prevent the secondary reservoir from being filled with the lubricant. In some embodiments, the drain valve or the scavenge valve is closed when the auxiliary lubrication system is inactive, and another valve opens to prevent the secondary reservoir from being filled with the lubricant.

Approximating language, as used herein throughout the specification and claims, is applied to modify any quantitative representation that could permissibly vary without resulting in a change in the basic function to which it is related. Accordingly, a value modified by a term or terms, such as “about,” “approximately,” “generally,” and “substantially” is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a turbine engine having a lubrication system. The turbine engine includes a fan having a fan shaft. The turbine engine includes one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more gearbox bearings for a gearbox assembly of the turbine engine. The one or more gearbox bearings allow rotation of the one or more gears of the gearbox assembly about the one or more gearbox bearings. In one embodiment, one or more of the bearings are journal bearings. The one or more bearings can include any type of bearings, such as, for example, roller bearings, or the like. The lubrication system supplies lubricant (e.g., oil) to the one or more rotating components. The lubrication system includes one or more tanks that store lubricant therein, and a primary lubrication system having a primary pump and a primary lubricant supply line. During normal operation of the turbine engine, the primary pump pumps the lubricant from the one or more tanks to the one or more rotating components through the primary lubricant supply line.

The bearings, especially journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Such auxiliary lubrication systems, however, typically operate based on a speed of the fan such that the auxiliary lubrication system operates only when the fan speed is below a threshold speed, such as during a shutdown of the turbine engine. Such auxiliary lubrication systems may be unable to operate to supply the lubricant to the one or more rotating components during operation of the turbine engine, for example, when the turbine engine is operating (e.g., the fan speed is greater than the threshold speed), and the primary lubrication system is unable to provide the lubricant to the one or more rotating components. Further, the auxiliary pump requires added complexity to provide the lubricant during high speeds, such as during operation of the turbine engine, and during low speeds, such as during windmilling (e.g., in-flight or on the ground). Further, the auxiliary pump requires added complexity to provide the lubricant while the fan windmills in either direction (e.g., the fan rotates clockwise or counterclockwise).

Some auxiliary lubrication systems are always active such that the lubricant flows through the auxiliary lubrication system and a valve directs the lubricant either to the primary lubrication system or to the gearbox assembly. Such a configuration of the auxiliary lubrication system being always active, however, requires running the auxiliary pump during operation of the turbine engine, thereby reducing a lifespan of the auxiliary pump. Such auxiliary lubrication systems may also overflow the rotating components by supplying too much lubricant to the rotating components, thereby introducing inefficiencies of the rotating components due to excessive churning or windage losses.

Accordingly, the present disclosure provides an auxiliary lubrication system that supplies the lubricant to the one or more rotating components during any time that the primary lubrication system is unable to supply the lubricant. The auxiliary lubrication system includes a pump (e.g., a bi-directional pump) that is drivingly coupled to the fan shaft through a pump shaft. The auxiliary lubrication system may include a clutch that is coupled to the pump shaft. The clutch engages or disengages the pump shaft based on a pressure of the lubricant in the primary lubricant system. For example, the clutch disengages the pump shaft such that the auxiliary pump does not operate when the pressure of the lubricant in the primary lubrication system is greater than a primary pressure threshold. The clutch engages the pump shaft such that the auxiliary pump operates when the pressure of the lubricant in the primary lubrication system is less than the primary pressure threshold. In this way, the auxiliary lubrication system supplies the lubricant to the one or more rotating components while the turbine engine is operating and if the primary lubrication system fails and can no longer supply the lubricant to the one or more rotating components.

In one embodiment, the auxiliary lubrication system includes a uni-directional pump and a pair of one-way clutches (e.g., sprag clutches) that operate in opposite directions to convert bi-directional rotation of the fan shaft into a singular rotational direction of the auxiliary pump. In this way, the auxiliary pump can operate in a single rotational direction to pump the lubricant to the one or more rotating components while the fan rotates in either direction (e.g., clockwise or counterclockwise). Such a configuration enables a less complex pump as compared to a bi-directional pump.

Further, the present disclosure provides lubrication during windmilling, or during other loss of pressure conditions (e.g., loss of pressure in the lubrication system, loss of pressure in the fuel system, loss of pressure in the hydraulic system, etc.), by creating a large reservoir of lubricant in the bottom of the sump of the gearbox assembly after the loss of pressure (e.g., during shutdown or during failure of one or more components of the lubrication system, the fuel system, the hydraulic system, etc.). The level of lubricant in the large reservoir is greater than the level of lubricant in the sump during normal operating conditions of the turbine engine. During normal operating conditions of the turbine engine, the lubricant is drained from the large reservoir back to the level of lubricant in the sump to avoid excess lubricant and to prevent excess heat from accumulating due to excess lubricant and overworking a thermal management system (TMS) of the turbine engine.

The present disclosure provides for a turbine engine having a fan and a fan shaft driving the fan. The lubrication system includes a scavenge gutter for draining the lubricant that sprays off of the gears of the gear assembly. The lubrication system includes a large, secondary reservoir, also referred to as a scavenge reservoir. The lubricant level in the secondary reservoir is variable between the level of the lubricant in the sump and a maximum level. The lubrication system includes a sump line with a plurality of drain ports for draining the lubricant from the sump and the secondary reservoir to the tank. The sump line can include one or more drain valves to open and to close the plurality of drain ports. The plurality of drain ports can include drain ports at various clocking positions of the gearbox assembly to allow the lubricant to drain from the sump and the secondary reservoir even when the aircraft turns, banks, or rolls left or right. The plurality of drain ports includes a secondary drain port positioned at the maximum lubricant level of the secondary reservoir to allow the lubricant to drain to ensure the lubricant does not fill the secondary reservoir beyond the maximum lubricant level.

During a shutdown or other engine off scenarios, the one or more drain valves close such that the lubricant fills the secondary reservoir above the lubricant level of the sump. The one or more drain valves can be passively or actively engaged (e.g., open) by a physical existence or a sensed existence of lubricant pressure, fuel pressure, or hydraulic pressure due to the turbine engine reaching a predetermined operating speed (e.g., a predetermined speed of the turbo-engine). The drain valve can be a solenoid valve that is electrically energized when the engine controller is powered on, for example, at a predetermined operating speed of the turbine engine. During the windmilling (e.g., at shutdown of the turbine engine), the gearbox assembly is substantially self-lubricating due to the gears or other features of the gear assembly being immersed in the lubricant within the secondary reservoir. For example, one or more of the planet gears contact the lubricant in the secondary reservoir to pick up the lubricant and rotation of the planet gears causes the lubricant to flow to the various gears and to the bearings. In some embodiments, the lubrication system includes one or more scuppers to supply the lubricant from the secondary reservoir to the gears and the bearings. Accordingly, the present disclosure provides for supplying lubricant to the gears or the bearings during shutdown of the turbine engine or other loss of pressure scenarios.

The present disclosure provides for a method of operating a lubrication system for a turbine engine. The lubrication system can be any of the lubrication systems detailed herein. The method includes determining a lubricant flow in the primary lubrication system, determining whether the lubricant flow is less than a lubricant flow threshold, and activating the auxiliary lubrication system if the lubricant flow is less than the lubricant flow threshold. The method also includes powering the auxiliary lubrication system by rotation of the fan. In this way, the method includes activating the auxiliary lubrication system when there is insufficient flow of lubricant from the primary lubrication system. The insufficient flow of lubricant includes, for example, an interruption of the lubricant in the primary lubrication system (e.g., the pressure of the lubricant in the primary lubrication system is less than a primary pressure threshold), during an in-flight shutdown, during windmilling on the ground, or when the primary lubrication system is otherwise inactive or off. The lubricant flow is determined based on the pressure of the lubricant in the primary lubrication system, a pressure of the fuel in the turbine engine, or a rotational speed of the turbo-engine. The method includes supplying the lubricant to the one or more rotating components from the auxiliary lubrication system when the fan is rotating in a first rotational direction or in a second rotational direction.

Activating the auxiliary lubrication system only when there is insufficient flow of the lubricant in the primary lubrication system ensures that the auxiliary lubrication system does not constantly flow the lubricant therethrough, thereby increasing a lifespan of the auxiliary lubrication system as compared to auxiliary lubrication systems without the benefit of the present disclosure. Further, activating the auxiliary lubrication system when there is insufficient flow of the lubricant in the primary lubrication system helps to reduce or to prevent inefficiencies of the rotating components due to excessive churning or windage losses. The method also helps to ensure a supply of the lubricant to the rotating components any time there is an interruption of the lubricant flow in the primary lubrication system, rather than just during a shutdown of the turbine engine as in lubrication systems without the benefit of the present disclosure. Further, powering the auxiliary lubrication system by rotation of the fan reduces complexity of the auxiliary pump and allows the auxiliary lubrication system to operate regardless of the fan rotational direction of the fan.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustion section 26, and a turbine section 27. The turbo-engine 16 depicted is substantially enclosed within an outer casing 18 that is substantially tubular and defines an annular inlet 20. As schematically shown in FIG. 1, the compressor section 21 including a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 further includes a jet exhaust nozzle section 32 that is downstream of the turbine section 27, a high pressure (HP) shaft 34, and a low pressure (HP) shaft 36. The HP shaft 34 drivingly connects the HP turbine 28 to the HP compressor 24, and the HP compressor 24, the HP turbine 28, and the HP shaft 34 are together referred to as an HP spool. The HP turbine 28 and the HP compressor 24 rotate in unison through the HP shaft 34. The LP shaft 36 drivingly connects the LP turbine 30 to the LP compressor 22, and the LP compressor 22, the LP turbine 30, and the LP shaft 36 are together referred to as an LP spool. The LP turbine 30 and the LP compressor 22 rotate in unison through the LP shaft 36. The HP shaft 34 or the LP shaft 36 are supported by one or more engine bearings 37 that allow the HP shaft 34 or the LP shaft 36 to rotate. The one or more engine bearings 37 can include any type of bearings, such as, for example, roller bearings, or the like. The turbine engine 10 can include any number of engine bearings 37 for supporting various rotating components within the turbine engine 10. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly that includes a plurality of gears 47 for adjusting the rotational speed of the fan shaft 45 and, thus, the fan 38 relative to the LP shaft 36 when power is transferred from the LP shaft 36 to the fan shaft 45. The gearbox assembly 46 also includes one or more gearbox bearings 48 for supporting rotation of one or more of the plurality of gears 47. The gearbox bearings 48 can include any type of bearings, such as, for example, journal bearings, roller bearings, or the like.

Referring still to the exemplary embodiment of FIG. 1, the disk 42 is covered by a fan hub 49 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, the volume of air 58 is split into a first portion of air, also referred to as bypass air 62, and a second portion of air, also referred to as core air 64. The bypass air 62 is directed into the bypass airflow passage 56. The core air 64 is directed into the upstream section of the core air flow path through the annular inlet 20 of the LP compressor 22. The ratio between the bypass air 62 and the core air 64 is commonly known as a bypass ratio. The pressure of the core air 64 is then increased, generating compressed air 65. The compressed air 65 is routed through the HP compressor 24 and into the combustion section 26, where the compressed air 65 is mixed with fuel 67 and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is directed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

As detailed above, the bypass air 64 is mixed with the fuel 67 in the combustion section 26 to produce the combustion gases 66. The turbine engine 10 also includes a fuel system 80 for providing the fuel 67 to the combustion section 26. The fuel system 80 includes one or more fuel tanks (not shown) for storing the fuel 67 therein and one or more fuel lines 82 to provide the fuel 67 to the combustion section 26. In some embodiments, the fuel system 80 includes a pump for pumping the fuel 67 from the one or more fuel tanks to the combustion section 26 through the one or more fuel lines 82.

The turbine engine 10 also includes a hydraulic system 90 for providing hydraulic fluid (e.g., hydraulic oil) to one or more hydraulic control systems within the turbine engine 10 or the aircraft for moving or for actuating one or more components of the turbine engine 10 or the aircraft. The one or more components can include, for example, aircraft control surfaces (e.g., flaps, ailerons, rudders, elevators, or the like), landing gear of the aircraft, brakes, turbine engine driven hydraulic pumps, or any other components of the turbine engine 10 or the aircraft that can be controlled to be actuated by hydraulic fluid. The hydraulic system 90 includes one or more hydraulic fluid reservoirs for storing the hydraulic fluid, one or more hydraulic lines 92 in fluid communication with the one or more hydraulic fluid reservoirs and the one or more hydraulic control systems, and one or more hydraulic pumps. The one or more hydraulic pumps pump the hydraulic fluid from the one or more hydraulic reservoirs to the one or more hydraulic control systems through the one or more hydraulic lines 92 for actuating the one or more components of the turbine engine 10 or the aircraft.

A controller 102 is in communication with the turbine engine 10 for controlling aspects of the turbine engine 10. For example, the controller 102 is in two-way communication with the turbine engine 10 for receiving signals from various sensors and control systems of the turbine engine 10 and for controlling components of the turbine engine 10, as detailed further below. The controller 102, or components thereof, may be located onboard the turbine engine 10, onboard the aircraft, or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
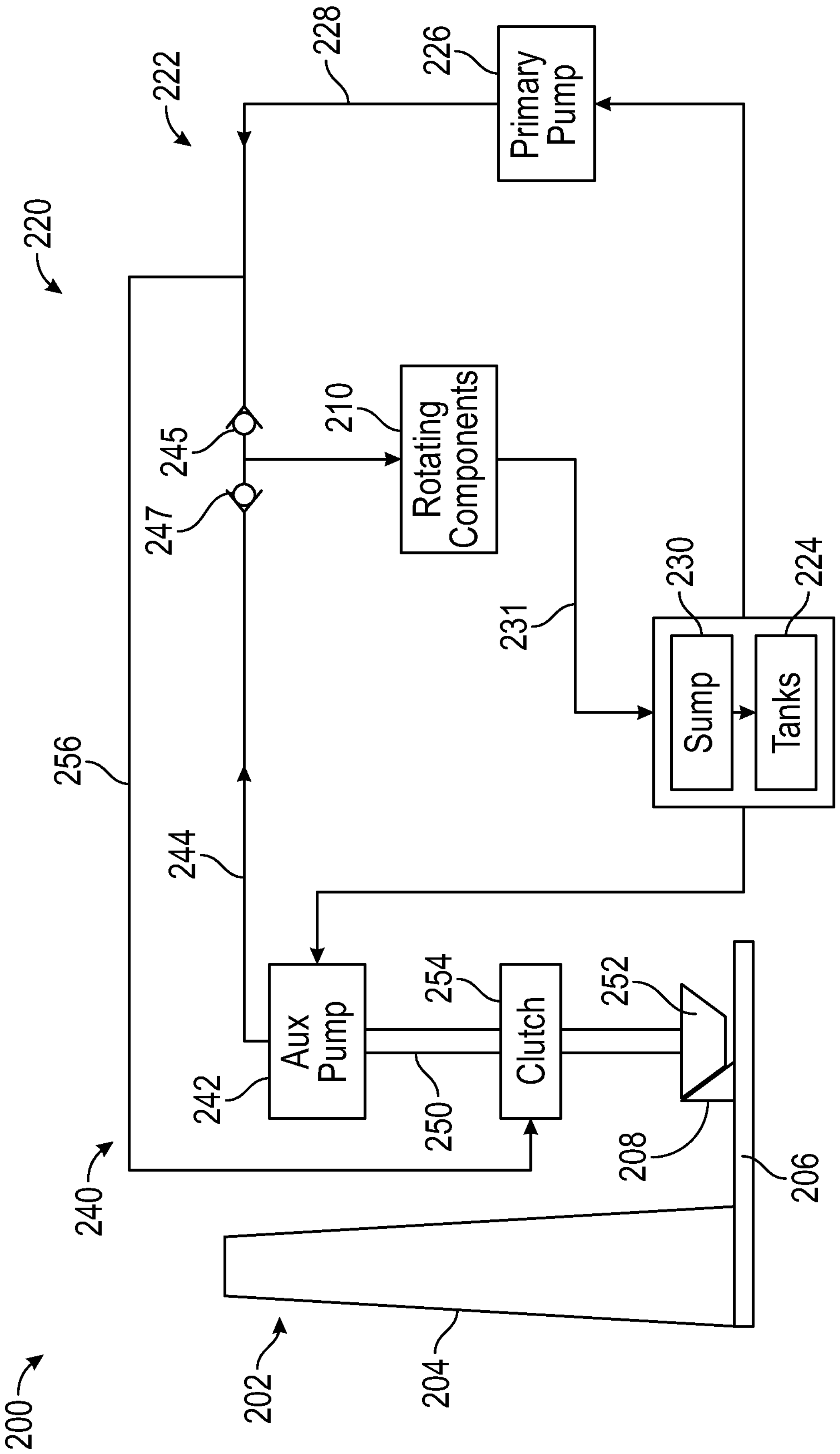
FIG. 2 is a schematic view of a turbine engine having a lubrication system, according to the present disclosure.

FIG. 2 is a schematic view of a turbine engine 200 having a lubrication system 220, according to the present disclosure. The turbine engine 200 can be utilized as the turbine engine 10 of FIG. 1 and includes a fan 202 having a plurality of fan blades 204 coupled to a fan shaft 206. The fan shaft 206 includes a fan shaft gear 208. The turbine engine 200 includes one or more rotating components 210 that allow various components (e.g., shafts, gears, etc.) of the turbine engine 200 to rotate. The one or more rotating components 210 can be, for example, shafts (e.g., the HP shaft 34 or the LP shaft 36 of FIG. 1), gears (e.g., the plurality of gears 47 of FIG. 1), or bearings including engine bearings (e.g., the engine bearings 37 of FIG. 1) or gearbox bearings (e.g., the gearbox bearings 48 of FIG. 1). The one or more rotating components 210 can embody any of the rotating components of the turbine engine 200.

The lubrication system 220 includes a primary lubrication system 222, one or more tanks 224, and an auxiliary lubrication system 240. The primary lubrication system 222 includes a primary pump 226, and a primary lubricant supply line 228. The one or more tanks 224 store lubricant therein. The lubricant can include any type of lubricant for lubricating the one or more rotating components 210 of the turbine engine 200. For example, the lubricant is oil, or the like. The one or more tanks 224 can include at least one of a primary tank or an auxiliary tank. The primary lubricant supply line 228 is in fluid communication with the one or more tanks 224 and the one or more rotating components 210 for supplying the lubricant from the one or more tanks 224 to the one or more rotating components 210. The primary pump 226 is in fluid communication with the primary lubricant supply line 228 to pump the lubricant from the one or more tanks 224 to the one or more rotating components 210 through the primary lubricant supply line 228. The lubrication system 220 includes a sump 230 that collects the lubricant that drains from the one or more rotating components 210. The sump 230 is in fluid communication with the one or more tanks 224 for supplying the lubricant from the sump 230 to the one or more tanks 224. In some embodiments, the lubrication system 220 includes a sump pump that pumps the lubricant from the sump 230 to the one or more tanks 224.

The auxiliary lubrication system 240 includes an auxiliary (aux) pump 242 and an auxiliary lubricant supply line 244. The auxiliary lubricant supply line 244 is in fluid communication with the one or more tanks 224 and the one or more rotating components 210. While the auxiliary lubricant supply line 244 is depicted as a separate flow line as the primary lubricant supply line 228 in FIG. 2, the auxiliary lubricant supply line 244 can form a part of the primary lubricant supply line 228. The auxiliary pump 242 is in fluid communication with the auxiliary lubricant supply line 244.

The lubrication system 220 includes one or more valves 245, 247 in fluid communication with the primary lubricant supply line 228 and the auxiliary lubricant supply line 244. For example, the one or more valves 245, 247 includes a first valve 245 in fluid communication with the primary lubricant supply line 228 and a second valve 247 in fluid communication with the auxiliary lubricant supply line 244. The one or more valves 245, 247 are check valves in FIG. 2, but can include any type of valve for allowing the lubricant to flow through, or for preventing the lubricant from flowing through the primary lubricant supply line 228 or the auxiliary lubricant supply line 244, as detailed further below.

The auxiliary pump 242 is drivingly coupled to the fan shaft 206. For example, the auxiliary pump 242 includes a pump shaft 250 that is coupled to the fan shaft 206. The pump shaft 250 is coupled to the fan shaft 206 by a pump shaft gear 252 that is intermeshed with the fan shaft gear 208. In this way, rotation of the fan shaft 206 causes the pump shaft 250 to rotate, thereby powering the auxiliary pump 242. The auxiliary pump 242 is a bi-directional pump that pumps the lubricant from the one or more tanks 224 to the one or more rotating components 210 through the auxiliary lubricant supply line 244 regardless of the direction of rotation of the fan shaft 206. Exemplary bi-directional pumps are detailed below with respect to FIGS. 10 and 11. The auxiliary pump 242 can include any type of bi-directional pump, such as a positive displacement pump, for example, a piston pump, a gear pump, a generated rotor (gerotor), a rotary pump, a peristaltic pump, or the like. The auxiliary pump 242 pumps the lubricant from the one or more tanks 224 to the one or more rotating components 210 when the fan shaft 206 rotates in a first rotational direction and when the fan shaft 206 rotates in a second rotational direction that is opposite the first rotational direction. For example, the first rotational direction is the rotational direction of the fan shaft 206 when the turbine engine 200 is operating, and the second rotational direction is opposite of the rotational direction of the fan shaft 206 during operation (e.g., when the fan 202 is windmilling in the second rotational direction).

The auxiliary lubrication system 240 includes a clutch 254 that controls the operation of the auxiliary pump 242. For example, the clutch 254 is coupled with the pump shaft 250 and engages the pump shaft 250 to operate the auxiliary pump 242 and disengages the pump shaft 250 to prevent operation of the auxiliary pump 242. The clutch 254 can include any type of clutch for engaging or for disengaging the pump shaft 250. The lubrication system 220 includes a lubricant pressure signal line 256 that is in fluid communication with the primary lubrication system 222 and the clutch 254. For example, the lubricant pressure signal line 256 is in fluid communication with the primary lubricant supply line 228. In this way, the clutch 254 engages or disengages the pump shaft 250 based on a lubricant pressure of the lubricant in the primary lubrication system 222, as detailed further below.

In operation, the lubrication system 220 supplies the lubricant to the one or more rotating components 210 to lubricate the one or more rotating components 210. During normal operation of the turbine engine 200, the primary lubrication system 222 supplies the lubricant to the one or more rotating components 210. For example, the primary pump 226 pumps the lubricant from the one or more tanks 224 to the one or more rotating components 210 through the primary lubricant supply line 228. During normal operation, the lubricant pressure of the lubricant in the primary lubrication system 222 causes the first valve 245 to open while causing the second valve 247 to close. For example, the first valve 245 opens based on the lubricant pressure in the primary lubrication system 222 being greater than a primary pressure threshold of the first valve 245. The first valve 245 closes based on the lubricant pressure in the primary lubrication system 222 being less than the primary pressure threshold of the first valve 245. Similarly, the second valve 247 opens based the lubricant pressure in the auxiliary lubrication system 240 being greater than an auxiliary pressure threshold, and closes based on the lubricant pressure in the auxiliary lubrication system 240 being less than the auxiliary pressure threshold. In this way, the primary lubrication system 222 supplies the lubricant, while the auxiliary lubrication system 240 is prevented from supplying the lubricant during the normal operation of the turbine engine 200. The lubricant drains from the one or more rotating components 210 into the sump 230 (as indicated by the arrow 231), and the lubricant is directed to the one or more tanks 224. In this way, the lubricant is re-circulated through the primary lubrication system 222.

The clutch 254 disengages the pump shaft 250 when the lubricant pressure in the primary lubrication system 222 is greater than the predetermined pressure threshold. For example, the clutch 254 receives a lubricant pressure signal from the primary lubrication system 222 through the lubricant pressure signal line 256. When the lubricant pressure in the primary lubrication system 222 is greater than the primary pressure threshold (e.g., during normal operation of the turbine engine 200), the lubricant pressure of the lubricant in the primary lubrication system 222 cause the clutch 254 to disengage the pump shaft 250 such that the auxiliary pump 242 is prevented from operating and prevented from pumping the lubricant from the one or more tanks 224. In this way, the auxiliary lubrication system 240 is inactive when the primary lubrication system 222 is supplying the lubricant to the one or more rotating components 210.

In some instances, the primary lubrication system 222 may be unable to supply the lubricant to the one or more rotating components 210. For example, the primary lubrication system 222 may be unable to pressurize the lubricant to supply the lubricant to the one or more rotating components 210 during windmilling while the turbine engine 200 is shut down or during a failure of the turbine engine 200 or the lubrication system 220 (e.g., the primary pump 226 fails, the primary lubricant supply line 228 becomes damaged, etc.) while in-flight. In such instances, the windmilling may cause the shafts (e.g., the fan shaft 206) of the turbine engine 200 to rotate, thereby causing the one or more rotating components 210 of the turbine engine 200 to rotate. The one or more rotating components 210 can become damaged if there is not enough lubricant supplied to the one or more rotating components 210.

Accordingly, during such instances, the auxiliary lubrication system 240 supplies the lubricant to the one or more rotating components 210. When the lubricant pressure of the lubricant in the primary lubrication system 222 is less than the primary pressure threshold, the clutch 254 engages the pump shaft 250 such that rotation of the fan shaft 206 causes the pump shaft 250 to rotate. In this way, the auxiliary pump 242 pumps the lubricant from the one or more tanks 224 to the one or more rotating components 210 through the auxiliary lubricant supply line 244. When the lubricant pressure of the lubricant in the primary lubrication system 222 is less than the primary pressure threshold, the first valve 245 closes and the second valve 247 opens. Similarly, when the lubricant pressure of the lubricant in the auxiliary lubrication system 240 is greater than the auxiliary pressure threshold, the second valve 247 opens and the first valve 245 closes. In this way, the lubricant flows through the auxiliary lubricant supply line 244 to the one or more rotating components 210. The lubricant drains from the one or more rotating components 210 to the sump 230 and back to the one or more tanks 224, as detailed above. Thus, the auxiliary lubrication system 240 supplies the lubricant to the one or more rotating components 210 when the lubricant pressure of the lubricant in the primary lubrication system 222 is less than the primary pressure threshold, such as when the primary lubrication system 222 fails during operation of the turbine engine 200 or when the fan 202 is windmilling during operation or when the turbine engine 200 is shut down.

Figure 3:
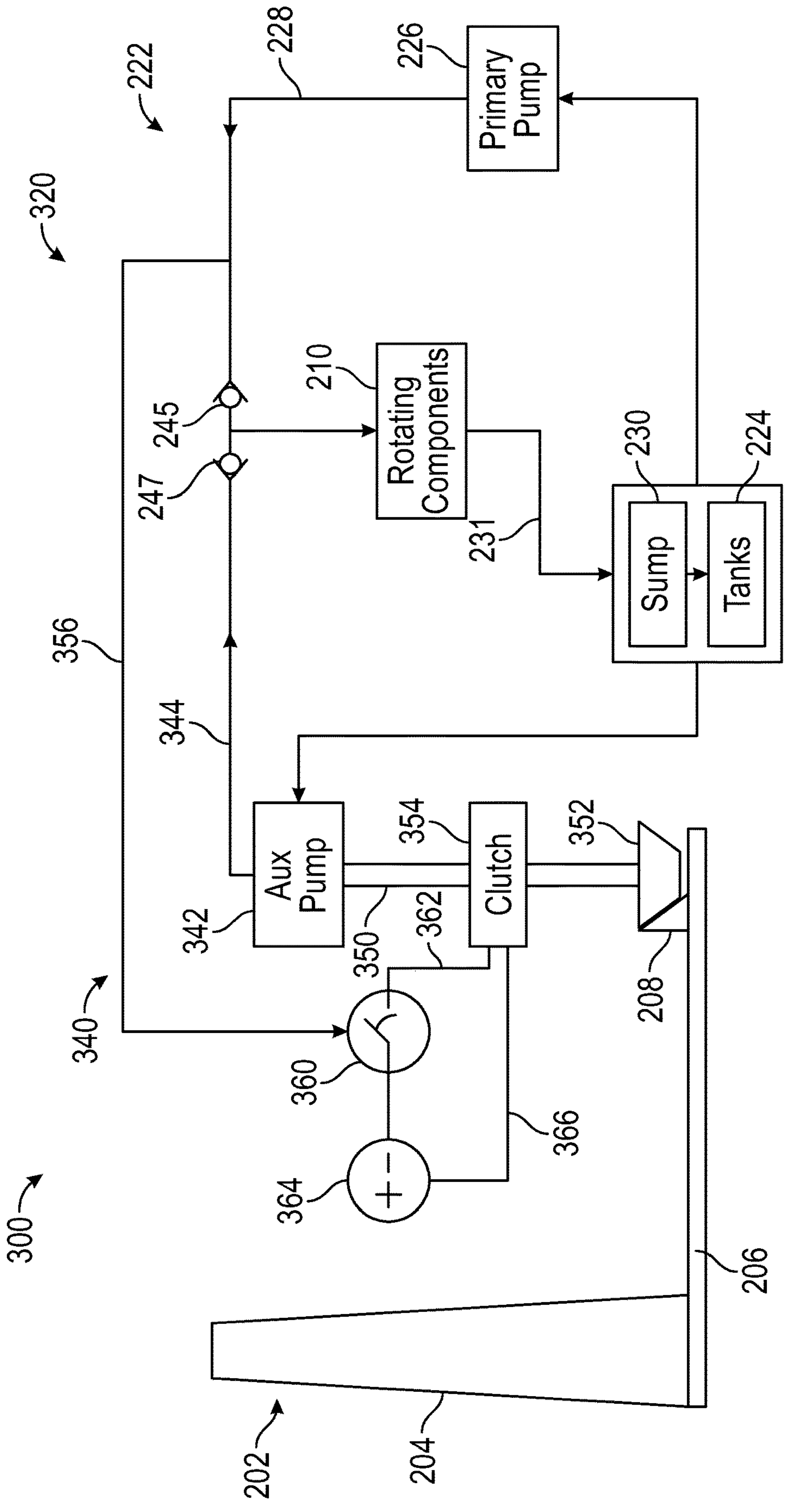
FIG. 3 is a schematic view of a turbine engine having a lubrication system, according to another embodiment.

FIG. 3 is a schematic view of a turbine engine 300 having a lubrication system 320, according to another embodiment. The turbine engine 300 can be utilized as the turbine engine 10 of FIG. 1. The turbine engine 300 and the lubrication system 320 include many of the same components or similar components as the turbine engine 200 and the lubrication system 220 of FIG. 2, respectively. The lubrication system 320, however, includes an auxiliary lubrication system 340 that is different than the auxiliary lubrication system 240 of FIG. 2.

The auxiliary lubrication system 340 includes an aux pump 342 and an auxiliary lubrication supply line 344. The aux pump 342 is a bi-directional pump and includes a pump shaft 350 that is coupled to the fan shaft 206 via a pump shaft gear 352 that is intermeshed with the fan shaft gear 208. A clutch 354 engages or disengages the pump shaft 350 such that the aux pump 342 operates or is prevented from operating, respectively. The clutch 354 is an electro-mechanical clutch that includes a lubricant pressure switch 360 and a power supply 364. The lubricant pressure switch 360 is in fluid communication with a lubricant pressure signal line 356 and is in communication with the clutch 354 (as indicated by line 362). The power supply 364 is in communication with the clutch 354 (as indicated by line 366). The power supply 364 can be electrical power from the turbine engine 300 (e.g., power that is supplied to the controller 102 of FIG. 1 or to other systems of the turbine engine 300).

The turbine engine 300 and the lubrication system 320 operate substantially similarly as do the turbine engine 200 and the lubrication system 220 of FIG. 2, respectively. The clutch 354, however, engages or disengages the pump shaft 350 based on the lubricant pressure of the lubricant in the primary lubrication system 222 and a supply of power from the power supply 364. For example, the clutch 354 engages the pump shaft 350 when the lubricant pressure of the lubricant in the primary lubrication system 222 is less than the primary pressure threshold (e.g., the lubricant pressure switch 360 opens) or the power supply 364 is off (e.g., the clutch 354 or the lubricant pressure switch 360 are not receiving electrical power from the power supply 364). In this way, the auxiliary lubrication system 340 is activated and supplies the lubricant from the one or more tanks 224 to the one or more rotating components 210 when either the lubricant pressure of the lubricant in the primary lubrication system 222 is less than the primary pressure threshold or the power supply 364 is off. The clutch 354 disengages the pump shaft 350 when the lubricant pressure of the lubricant in the primary lubrication system 222 is greater than the primary pressure threshold (e.g., the lubricant pressure switch 360 closes) and the power supply 364 is on (e.g., the clutch 354 or the lubricant pressure switch 360 are receiving electrical power from the power supply 364). In this way, the auxiliary lubrication system 240 is inactivated and the primary lubrication system 222 supplies the lubricant from the one or more tanks 224 to the one or more rotating components 210.

Figure 4:
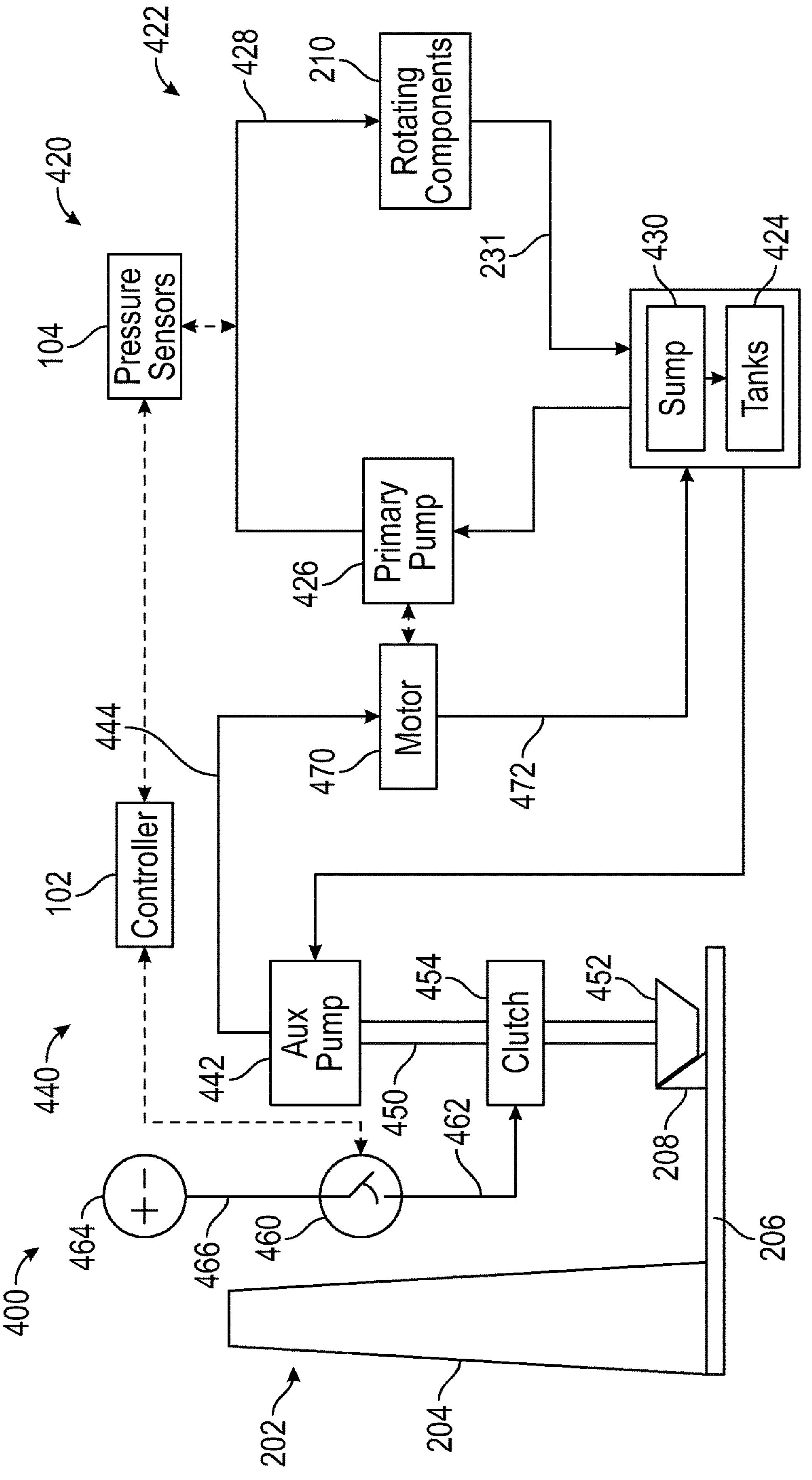
FIG. 4 is a schematic view of a turbine engine having a lubrication system, according to another embodiment.

FIG. 4 is a schematic view of a turbine engine 400 having a lubrication system 420, according to another embodiment. The turbine engine 400 can be utilized as the turbine engine 10 of FIG. 1. The turbine engine 400 and the lubrication system 420 include many of the same components or similar components as the turbine engine 200 and the lubrication system 220 of FIG. 2, respectively. The lubrication system 420 includes a primary lubrication system 422, one or more tanks 424, a sump 430, and an auxiliary lubrication system 440. The primary lubrication system 422 includes a primary pump 426 and a primary lubricant supply line 428. The primary pump 426 is powered by a motor 470, as detailed further below.

The auxiliary lubrication system 440 includes an aux pump 442 and an auxiliary lubricant supply line 444. The aux pump 442 is a bi-directional pump and includes a pump shaft 450 that is coupled to the fan shaft 206 via a pump shaft gear 452 that is intermeshed with the fan shaft gear 208. A clutch 454 engages or disengages the pump shaft 450 such that the aux pump 442 operates or is prevented from operating, respectively. The clutch 454 is an electro-mechanical clutch that includes a lubricant pressure switch 460 and a power supply 464. The lubricant pressure switch 460 is in communication with the controller 102 and is in communication with the clutch 454 (as indicated by line 462). The power supply 464 is in communication with the lubricant pressure switch 460 (as indicated by line 466). The controller 102 is in communication with one or more pressure sensors 104 that sense a pressure of the lubricant in the primary lubrication system 422. For example, the one or more pressure sensors 104 sense the lubricant pressure of the lubricant in the primary lubricant supply line 428. The one or more pressure sensors 104 can include any type of pressure sensor for sensing the lubricant pressure of the lubricant in the primary lubrication system 422.

The auxiliary lubricant supply line 444 is in fluid communication with the aux pump 442 and the motor 470. The motor 470 is coupled to the primary pump 426 and powers the primary pump 426, as detailed further below.

The turbine engine 400 and the lubrication system 420 operate substantially similarly as do the turbine engine 200 and the lubrication system 220 of FIG. 2, respectively. During normal operation of the turbine engine 400, the primary lubrication system 422 operates as detailed above with respect to the primary lubrication system 222 of FIG. 2. During the normal operation of the turbine engine 400, the primary pump 426 is powered by an electric motor, an accessory gearbox, a turbine section of the turbine engine 400 (e.g., the turbine section 27 of FIG. 1), or the like.

The clutch 454 engages or disengages the pump shaft 450 based on the lubricant pressure of the lubricant in the primary lubrication system 422 and a supply of power from the power supply 464. For example, the controller 102 receives sensed lubricant pressure of the lubricant in the primary lubrication system 422 from the one or more pressure sensors 104. During the normal operation of the turbine engine 400, the primary lubrication system 422 supplies the lubricant to the one or more rotating components 210. For example, the clutch 454 disengages the pump shaft 450 when the lubricant pressure of the lubricant in the primary lubrication system 422 is greater than the primary pressure threshold (e.g., the controller 102 controls the lubricant pressure switch 460 to close) and the power supply 464 is on (e.g., the lubricant pressure switch 460 is receiving electrical power from the power supply 464). In this way, the auxiliary lubrication system 440 is inactivated and the primary lubrication system 422 supplies the lubricant from the one or more tanks 424 to the one or more rotating components 210.

During instances when the primary lubrication system 422 is unable to supply the lubricant to the one or more rotating components 210 under the normal operation of the turbine engine 400 (e.g., the fan 202 is windmilling), the auxiliary lubrication system 440 powers the primary pump 426 to supply the lubricant to the one or more rotating components 210. For example, the clutch 454 engages the pump shaft 450 when the lubricant pressure of the lubricant in the primary lubrication system 422 is less than the primary pressure threshold (e.g., the controller 102 controls the lubricant pressure switch 460 to open), the power supply 464 is off (e.g., the lubricant pressure switch is not receiving electrical power from the power supply 464), or the lubricant pressure switch 460 does not receive a signal from the controller 102. In this way, the auxiliary lubrication system 440 is activated and supplies the lubricant from the one or more tanks 424 to the motor 470 through the auxiliary lubricant supply line 444 when the lubricant pressure of the lubricant in the primary lubrication system 422 is less than the primary pressure threshold, the power supply 464 is off, or the lubricant pressure switch 460 is not receiving a signal from the controller 102. For example, the motor 470 is a hydraulic motor and is powered by the lubricant flowing through the motor 470 from the auxiliary lubricant supply line 444. The lubricant then flows from the motor 470 to the sump 430 or the one or more tanks 424 (as indicated by the arrow 472). In this way, the auxiliary lubrication system 440 powers the motor 470, and the motor 470 powers the primary pump 426 to pump the lubricant from the one or more tanks 424 to the one or more rotating components 210 through the primary lubricant supply line 428.

Figure 5:
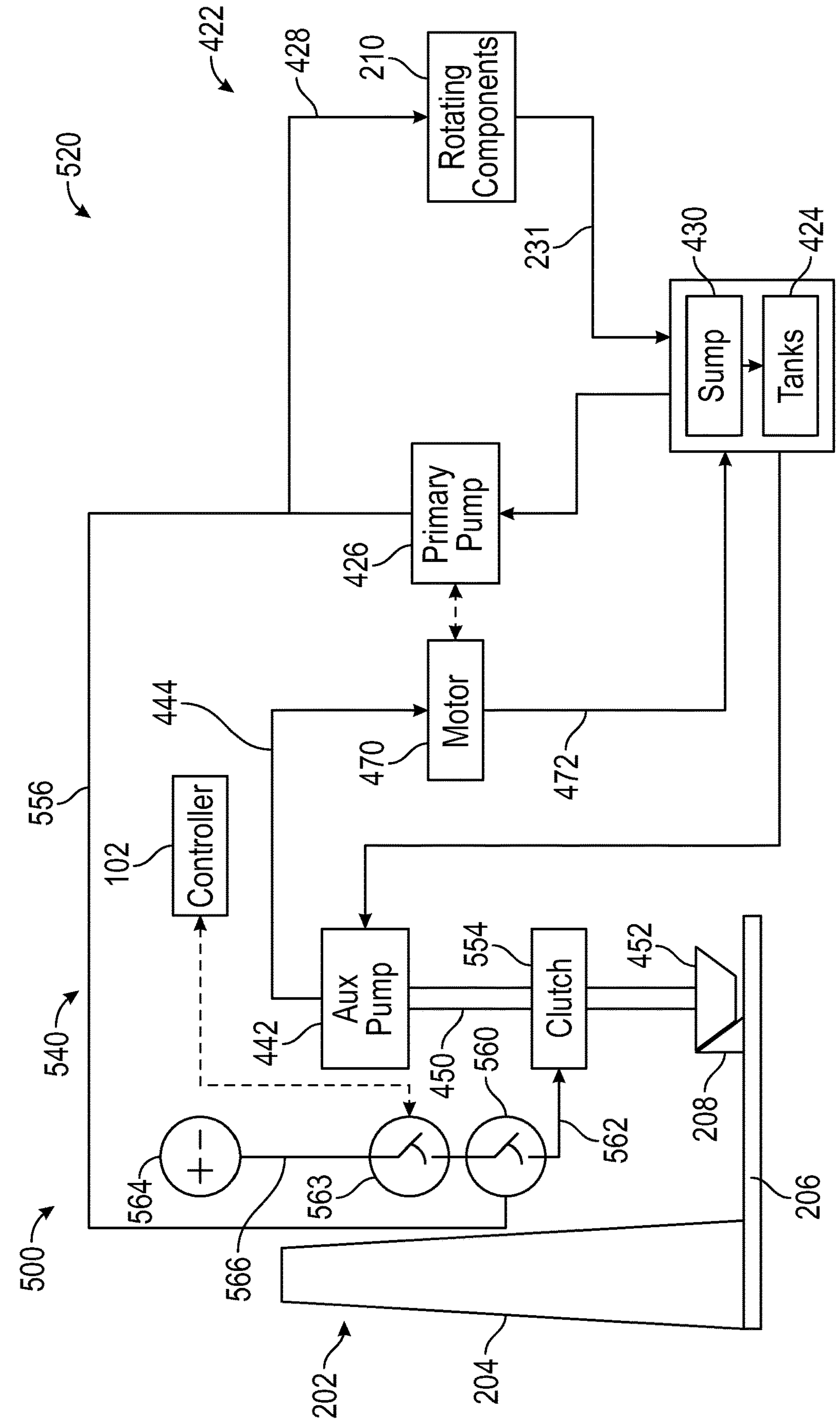
FIG. 5 is a schematic view of a turbine engine having a lubrication system, according to another embodiment.

FIG. 5 is a schematic view of a turbine engine 500 having a lubrication system 520, according to another embodiment. The turbine engine 500 can be utilized as the turbine engine 10 of FIG. 1. The turbine engine 500 and the lubrication system 520 include many of the same components or similar components as the turbine engine 400 and the lubrication system 420 of FIG. 4, respectively. The lubrication system 520, however, includes an auxiliary lubrication system 540 that is different than the auxiliary lubrication system 440 of FIG. 4.

In particular, the auxiliary lubrication system 540 includes a clutch 554 that is controlled by a lubricant pressure switch 560, a control signal switch 563, and a power supply 564. The lubricant pressure switch 560 and the control signal switch 563 are in communication with the clutch 554 (as indicated by arrow 562), and the power supply 564 is in communication with the lubricant pressure switch 560 and the control signal switch 563 (as indicated by line 566). The lubricant pressure switch 560 is in fluid communication with the primary lubrication system 422 through a lubricant pressure signal line 556. The control signal switch 563 is in communication with the controller 102 such that the control signal switch 563 receives a signal from the controller 102.

The turbine engine 500 and the lubrication system 520 operate substantially similarly as do the turbine engine 400 and the lubrication system 420 of FIG. 4, respectively. The clutch 554, however, engages or disengages the pump shaft 450 based on the lubricant pressure of the lubricant in the primary lubrication system 222, the signal from the controller 102, and a supply of power from the power supply 564. For example, the clutch 554 engages the pump shaft 450 when the lubricant pressure of the lubricant in the primary lubrication system 222 is less than the primary pressure threshold (e.g., the lubricant pressure switch 560 opens), the control signal switch 563 does not receive the signal from the controller 102, or the power supply 564 is off. In this way, the auxiliary lubrication system 540 is activated and supplies the lubricant from the one or more tanks 224 to motor 470 when the lubricant pressure of the lubricant in the primary lubrication system 222 is less than the primary pressure threshold (e.g., the lubricant pressure switch 560 opens), the controller 102 is offline (e.g., the control signal switch 563 opens), or the power supply 564 is off.

The clutch 554 disengages the pump shaft 450 when the lubricant pressure of the lubricant in the primary lubrication system 222 is greater than the primary pressure threshold (e.g., the lubricant pressure switch 560 closes), the controller 102 is online and sends the signal to the control signal switch 563 (e.g., the control signal switch 563 closes), and the power supply 564 is on (e.g., the clutch 554, the lubricant pressure switch 560, or the control signal switch 563 are receiving electrical power from the power supply 564). In this way, the auxiliary lubrication system 540 is inactivated and the primary lubrication system 222 supplies the lubricant from the one or more tanks 224 to the one or more rotating components 210 during the normal operation of the turbine engine 500.

Figure 6:
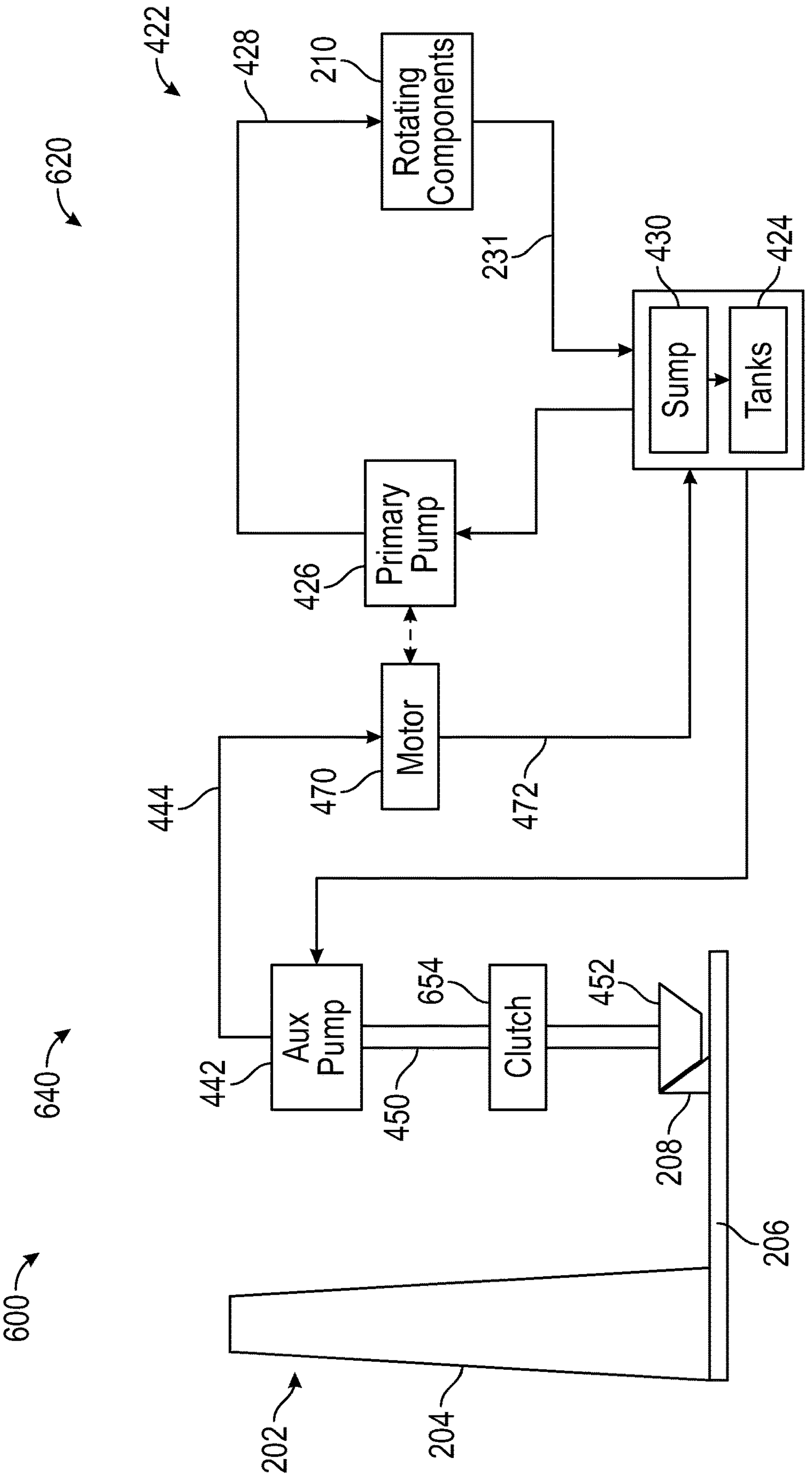
FIG. 6 is a schematic view of a turbine engine having a lubrication system, according to another embodiment.

FIG. 6 is a schematic view of a turbine engine 600 having a lubrication system 620, according to another embodiment. The turbine engine 600 can be utilized as the turbine engine 10 of FIG. 1. The turbine engine 600 and the lubrication system 620 include many of the same components or similar components as the turbine engine 400 and the lubrication system 420 of FIG. 4, respectively. The lubrication system 620, however, includes an auxiliary lubrication system 640 that is different than the auxiliary lubrication system 440 of FIG. 4.

In particular, the auxiliary lubrication system 640 includes a clutch 654 that is different than the clutch 454 of FIG. 4. The clutch 654 is a centrifugal clutch that engages or disengages the pump shaft 450 based on a rotational speed of the fan 202 (e.g., of the fan shaft 206). The turbine engine 600 and the lubrication system 620 operate substantially similarly as do the turbine engine 400 and the lubrication system 420 of FIG. 4, respectively. The clutch 654, however, engages the pump shaft 450 when the rotational speed of the fan 202 is less than a fan speed threshold. The clutch 654 disengages the pump shaft 450 when the rotational speed of the fan 202 is greater than the fan speed threshold.

Figure 7:
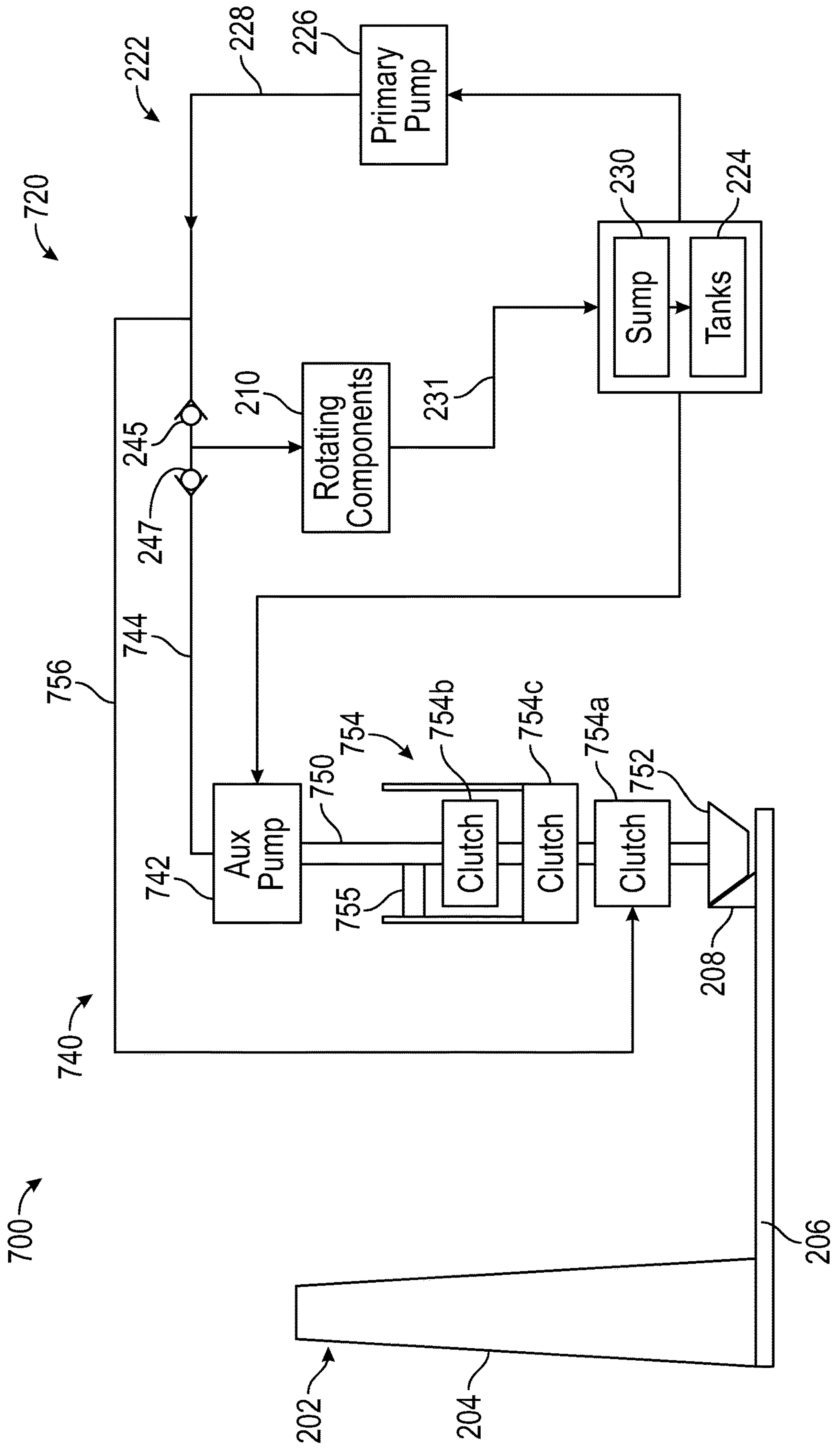
FIG. 7 is a schematic view of a turbine engine having a lubrication system, according to another embodiment.

FIG. 7 is a schematic view of a turbine engine 700 having a lubrication system 720, according to another embodiment. The turbine engine 700 can be utilized as the turbine engine 10 of FIG. 1. The turbine engine 700 and the lubrication system 720 include many of the same components or similar components as the turbine engine 200 and the lubrication system 220 of FIG. 2, respectively. The lubrication system 720, however, includes an auxiliary lubrication system 740 that is different than the auxiliary lubrication system 240 of FIG. 2.

The auxiliary lubrication system 740 includes an aux pump 742, an auxiliary lubrication supply line 744, a pump shaft 750, a pump shaft gear 752, a plurality of clutches 754, and a lubricant pressure signal line 756. The aux pump 742 is a uni-directional pump that operates in a single rotational direction to pump the lubricant from the one or more tanks 224.

The plurality of clutches 754 converts the bi-directional rotation of the fan 202 (e.g., the fan shaft 206) to a single rotational direction for operating the aux pump 742 in a single rotational direction. The plurality of clutches 754 includes a first clutch 754*a*, a second clutch 754*b*, and a third clutch 754*c*. The first clutch 754*a* is in fluid communication with the primary lubrication system 222 through the lubricant pressure signal line 756. In this way, the first clutch 754*a* engages or disengages the pump shaft 750 based on the lubricant pressure in the primary lubrication system 222. The second clutch 754*b* and the third clutch 754*c* are sprag clutches. In this way, the second clutch 754*b* and the third clutch 754*c* are one-way clutches. The second clutch 754*b* operates in a first clutch rotational direction and the third clutch 754*c* operates in a second clutch rotational direction that is opposite the first clutch rotational direction. The first clutch rotational direction is the same direction as an operational rotational direction of the pump shaft 750 for operating the aux pump 742. The third clutch 754*c* is coupled to a reversing gear 755 that rotates in a direction that is opposite of the second clutch rotational direction. In this way, the pump shaft 750 rotates in the operational rotational direction when the second clutch 754*b* engages the pump shaft 750 and when the third clutch 754*c* engages the pump shaft 750.

The turbine engine 700 and the lubrication system 720 operate substantially similarly as do the turbine engine 200 and the lubrication system 220 of FIG. 2, respectively. The first clutch 754*a* engages the pump shaft 750 when the lubricant pressure of the lubricant in the primary lubrication system 222 is less than the lubricant pressure threshold. If the fan 202 (e.g., the fan shaft 206) is rotating in a first fan rotational direction that is the same as the operational rotational direction of the pump shaft 750, the second clutch 754*b* engages the pump shaft 750 to operate the aux pump 742. If the fan 202 (e.g., the fan shaft 206) is rotating in a second fan rotational direction that is different from the operational direction of the pump shaft 750, the third clutch 754*c* engages the pump shaft 750 and the reversing gear 755 converts the rotational direction to the operational direction of the pump shaft 750. In this way, the aux pump 742 operates in a single rotational direction regardless of the fan rotational direction of the fan 202.

Figure 8:
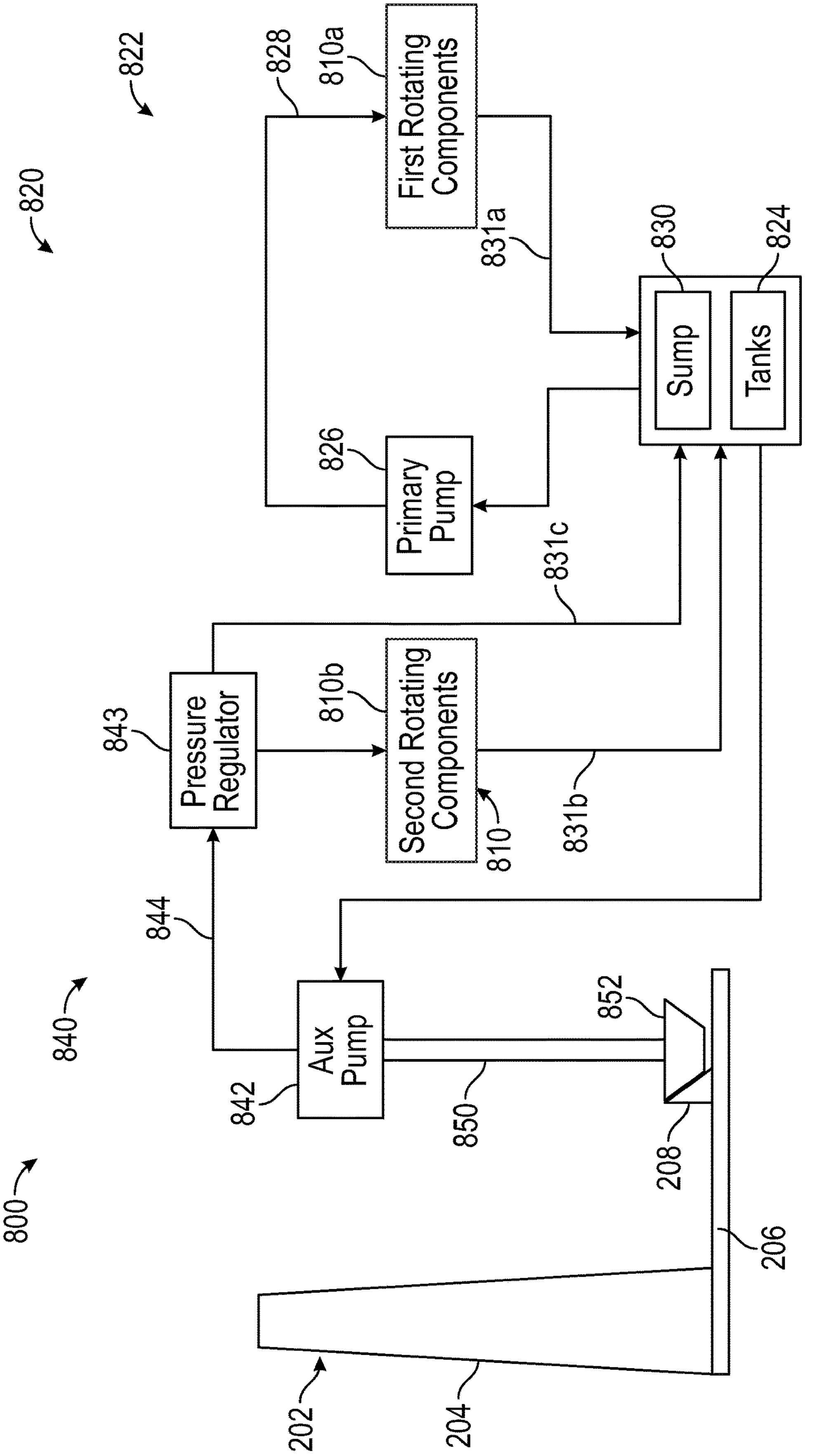
FIG. 8 is a schematic view of a turbine engine having a lubrication system, according to another embodiment.

FIG. 8 is a schematic view of a turbine engine 800 having a lubrication system 820, according to another embodiment. The turbine engine 800 can be utilized as the turbine engine 10 of FIG. 1. The turbine engine 800 and the lubrication system 820 include many of the same components or similar components as the turbine engine 200 and the lubrication system 220 of FIG. 2, respectively. The turbine engine 800 includes one or more rotating components 810 including one or more first rotating components 810*a* and one or more second rotating components 810*b*. The one or more first rotating components 810*a* can be utilized as the one or more engine bearings 37 and the one or more second rotating components 810*b* can be utilized as the one or more gearbox bearings 48 of FIG. 1. The one or more first rotating components 810*a* and the one or more second rotating components 810*b* can be any of the rotating components of the turbine engine 800.

The lubrication system 820 includes a primary lubrication system 822, one or more tanks 824, a sump 830, and an auxiliary lubrication system 840. The primary lubrication system 822 includes a primary pump 826 and a primary lubricant supply line 828. The primary lubricant supply line 828 is in fluid communication with the one or more tanks 824 and the one or more first rotating components 810*a*. The auxiliary lubrication system 840 includes an aux pump 842 and an auxiliary lubricant supply line 844. The aux pump 842 is a bi-directional pump and includes a pump shaft 850 that is coupled to the fan shaft 206 via a pump shaft gear 852 that is intermeshed with the fan shaft gear 208. The auxiliary lubrication system 840 does not include a clutch.

The auxiliary lubrication system 840 supplies the lubricant from the one or more tanks 824 to the one or more second rotating components 810*b* during normal operation of the turbine engine 800 and during windmilling of the fan 202. The auxiliary lubricant supply line 844 is in fluid communication with the one or more tanks 824 and the one or more second rotating components 810*b*. The auxiliary lubrication system 840 includes a pressure regulator 843 that maintains the lubricant pressure of the lubricant to the one or more second rotating components 810*b* below a maximum lubricant pressure threshold, as detailed further below.

The turbine engine 800 and the lubrication system 820 operate substantially similarly as do the turbine engine 200 and the lubrication system 220 of FIG. 2, respectively. The primary lubrication system 822 supplies the lubricant to the one or more first rotating components 810*a* during normal operation of the turbine engine 800. For example, the primary pump 826 pumps the lubricant from the one or more tanks 824 to the one or more first rotating components 810*a* through the primary lubricant supply line 828. The lubricant drains from the one or more first rotating components 810*a* to the sump 830 (as indicated by arrow 831*a*).

The auxiliary lubrication system 840 supplies the lubricant to the one or more second rotating components 810*b*. For example, the aux pump 842 pumps the lubricant from the one or more tanks 824 to the one or more second rotating components 810*b* through the auxiliary lubricant supply line 844. The lubricant drains from the one or more second rotating components 810*b* to the sump 830 (as indicated by arrow 831*b*). During normal operation of the turbine engine 800, the pressure regulator 843 ensures the lubricant pressure of the lubricant to the one or more second rotating components 810*b* does not exceed the maximum pressure threshold. For example, during normal operation of the turbine engine 800, the fan 202 (e.g., the fan shaft 206) rotates at a high fan speed, thereby causing the aux pump 842 to rotate at a high pump speed. Thus, the pressure regulator 843 directs a portion of the lubricant to bypass the one or more second rotating components 810*b* to the sump 830 or the one or more tanks 824 (as indicated by arrow 831*c*). During windmilling, when the fan 202 rotates at a low fan speed, the aux pump 842 rotates at a low pump speed. In such instances, the pressure regulator 843 directs substantially all the lubricant in the auxiliary lubricant supply line 844 to the one or more second rotating components 810*b*. Accordingly, the auxiliary lubrication system 840 supplies the lubricant from the one or more tanks 824 to the one or more second rotating components 810*b* during normal operation of the turbine engine 800 and during windmilling of the fan 202.

Figure 9:
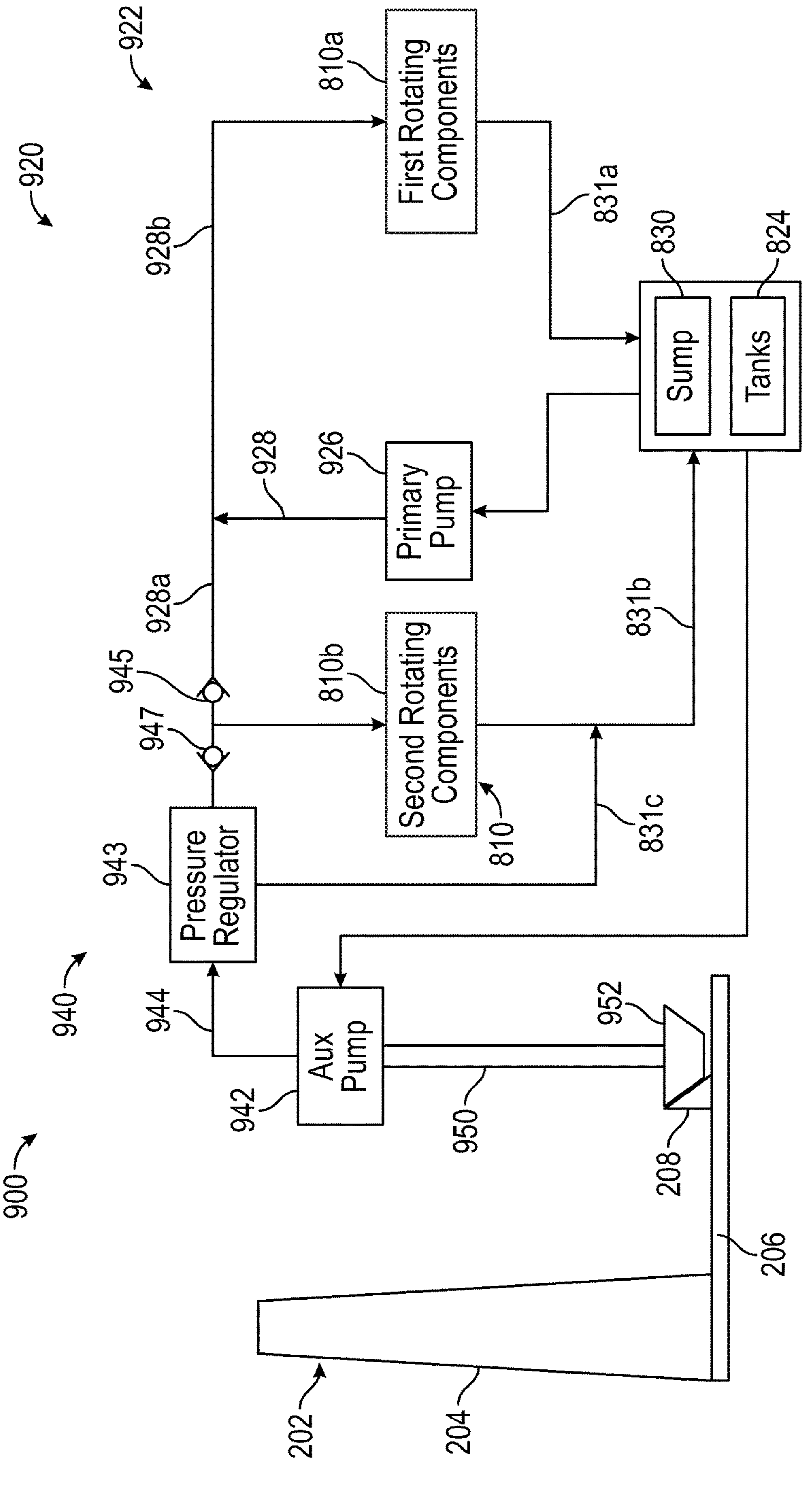
FIG. 9 is a schematic view of a turbine engine having a lubrication system, according to another embodiment.

FIG. 9 is a schematic view of a turbine engine 900 having a lubrication system 920, according to another embodiment. The turbine engine 900 can be utilized as the turbine engine 10 of FIG. 1. The turbine engine 900 and the lubrication system 920 include many of the same components or similar components as the turbine engine 800 and the lubrication system 820 of FIG. 8, respectively.

The lubrication system 920 includes a primary lubrication system 922 and an auxiliary lubrication system 940. The primary lubrication system 922 includes a primary pump 926 and a primary lubricant supply line 928. The primary lubricant supply line 928 includes a first primary lubricant supply line 928*a* and a second primary lubricant supply line 928*b*. The first primary lubricant supply line 928*a* is in fluid communication with the one or more tanks 824 and the one or more first rotating components 810*a*. The second primary lubricant supply line 928*b* is in fluid communication with the one or more tanks 824 and the one or more second rotating components 810*b*.

The auxiliary lubrication system 940 includes an aux pump 942, an auxiliary lubricant supply line 944, and a pressure regulator 943. The aux pump 942 is a bi-directional pump and includes a pump shaft 950 that is coupled to the fan shaft 206 via a pump shaft gear 952 that is intermeshed with the fan shaft gear 208. The auxiliary lubrication system 840 does not include a clutch. The auxiliary lubricant supply line 944 is in fluid communication with the one or more tanks 824 and the one or more second rotating components 810*b*. The lubrication system 920 also includes one or more valves 945, 947 including a first valve 945 and a second valve 947. The one or more valves 945, 947 are substantially similar as the one or more valves 245, 247 of FIG. 2.

The turbine engine 900 and the lubrication system 920 operate substantially similarly as do the turbine engine 800 and the lubrication system 820 of FIG. 8, respectively. During normal operation of the turbine engine 900, the primary lubrication system 922 supplies the lubricant from the one or more tanks 824 to the one or more first rotating components 810*a* and the one or more second rotating components 810*b*. For example, the primary pump 926 pumps the lubricant from the one or more tanks 824 to the one or more first rotating components 810*a* through the first primary lubricant supply line 928*a*. The primary pump 926 pumps the lubricant from the one or more tanks 824 to the one or more second rotating components 810*b* through the second primary lubricant supply line 928*b*. During normal operation of the turbine engine 900, the lubricant pressure of the lubricant in the primary lubrication system 922 opens the first valve 945 and closes the second valve 947 such that the lubricant flows to the one or more second rotating components 810*b*.

When the turbine engine 900 is not operating under normal operation (e.g., during windmilling or when the lubricant in the primary lubrication system 922 is less than the lubricant pressure threshold), the auxiliary lubrication system 940 supplies the lubricant from the one or more tanks 824 to the one or more second rotating components 810*b*. For example, the aux pump 942 pumps the lubricant from the one or more tanks 824 and the lubricant pressure of the lubricant in the auxiliary lubricant supply line 944 causes the second valve 947 to open and the first valve 945 to close. In this way, the lubricant flows to the one or more second rotating components 810*b* through the auxiliary lubricant supply line 944.

Figure 10:
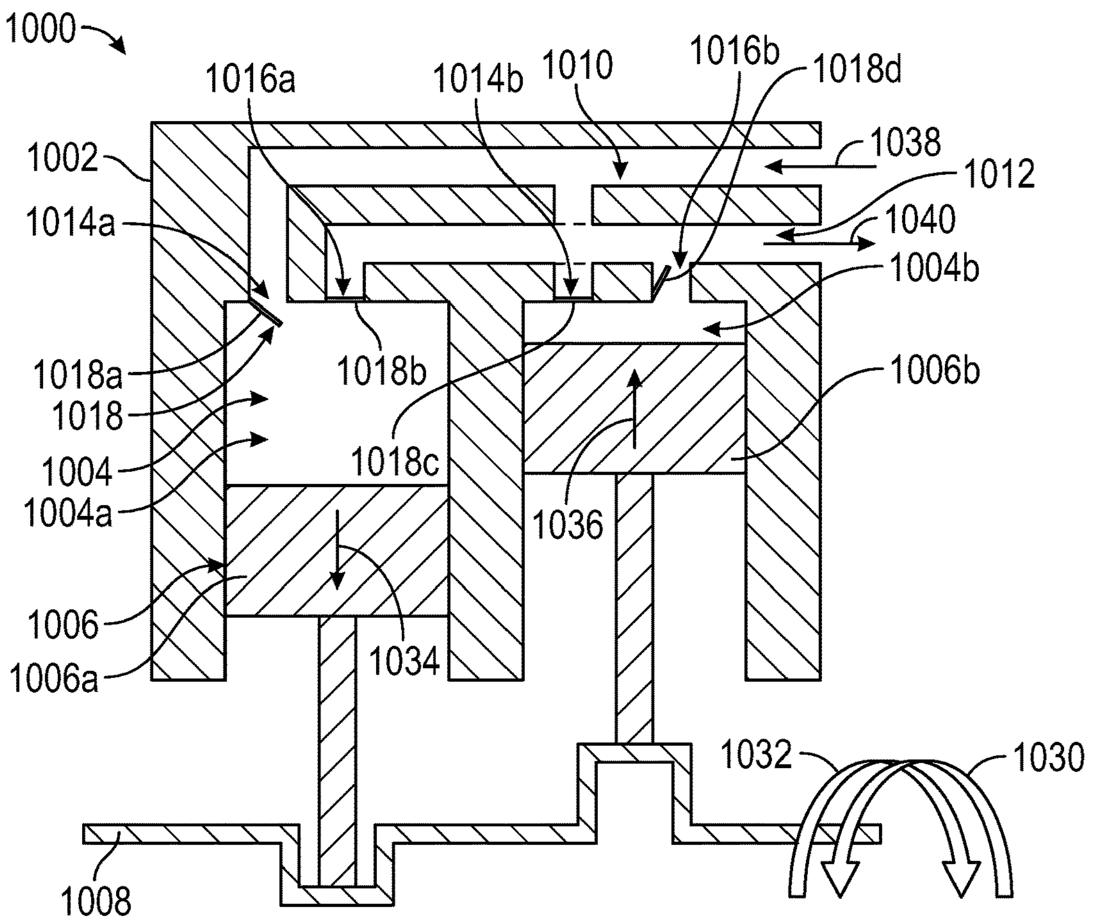
FIG. 10 is a schematic cross-sectional view of a bi-directional pump for a turbine engine, taken at a longitudinal centerline axis of the turbine engine, according to the present disclosure.

FIG. 10 is a schematic cross-sectional view of a bi-directional pump 1000 for a turbine engine, taken at a longitudinal centerline axis of the turbine engine, according to the present disclosure. The bi-directional pump 1000 can be utilized as any of the bi-directional pumps detailed herein.

The bi-directional pump 1000 includes a pump housing 1002 having a plurality of hollow interiors 1004, a plurality of pistons 1006, and a pump shaft 1008. The plurality of hollow interiors 1004 includes a first hollow interior 1004*a* and a second hollow interior 1004*b*. The plurality of pistons 1006 includes a first piston 1006*a* that is disposed in the first hollow interior 1004*a*, and a second piston 1006*b* that is disposed in the second hollow interior 1004*b*. The plurality of pistons 1006 is coupled to the pump shaft 1008. The pump shaft 1008 can be utilized as any of the pump shafts detailed herein. The plurality of pistons 1006 is coupled to the pump shaft 1008 such that the first piston 1006*a* is 180° out-of-phase with the second piston 1006*b*, as detailed further below. While the bi-directional pump 1000 includes two pistons 1006, the bi-directional pump 1000 can include any number of pistons 1006 of at least two or more. For example, the plurality of pistons 1006 can include three pistons that are 120° out-of-phase, four pistons that are 90° out-of-phase, or any number of pistons 1006 of at least two or more.

Increasing the number of pistons 1006 reduces a pump output ripple as the pistons pump the lubricant, but also increases a weight and a complexity of the bi-directional pump 1000.

The bi-directional pump 1000 includes an input flowpath 1010 and an output flowpath 1012. The input flowpath 1010 is in fluid communication with the first hollow interior 1004*a* and the second hollow interior 1004*b*. For example, the input flowpath 1010 includes a first inlet 1014*a* in fluid communication with the first hollow interior 1004*a*, and a second inlet 1014*b* in fluid communication with the second hollow interior 1004*b*. The output flowpath 1012 is in fluid communication with the first hollow interior 1004*a* and the second hollow interior 1004*b*. For example, the output flowpath 1012 includes a first outlet 1016*a* in fluid communication with the first hollow interior 1004*a*, and a second outlet 1016*b* in fluid communication with the second hollow interior 1004*b*.

The bi-directional pump 1000 includes a plurality of pump valves 1018. The plurality of pump valves 1018 are flapper valves, but can include any type of valve, such as, for example, check valves, or the like. The plurality of pump valves 1018 includes a first pump valve 1018*a*, a second pump valve 1018*b*, a third pump valve 1018*c*, and a fourth pump valve 1018*d*. The first pump valve 1018*a* is in fluid communication with the first inlet 1014*a*, the second pump valve 1018*b* is in fluid communication with the first outlet 1016*a*, the third pump valve 1018*c* is in fluid communication with the second inlet 1014*b*, and the fourth pump valve 1018*d* is in fluid communication with the second outlet 1016*b*.

In operation, the pump shaft 1008 rotates in a first pump rotational direction 1030. The first pump rotational direction 1030 corresponds to the fan rotational direction during operation of the turbine engine (e.g., any of the turbine engines detailed herein). The pump shaft 1008 can also rotate in a second pump rotational direction 1032. The second pump rotational direction 1032 is opposite the first pump rotational direction 1030. During windmilling, the pump shaft 1008 can rotate in either the first pump rotational direction 1030 or the second pump rotational direction 1032. As the pump shaft 1008 rotates, the plurality of pistons 1006 moves down (as indicated by arrow 1034) to draw the lubricant into the corresponding hollow interior 1004 from the input flowpath 1010, and moves up (as indicated by arrow 1036) to push the lubricant out of the hollow interior 1004 through the output flowpath 1012 and out of the bi-directional pump 1000. For example, as the pump shaft 1008 rotates, the first piston 1006*a* moves down, thereby causing the first pump valve 1018*a* to open and the second pump valve 1018*b* to close. In this way, the lubricant flows into the first hollow interior 1004*a* from the input flowpath 1010 (as indicated by arrow 1038) and through the first inlet 1014*a*, and the second pump valve 1018*b* prevents the lubricant from flowing through the first outlet 1016*a* into the output flowpath 1012. At the same time, the second piston 1006*b* moves up, thereby causing the third pump valve 1018*c* to close and the fourth pump valve 1018*d* to open. In this way, the lubricant flow out of the second hollow interior 1004*b* into the output flowpath 1012 through the second outlet 1016*b* (as indicated by arrow 1040), and the third pump valve 1018*c* prevents the lubricant from flowing through the second inlet 1014*b* into the input flowpath 1010.

As the pump shaft 1008 continues to rotate, the first piston 1006*a* moves up and the second piston 1006*b* moves down. The first piston 1006*a* moving up causes the first pump valve 1018*a* to close and the second pump valve 1018*b* to open. In this way, the lubricant flows out of the first hollow interior 1004*a* into the output flowpath 1012 through the first outlet 1016*a*, and the first pump valve 1018*a* prevents the lubricant from flowing through the first inlet 1014*a* into the input flowpath 1010. The second piston 1006*b* moving down causes the third pump valve 1018*c* to open and the fourth pump valve 1018*d* to close. In this way, the lubricant flow into the second hollow interior 1004*b* from the input flowpath 1010 through the second inlet 1014*b*, and the fourth pump valve 1018*d* prevents the lubricant from flowing through the second outlet 1016*b* into the output flowpath 1012. Accordingly, the bi-directional pump 1000 pumps the lubricant whether the pump shaft 1008 is rotating in the first pump rotational direction 1030 or the second pump rotational direction 1032.

Figure 11:
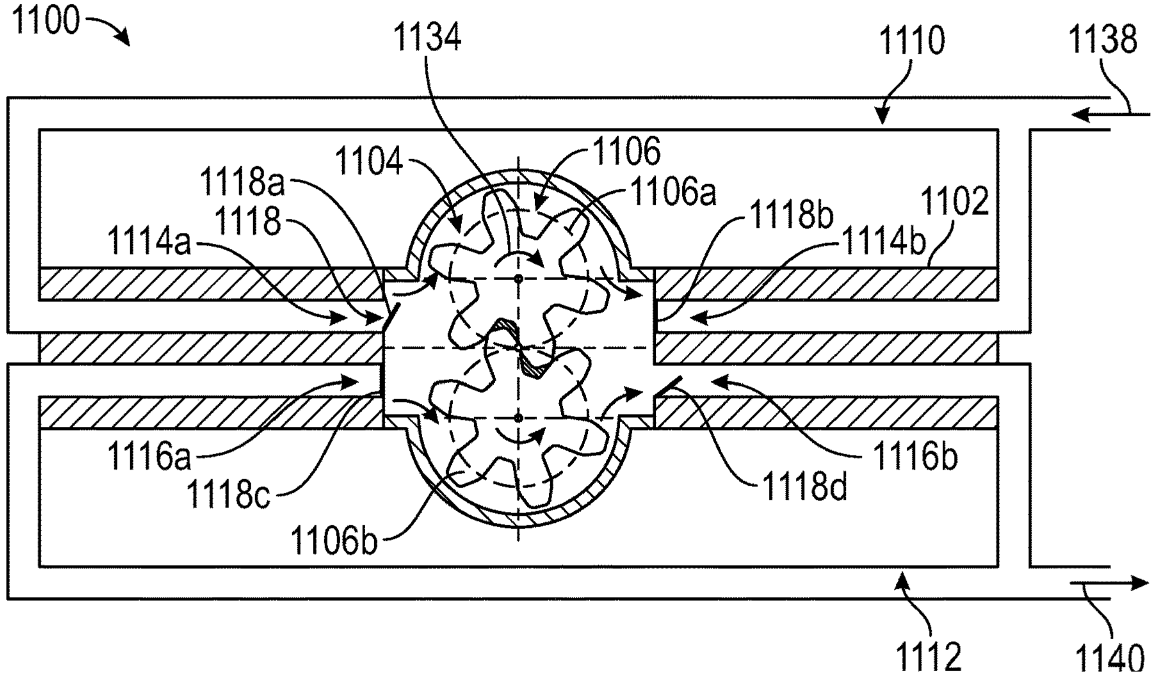
FIG. 11 is a schematic cross-sectional view of a bi-directional pump for a turbine engine, taken at a longitudinal centerline axis of the turbine engine, according to another embodiment.

FIG. 11 is a schematic cross-sectional view of a bi-directional pump 1100 for a turbine engine, taken at a longitudinal centerline axis of the turbine engine, according to another embodiment. The bi-directional pump 1100 can be utilized as any of the bi-directional pumps detailed herein. The bi-directional pump 1100 includes a pump housing 1102 having a hollow interior 1104, and a plurality of gears 1106. The bi-directional pump 1100 includes a pump shaft that is coupled to the plurality of gears 1106 and is not shown in the view of FIG. 11. The pump shaft of the bi-directional pump 1100 can be any of the pump shafts detailed herein.

The plurality of gears 1106 includes a first gear 1106*a* and a second gear 1106*b* that are disposed in the hollow interior 1104. While the bi-directional pump 1100 includes two gears 1106, the bi-directional pump 1100 can include any number of gears 1106 of at least two or more.

The bi-directional pump 1100 includes an input flowpath 1110 and an output flowpath 1112. The input flowpath 1110 and the output flowpath 1112 are in fluid communication with the hollow interior 1104. For example, the input flowpath 1110 includes a first inlet 1114*a* in fluid communication with the hollow interior 1104 and disposed at a first axial side of the hollow interior 1104, and a second inlet 1114*b* in fluid communication with the hollow interior 1104 and disposed at a second axial side of the hollow interior 1104. The output flowpath 1112 includes a first outlet 1116*a* in fluid communication with the hollow interior 1104 and disposed at the first axial side of the hollow interior 1104, and a second outlet 1116*b* in fluid communication with the hollow interior 1104 and disposed at the second axial side of the hollow interior 1104.

The bi-directional pump 1100 includes a plurality of pump valves 1118. The plurality of pump valves 1118 are flapper valves, but can include any type of valve, such as, for example, check valves, or the like. The plurality of pump valves 1118 includes a first pump valve 1118*a*, a second pump valve 1118*b*, a third pump valve 1118*c*, and a fourth pump valve 1118*d*. The first pump valve 1118*a* is in fluid communication with the first inlet 1114*a*, the second pump valve 1118*b* is in fluid communication with the first outlet 1116*a*, the third pump valve 1118*c* is in fluid communication with the second inlet 1114*b*, and the fourth pump valve 1118*d* is in fluid communication with the second outlet 1116*b*.

In operation, the pump shaft rotates in a first pump rotational direction and a second pump rotational direction, as detailed above. The first pump rotational direction 1030 corresponds to the fan rotational direction during operation of the turbine engine (e.g., any of the turbine engines detailed herein). As the pump shaft rotates (e.g., in either direction), the plurality of gears 1106 rotate in a first gear rotational direction 1134 to draw the lubricant from the input flowpath 1110 and into the hollow interior 1104 (as indicated by arrow 1138), and out of the hollow interior 1104 into the output flowpath 1112 (as indicated by arrow 1140). For example, as the pump shaft rotates, the rotation of the plurality of gears 1106 in the first gear rotational direction 1134 causes the first pump valve 1118*a* to open and the second pump valve 1118*b* to close. In this way, the lubricant flows into the hollow interior 1104 from the input flowpath 1110 and through the first inlet 1114*a*, and the second pump valve 1118*b* prevents the lubricant from flowing through the second inlet 1114*b* back into the input flowpath 1110. At the same time, the third pump valve 1118*c* closes and the fourth pump valve 1118*d* opens. In this way, the lubricant flows out of the hollow interior 1104 into the output flowpath 1112 through the second outlet 1116*b*, and the third pump valve 1018*c* prevents the lubricant from flowing through the first outlet 1016*a*.

The plurality of gears 1106 rotates in a second gear rotational direction (not depicted in FIG. 11) when the pump shaft rotates in the second pump rotational direction. The second gear rotational direction is opposite the first gear rotational direction 1134. The plurality of gears 1106 rotating in the second gear rotational direction causes the first pump valve 1118*a* and the fourth pump valve 1118*d* to close, and causes the second pump valve 1118*b* and the third pump valve 1118*c* to open. In this way, the lubricant flows into the hollow interior 1104 from the input flowpath 1110 and through the second inlet 1114*b*, and the first pump valve 1118*a* prevents the lubricant from flowing through the first inlet 1114*a* back into the input flowpath 1110. At the same time, the lubricant flows out of the hollow interior 1104 into the output flowpath 1112 through the first outlet 1116*a*, and the fourth pump valve 1118*d* prevents the lubricant from flowing through the second outlet 1116*b*. Accordingly, the bi-directional pump 1100 pumps the lubricant whether the pump shaft is rotating in the first pump rotational direction or the second pump rotational direction.

Figure 12:
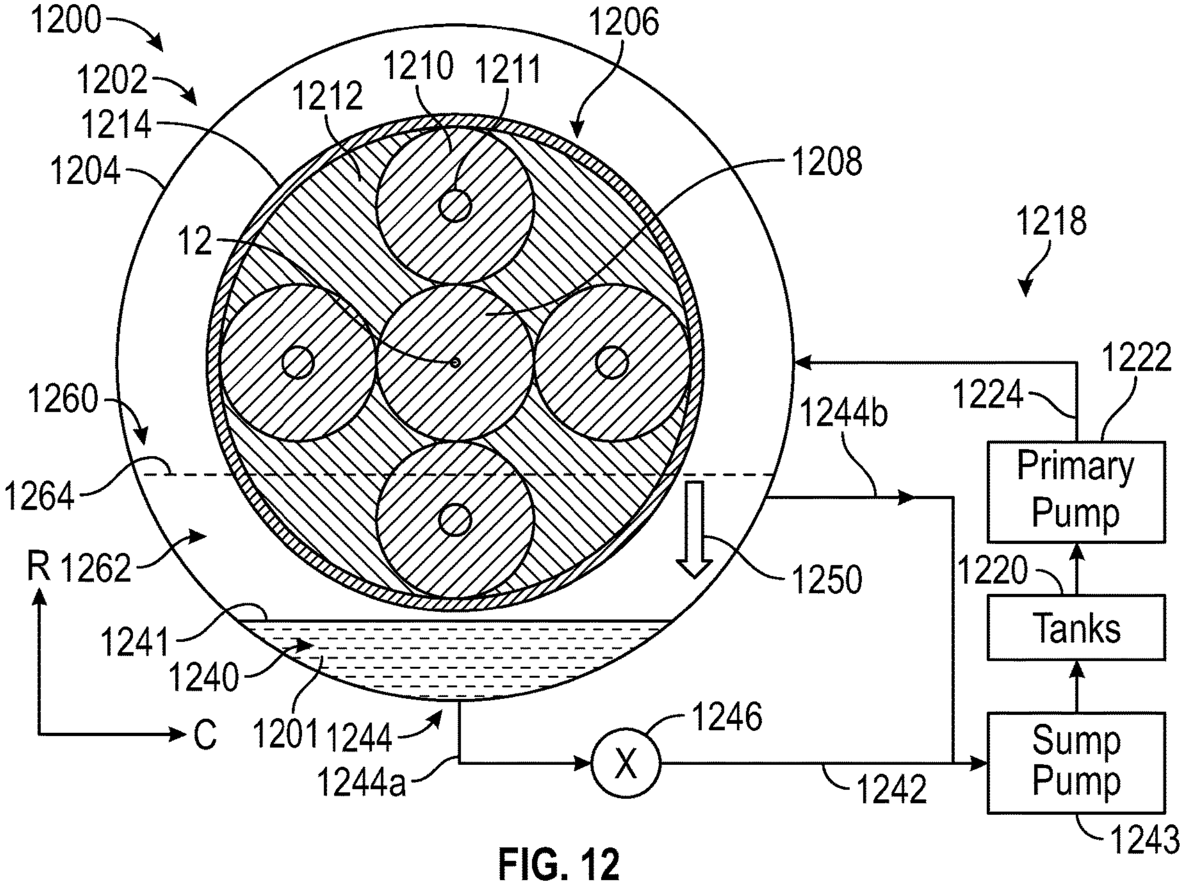
FIG. 12 is a schematic axial end cross-sectional view of a lubrication system for a gearbox assembly, taken along a latitudinal centerline axis of the gearbox assembly, according to the present disclosure.

FIG. 12 is a schematic axial end cross-sectional view of a lubrication system 1200 for a gearbox assembly 1202, according to the present disclosure. The lubrication system 1200 can be utilized in the turbine engine 10 (FIG. 1) as a separate embodiment of a lubrication system for the turbine engine 10 or can be utilized in combination with any of the lubrication systems detailed in FIGS. 2 to 9. The gearbox assembly 1202 includes a housing 1204 (e.g., shown schematically in FIG. 12) and a gear assembly 1206.

The gear assembly 1206 includes one or more gears including a first gear 1208, one or more second gears 1210 secured by a planet carrier 1212, and a third gear 1214 (collectively referred to as the gears of the gear assembly 1206). In FIG. 12, the first gear 1208 is a sun gear, the one or more second gears 1210 are planet gears, and the third gear 1214 is a ring gear. The gear assembly 1206 can be an epicyclic gear assembly. When the gear assembly 1206 is an epicyclic gear assembly, the one or more second gears 1210 include a plurality of second gears 1210 (e.g., two or more second gears 1210). For example, the one or more second gears 1210 include four second gears 1210 in FIG. 12, but can include any number of second gears 1210.

In the epicyclic gear assembly, the gear assembly 1206 can be in a star arrangement or a rotating ring gear type gear assembly (e.g., the third gear 1214 is rotating and the planet carrier 1212 is fixed and stationary). In such an arrangement, the fan 38 (FIG. 1) is driven by the third gear 1214. For example, the third gear 1214 is coupled to the fan shaft 45 (FIG. 1) such that rotation of the third gear 1214 causes the fan shaft 45, and, thus, the fan 38, to rotate. In this way, the third gear 1214 is an output of the gear assembly 1206. However, other suitable types of gear assemblies may be employed. In one non-limiting embodiment, the gear assembly 1206 is a planetary arrangement, in which the third gear 1214 is held fixed, with the planet carrier 1212 allowed to rotate. In such an arrangement, the fan 38 is driven by the planet carrier 1212. For example, the planet carrier 1212 is coupled to the fan shaft 45 (FIG. 1) such that rotation of the planet carrier 1212 causes the fan shaft 45, and, thus, the fan 38, to rotate. In this way, the one or more second gears 1210 (e.g., the planet carrier 1212) are the output of the gear assembly 1206. In another non-limiting embodiment, the gear assembly 1206 may be a differential gear assembly in which the third gear 1214 and the planet carrier 1212 are both allowed to rotate. While an epicyclic gear assembly is detailed herein, the gear assembly can include any type of gear assembly including, for example, a compound gear assembly, a multiple stage gear assembly, a gear assembly for driving a propeller, a gear assembly for driving accessories of the turbine engine 10 (FIG. 1) or accessories of the aircraft, or the like.

The one or more second gears 1210 each includes one or more bearings 1211 disposed therein. The one or more bearings 1211 enable the one or more second gears 1210 to rotate about the one or more bearings 1211 such that that one or more second gears 1210. The one or more bearings 1211 can include any type of bearing for a gear, such as, for example, journal bearings, roller bearings, or the like. The gears of the gearbox assembly 1202 and the one or more bearings 1211 are rotating components of the turbine engine.

The first gear 1208 is coupled to an input shaft of the turbine engine 10 (FIG. 1). For example, the first gear 1208 is coupled to the LP shaft 36 (FIG. 1) such that rotation of the LP shaft 36 causes the first gear 1208 to rotate. Radially outward of the first gear 1208, and intermeshing therewith, is the one or more second gears 1210 that are coupled together and supported by the planet carrier 1212 (shown schematically). The planet carrier 1212 supports and constrains the one or more second gears 1210 such that the each of the one or more second gears 1210 is enabled to rotate about a corresponding axis of each second gear 1210 without rotating about the periphery of the first gear 1208. Radially outwardly of the one or more second gears 1210, and intermeshing therewith, is the third gear 1214, which is an annular ring gear. The third gear 1214 is coupled via an output shaft to the fan 38 (FIG. 1) and rotates to drive rotation of the fan 38 (FIG. 1) about the longitudinal centerline axis 12. For example, the fan shaft 45 (FIG. 1) is coupled to the third gear 1214.

The gearbox assembly 1202 may be viewed with respect to a "clock" orientation having a twelve o'clock position, a three o'clock position, a six o'clock position, and a nine o'clock position, in the orientation of the gearbox assembly 46 in FIG. 12. Although not provided with reference numerals, the clock orientation is understood to include all clock positions therebetween.

The lubrication system 1200 includes one or more tanks 1220 that store lubricant 1201 therein and a primary lubrication system 1218 including a primary pump 1222 and a primary lubricant supply line 1224. Preferably, the lubricant 1201 is oil. The lubricant 1201 can be any type of lubricant for lubricating the rotating components, such as, for example, the gears (e.g., the first gear 1208, the one or more second gears 1210, or the third gear 1214) or the one or more bearings 1211 of the gear assembly 1206. The primary pump 1222 is in fluid communication with the one or more tanks

1220 and the primary lubricant supply line 1224. The primary lubricant supply line 1224 is in fluid communication with the gearbox assembly 1202. The primary pump 1222 pumps the lubricant 1201 from the one or more tanks 1220 to the gearbox assembly 1202 through the primary lubricant supply line 1224 for supplying the lubricant 1201 to the gear assembly 1206 (e.g., to the gears of the gear assembly 1206 or one or more bearings of the gear assembly 1206), as detailed further below. In some embodiments, the lubrication system 1200 supplies the lubricant 1201 from the one or more tanks 1220 to the gearbox assembly 1202 without a pump, for example, by gravity or by centrifugal force due to rotation of the planet carrier 1212 in the planetary arrangement of the gear assembly 1206.

The lubrication system 1200 includes a sump 1240 within the turbine engine 10 (FIG. 1) and in fluid communication with the gearbox assembly 1202. In one embodiment, the sump 1240 is located within the gearbox assembly 1202 (e.g., within the housing 1204). The sump 1240 is a reservoir that collects and stores the lubricant 1201 that drains from the rotating components (e.g., gear assembly 1206 or from the one or more bearings 1211 of the gear assembly 1206). The sump 1240 provides a primary reservoir that stores the lubricant 1201 at a first lubricant level 1241. The lubrication system 1200 also includes an auxiliary lubrication system 1260 including a secondary reservoir 1262 that stores the lubricant at a second lubricant level 1264, as detailed further below. The second lubricant level 1264 is greater than the first lubricant level 1241. The sump 1240 includes a sump line 1242 for draining the lubricant 1201 from the sump 1240. The sump line 1242, also referred to as a scavenge line, is in fluid communication with the sump 1240 and with the one or more tanks 1220. In this way, the lubricant 1201 drains from the sump 1240 and the sump line 1242 operably directs the lubricant 1201 to the one or more tanks 1220. In some embodiments, the lubrication system 1200 includes a sump pump 1243 in fluid communication with the sump 1240 and the sump line 1242. The sump pump 1243 pumps the lubricant 1201 and pumps air within the sump 1240 or the sump line 1242 that has leaked into the sump 1240 during operation of the turbine engine 10 (FIG. 1). The sump pump 1243 is a suction pump that generates suction to pull the lubricant 1201 or the air through the sump line 1242 and towards the one or more tanks 1220.

The sump line 1242 includes a plurality of drain ports 1244 that is in fluid communication with the sump 1240 or the secondary reservoir 1262. The plurality of drain ports 1244 enables the lubricant 1201 to drain from the gearbox assembly 1202 into the sump line 1242. The plurality of drain ports 1244 includes a first drain port 1244*a* and a second drain port 1244*b*. The first drain port 1244*a* is positioned at a bottom of the gearbox assembly 1202 (e.g., at a bottom of the sump 1240) such that the lubricant 1201 can drain from the sump 1240 via gravity. For example, the first drain port 1244*a* is positioned at approximately the six o'clock position of the gearbox assembly 1202. The second drain port 1244*b* is positioned radially above the first drain port 1244*a* and is in fluid communication with the secondary reservoir 1262. The second drain port 1244*b* is positioned approximately at the second lubricant level 1264 such that the lubricant 1201 drains through the second drain port 1244*b* at the second lubricant level 1264, as detailed further below. For example, the second drain port 1244*b* is positioned between the three o'clock position and a four o'clock position of the gearbox assembly 1202.

The sump line 1242 also includes one or more drain valves 1246 within the sump line 1242. The one or more drain valves 1246 are in communication with the controller 102 (FIG. 1). The controller 102 controls the one or more drain valves 1246 to open and to close the one or more drain valves 1246. When the one or more drain valves 1246 are open, the lubricant 1201 drains from the gearbox assembly 1202 through the sump line 1242 and into the one or more tanks 1220, as detailed further below. When the one or more drain valves 1246 are closed, the one or more drain valves 1246 prevent the lubricant 1201 from draining from the gearbox assembly 1202, as detailed further below. The one or more drain valves 1246 can include any type of valve that opens to allow the lubricant 1201 to flow through the sump line 1242 and that closes to prevent the lubricant 1201 from flowing through the sump line 1242. In some embodiments, the one or more drain valves 1246 are in fluid communication with the primary lubrication system 1218 and are controlled to be opened or to be closed based on a lubricant pressure signal of the lubricant 1201 in the primary lubrication system 1218 (e.g., in the primary lubricant supply line 1224).

In operation, the LP shaft 36 (FIG. 1) rotates, as detailed above, and causes the first gear 1208 to rotate. The first gear 1208, being intermeshed with the one or more second gears 1210, causes the one or more second gears 1210 to rotate about their corresponding axis of rotation. The one or more second gears 1210 rotate with respect to the one or more bearings 1211 within the planet carrier 1212. When the gear assembly 1206 is the star arrangement, the one or more second gears 1210, being intermeshed with the third gear 1214, cause the third gear 1214 to rotate about the longitudinal centerline axis 12. In such embodiments, the planet carrier 1212 remains stationary such that the one or more second gears 1210 do not rotate about the longitudinal centerline axis 12. When the gear assembly 1206 is the planetary arrangement, the third gear 1214 is stationary in and the planet carrier 1212, and the one or more second gears 1210, rotate about the longitudinal centerline axis 12. When the gear assembly 1206 is the differential gear assembly, both the planet carrier 1212 (e.g., the one or more second gears 1210) and the third gear 1214 rotate about the longitudinal centerline axis 12.

As the gears of the gear assembly 1206 rotate, the primary lubrication system 1218 supplies the lubricant 1201 to the rotating components (e.g., the gears or to the one or more bearings 1211) to lubricate the rotating components. During operation of the turbine engine 10 (FIG. 1), the primary pump 1222 pumps the lubricant 1201 from the one or more tanks 1220 and into the gearbox assembly 1202 through the primary lubricant supply line 1224. The primary lubrication system 1218 supplies the lubricant 1201 to the gears of the gear assembly 1206 and to the one or more bearings 1211. For example, the primary lubricant supply line 1224 is in fluid communication with the gears of the gear assembly 1206 and with the one or more bearings 1211.

The lubricant 1201 drains from the gear assembly 1206 and into the sump 1240 (as indicated by arrow 1250). During operation of the turbine engine 10, the lubricant 1201 fills the sump 1240 to the first lubricant level 1241. The first lubricant level 1241 is below the gear assembly 1206 such that the lubricant 1201 in the sump 1240 is prevented from contacting the gears of the gear assembly 1206 while the lubricant 1201 is stored in the sump 1240. The lubricant 1201 in the sump 1240 is drained from the sump 1240 through the sump line 1242. For example, the one or more drain valves 1246 are opened during operation of the turbine engine 10, and the primary pump 1222 (or the sump pump 1243 or a scavenge pump) pumps the lubricant 1201 from the sump 1240 through the sump line 1242 and re-circulates the lubricant 1201 through the primary lubrication system 1218 (e.g., through the primary lubricant supply line 1224) and the gearbox assembly 1202. In this way, the lubricant 1201 can be re-used to lubricate the gears of the gear assembly 1206 or the one or more bearings 1211 of the gear assembly 1206. The primary lubrication system 1218 can also supply the lubricant 1201 to other components of the gearbox assembly 1202, or to other components of the turbine engine 10 (FIG. 1) (e.g., other rotating components of the turbine engine 10).

In some instances, the primary lubrication system 1218 may be unable to provide the lubricant 1201 to the gearbox assembly 1202. For example, the primary lubrication system 1218 may be unable to pressurize the lubricant 1201 to supply the lubricant 1201 to the gearbox assembly 1202 during windmilling while the turbine engine 10 is shut down or during a failure of the turbine engine 10 or the primary lubrication system 1218 (e.g., the primary pump 1222 fails) while in-flight. In such instances, the windmilling may cause the shafts of the turbine engine 10 to rotate, thereby causing the gear assembly 1206 to rotate. The gears of the gear assembly 1206 or the one or more bearings 1211 can become damaged if there is not enough lubricant 1201 supplied to the gears or to the one or more bearings 1211.

Accordingly, during such instances, the auxiliary lubrication system 1260 activates to supply the lubricant 1201 to the rotating components (e.g., the gears of the gear assembly 1206 or the one or more bearings 1211). For example, the one or more the drain valves 1246 close such that the lubricant 1201 drains from the gear assembly 1206 (as indicated by the arrow 1250) and fills the secondary reservoir 1262 to the second lubricant level 1264. The second drain port **1244*b* drains the lubricant 1201 such that the second drain port 1244*b* ensures that the lubricant 1201 does not fill the secondary reservoir 1262 beyond the second lubricant level 1264. The second lubricant level 1264 is positioned such that the lubricant 1201 in the secondary reservoir 1262 contacts at least a portion of gears of the gear assembly 1206. For example, the lubricant 1201 in the secondary reservoir 1262 contacts at least a portion of the one or more second gears 1210. In this way, the gears of the gear assembly 1206 collect the lubricant 1201 in the secondary reservoir 1262 as the gears of the gear assembly 1206 rotate through the secondary reservoir 1262. For example, as the one or more second gears 1210 or the third gear 1214 rotates through the lubricant 1201 within the secondary reservoir 1262, at least a portion of the lubricant 1201 collects on the one or more second gears 1210 or the third gear 1214. The rotation of the gears of the gear assembly 1206 distributes the lubricant 1201 to the gears of the gear assembly 1206 and to the one or more bearings 1211. In this way, the auxiliary lubrication system 1260 supplies the lubricant 1201 to the gears of the gear assembly 1206 and to the one or more bearings 1211 even if the primary lubricant supply line 1224 loses lubricant pressure and the primary lubrication system 1218 is unable to supply the lubricant 1201 through the primary lubricant supply line 1224**.

The second lubricant level 1264 can be variable. For example, the secondary reservoir 1262 can be filled with lubricant 1201 to any level between the first lubricant level 1241 and the second lubricant level 1264 as long as the secondary reservoir 1262 is filled with enough lubricant 1201 such that at least one of the gears of the gear assembly 1206 contact the lubricant 1201 within the secondary reservoir 1262. The one or more drain valves 1246 open and close to vary the level of the second lubricant level 1264. For example, the one or more drain valves 1246 close to fill the secondary reservoir 1262 with the lubricant 1201, and can open to allow the lubricant 1201 to drain through the first drain port **1244*a* when the lubricant 1201 is at a desired level within the secondary reservoir 1262. In some embodiments, the auxiliary lubrication system 1260 includes a second drain valve in fluid communication with the second drain port 1244*b* such that the second drain port 1244*b* can be opened and closed separately from, or in combination with, the first drain port 1244*a***.

In some embodiments, the one or more drain valves 1246 are controlled by at least one of a lubricant pressure of the lubricant 1201, a fuel pressure of the fuel 67 (FIG. 1) in the turbine engine 10, or a hydraulic pressure of the hydraulic fluid in the hydraulic system 90 (FIG. 1) of the turbine engine 10 (e.g., hydraulic fluid for controlling control surfaces of the aircraft). For example, the one or more drain valves 1246 open when the at least one of the lubricant pressure of the lubricant 1201, the fuel pressure of the fuel 67 in the turbine engine 10, or the hydraulic pressure of the hydraulic fluid of the turbine engine 10 increases above a predetermined pressure threshold. The predetermined pressure threshold is determined based on a predetermined operating speed of the turbine engine 10 (e.g., a speed of the turbo-engine 16 or a speed of the fan 38). The one or more drain valves 1246 close when the at least one of the lubricant pressure of the lubricant 1201, the fuel pressure of the fuel 67 in the turbine engine 10, or the hydraulic pressure of the hydraulic fluid of the turbine engine 10 decreases below the predetermined pressure threshold. The at least one of the lubricant pressure of the lubricant 1201, the fuel pressure of the fuel 67 in the turbine engine 10, or the hydraulic pressure of the hydraulic fluid of the turbine engine 10 is based on a speed of the turbo-engine 16. For example, when a speed of the turbo-engine 16 (e.g., the HP shaft 34 or the LP shaft 36 of FIG. 1) is greater than a speed threshold, the at least one of the lubricant pressure of the lubricant 1201, the fuel pressure of the fuel 67 in the turbine engine 10, or the hydraulic pressure of the hydraulic fluid of the turbine engine 10 is greater than the predetermined pressure threshold. Similarly, when the speed of the turbo-engine 16 is less than the speed threshold, the at least one of the lubricant pressure of the lubricant 1201, the fuel pressure of the fuel 67 in the turbine engine 10, or the hydraulic pressure of the hydraulic fluid of the turbine engine 10 is less than the predetermined pressure threshold. In some embodiments, the speed threshold of the turbo-engine 16 is at least 5% of a maximum speed of the turbo-engine 16. In some embodiments, the speed threshold of the turbo-engine 16 is approximately 5% to approximately 10% of the maximum speed of the turbo-engine 16. The speed threshold can include any value up to the maximum speed of the turbo-engine 16 for determining when to open the one or more drain valves 1246.

In some embodiments, the one or more drain valves 1246 are controlled by the controller 102 (FIG. 1). For example, the controller 102 controls the one or more drain valves 1246 to open and to close the one or more drain valves 1246. In such embodiments, the one or more drain valves 1246 are electrically energized valves, such as, for example, a solenoid valve. In some embodiments, the one or more drain valves 1246 open when the controller 102 turns on, and the one or more drain valves 1246 close when the controller 102 turns off (e.g., during a shutdown of the turbine engine 10). The controller 102 turns on when the speed of the turbo-engine 16 greater than the speed threshold. The turbine engine 10 provides power to the controller 102 to turn the controller 102 on when the speed of the turbo-engine 16 is greater than the speed threshold. The controller 102 turns off when the speed of the turbo-engine 16 is less than the speed threshold.

Figure 13A:
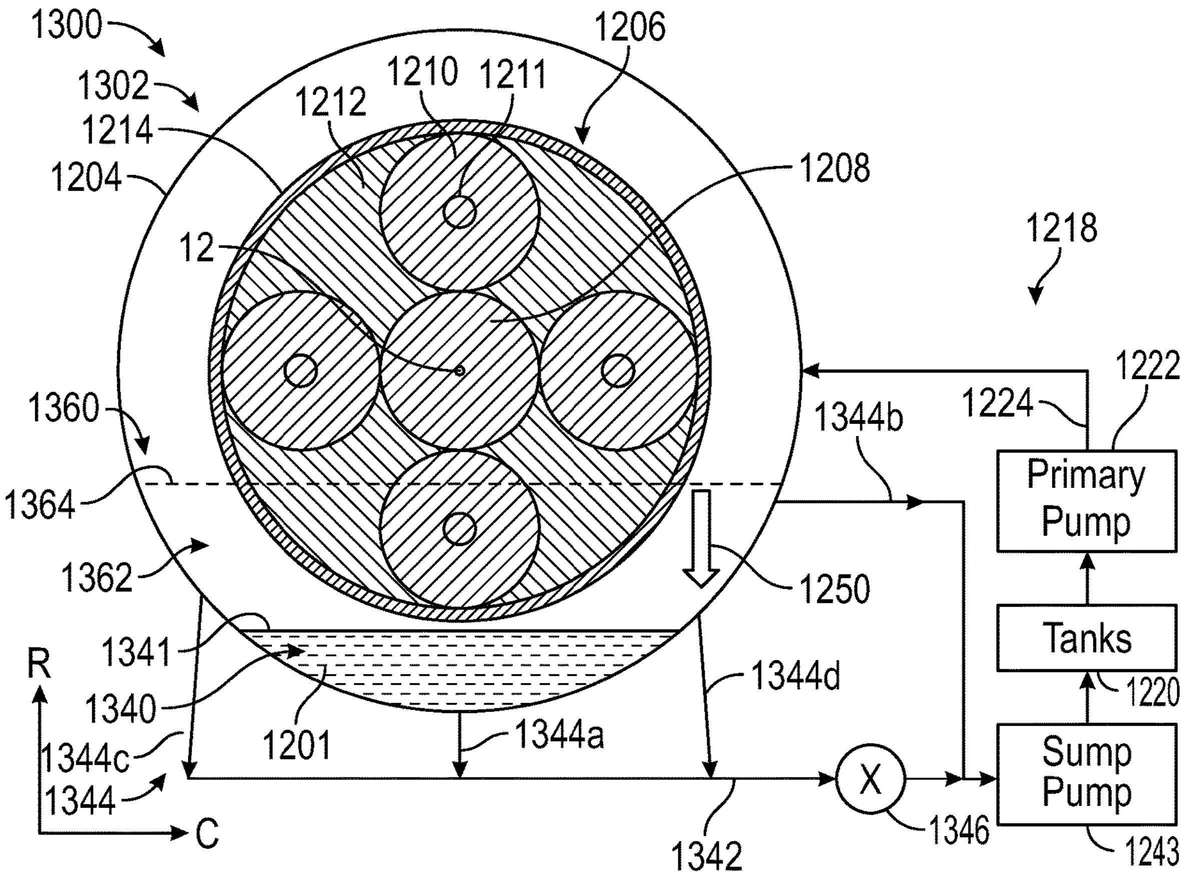
FIG. 13A is a schematic axial end cross-sectional view of a lubrication system for a gearbox assembly, according to another embodiment.
Figure 13B:
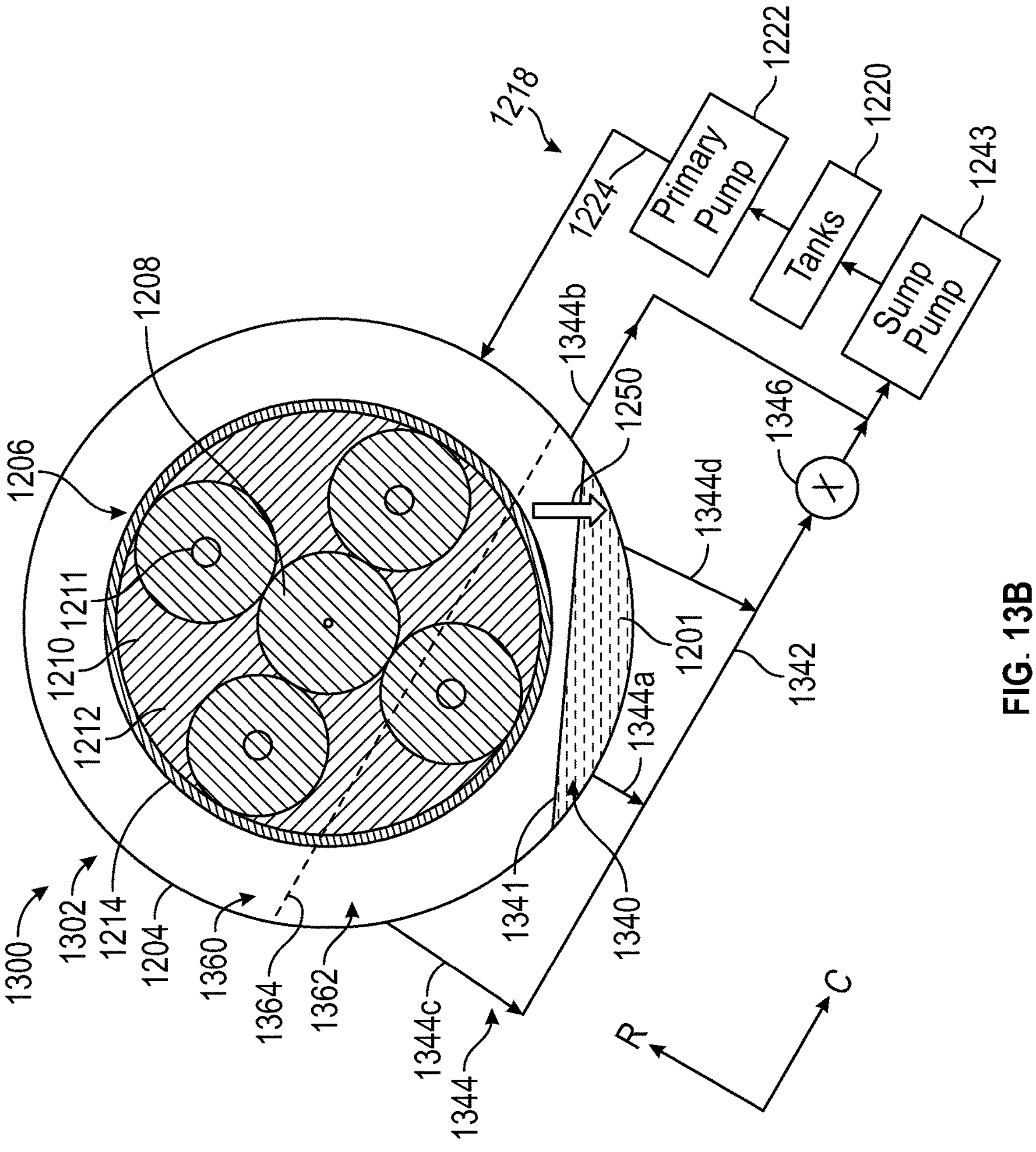
FIG. 13B is a schematic axial end cross-sectional view of the lubrication system for the gearbox assembly of FIG. 13A, according to another embodiment.
Figure 13C:
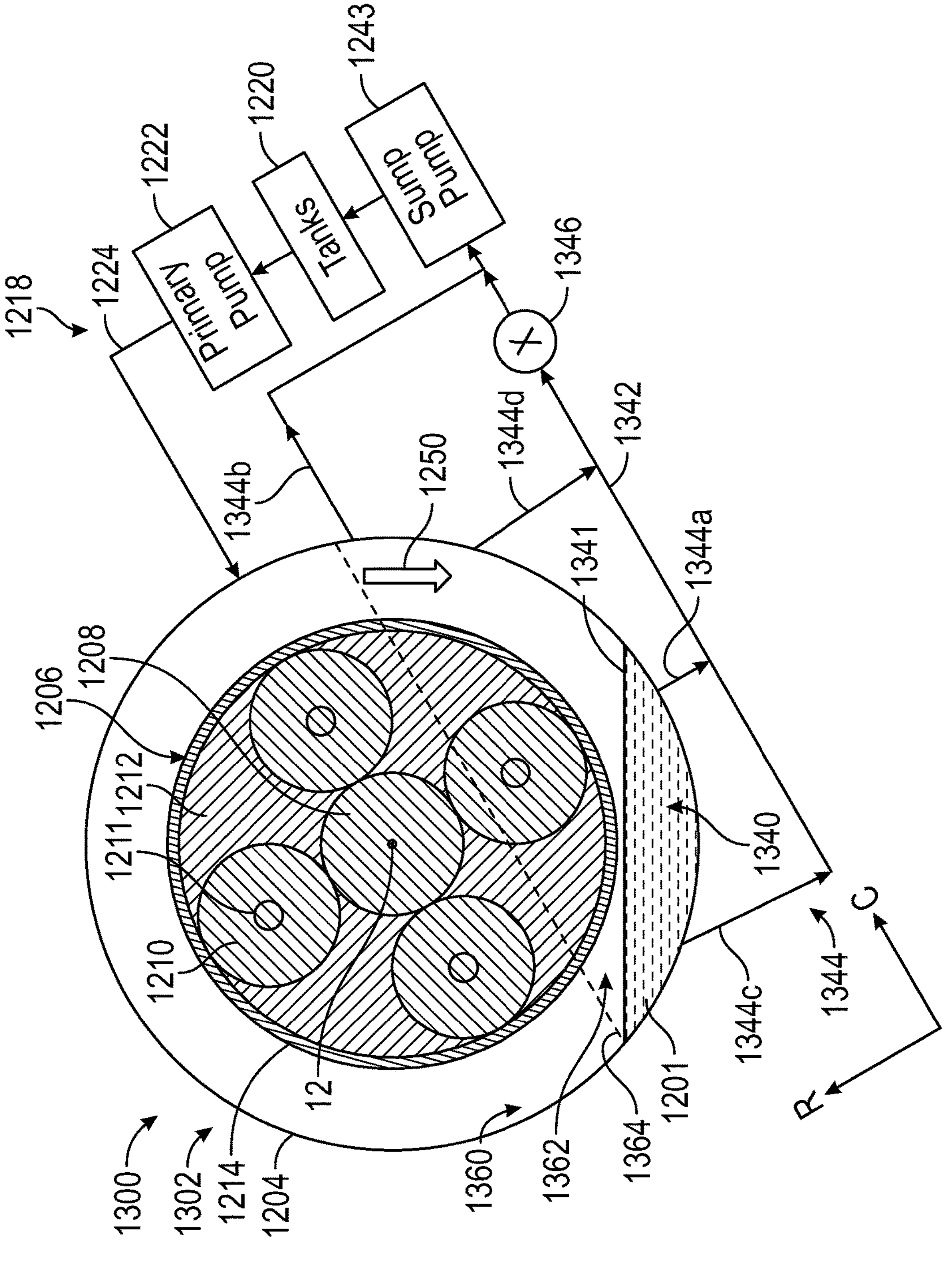
FIG. 13C is a schematic axial end cross-sectional view of the lubrication system for the gearbox assembly of FIG. 13A, according to another embodiment.

FIGS. 13A to 13C are schematic axial end cross-sectional views of a lubrication system 1300 for a gearbox assembly 1302, according to another embodiment. FIG. 13A shows the gearbox assembly 1302 in a first rotational position. FIG. 13B shows the gearbox assembly 1302 in a second rotational position. FIG. 13C shows the gearbox assembly 1302 in a third rotational position. The lubrication system 1300 and the gearbox assembly 1302 include many of the same components or similar components as the lubrication system 1200 and the gearbox assembly 1202 of FIG. 12, respectively.

The lubrication system 1300 includes a sump 1340 having a first lubricant level 1341, a sump line 1342, a plurality of drain ports 1344, one or more drain valves 1346, and an auxiliary lubrication system 1360 including a secondary reservoir 1362 having a second lubricant level 1364. The sump 1340 and the secondary reservoir 1362 are substantially similar to the sump 1240 and the secondary reservoir 1262 of FIG. 12, respectively. The plurality of drain ports 1344 includes a first drain port 1344*a*, a second drain port 1344*b*, a third drain port 1344*c*, and a fourth drain port 1344*d*. The first drain port 1344*a* and the second drain port 1344*b* are substantially similar to the first drain port 1244*a* and the second drain port 1244*b* of FIG. 12. For example, the first drain port 1344*a* is positioned at the bottom of the gearbox assembly 1302 (e.g., at a bottom of the sump 1340) and the second drain port 1344*b* is positioned radially above the first drain port 1344*a*. For example, the second drain port 1344*b* is positioned approximately at the second lubricant level 1364 such that the lubricant 1201 drains through the second drain port 1344*b* at the second lubricant level 1364. In this way, the first drain port 1344*a* is positioned approximately at the six o'clock position of the gearbox assembly 1302, and the second drain port 1344*b* is positioned between the three o'clock position and a four o'clock position of the gearbox assembly 1302.

The third drain port 1344*c* and the fourth drain port 1344*d* help to drain the lubricant 1201 from the sump 1340 or from the secondary reservoir 1362 when the gearbox assembly 1302 changes rotational position. The third drain port 1344*c* and the fourth drain port 1344*d* are positioned radially between the first drain port 1344*a* and the second drain port 1344*b*. The third drain port 1344*c* is positioned on a first circumferential side of the first drain port 1344*a* and the fourth drain port 1344*d* is positioned on a second circumferential side of the first drain port 1344*a*. For example, the third drain port 1344*c* is positioned between the six o'clock position and the nine o'clock position of the gearbox assembly 1302. The fourth drain port 1344*d* is positioned between the first drain port 1344*a* and the second drain port 1344*b*. For example, the fourth drain port 1344*d* is positioned between the six o'clock position and the three o'clock position of the gearbox assembly 1302.

The lubrication system 1300 and the gearbox assembly 1302 operate substantially similarly as do the lubrication system 1200 and the gearbox assembly 1202 of FIG. 12, respectively. The third drain port 1344*c* and the fourth drain port 1344*d* allow the lubricant 1201 to drain from the sump 1340 or from the secondary reservoir 1362 even if the gearbox assembly 1302 changes rotational position. For example, when the turbine engine (e.g., the turbine engine 10 of FIG. 1) powers an aircraft, the aircraft turns, banks, or rolls such that the turbine engine, and, thus, the gearbox assembly 1302 changes the rotational position. When the aircraft is operating at level flight (e.g., the aircraft is not turning, not banking, or not rolling), the gearbox assembly 1302 is in the first rotational position shown in FIG. 13A such that the six o'clock position of the gearbox assembly 1302 is substantially at the bottom of the gearbox assembly 1302. In such an orientation, the lubricant 1201 drains from the sump 1340 or from the secondary reservoir 1362 through the first drain port 1344*a* when the one or more drain valves 1346 are open.

When the aircraft turns, banks, or rolls left, the gearbox assembly 1302 is in the second rotational position shown in FIG. 13B such that the six o'clock position of the gearbox assembly 1302 rotates left (e.g., clockwise). In such an orientation, the fourth drain port 1344*d* is positioned at approximately the lowest point of the gearbox assembly 1302 such that the lubricant 1201 drains from the sump 1340 or from the secondary reservoir 1362 through the fourth drain port 1344*d* when the one or more drain valves 1346 are open. The lubricant 1201 can also drain through the first drain port 1344*a* in such a configuration if a level of the lubricant 1201 in the sump 1340 or in the secondary reservoir 1362 is at the first drain port 1344*a*. The lubricant 1201 can also drain through the second drain port 1344*b* in such a configuration if a level of the lubricant 1201 in the sump 1340 or in the secondary reservoir 1362 is at the fourth drain port 1344*d*.

When the aircraft turns, banks, or rolls right, the gearbox assembly 1302 is in the third rotational position shown in FIG. 13C such that the six o'clock position of the gearbox assembly 1302 rotates right (e.g., counterclockwise). In such an orientation, the third drain port 1344*c* is positioned at approximately the lowest point of the gearbox assembly 1302 such that the lubricant 1201 drains from the sump 1340 or from the secondary reservoir 1362 through the third drain port 1344*c* when the one or more drain valves 1346 are open. The lubricant 1201 can also drain through the first drain port 1344*a* in such a configuration if a level of the lubricant 1201 in the sump 1340 or in the secondary reservoir 1362 is at the first drain port 1344*a*.

Accordingly, the lubricant 1201 can drain through the sump line 1342 regardless of the rotational position of the gearbox assembly 1302. The plurality of drain ports 1344 can include any number of drain ports 1344 positioned between the second lubricant level 1364 and the first drain port 1344*a* for allowing the lubricant 1201 to drain from the sump 1340 or from the secondary reservoir 1362 in any rotational position of the gearbox assembly 1302. In some embodiments, each drain port 1344 includes a drain valve in fluid communication with the respective drain port 1344. In this way, the drain valve of each drain port 1344 can be opened to allow the lubricant 1201 to drain through the respective drain port 1344 and can be closed to prevent the lubricant 1201 from draining through the respective drain port 1344.

Figure 14:
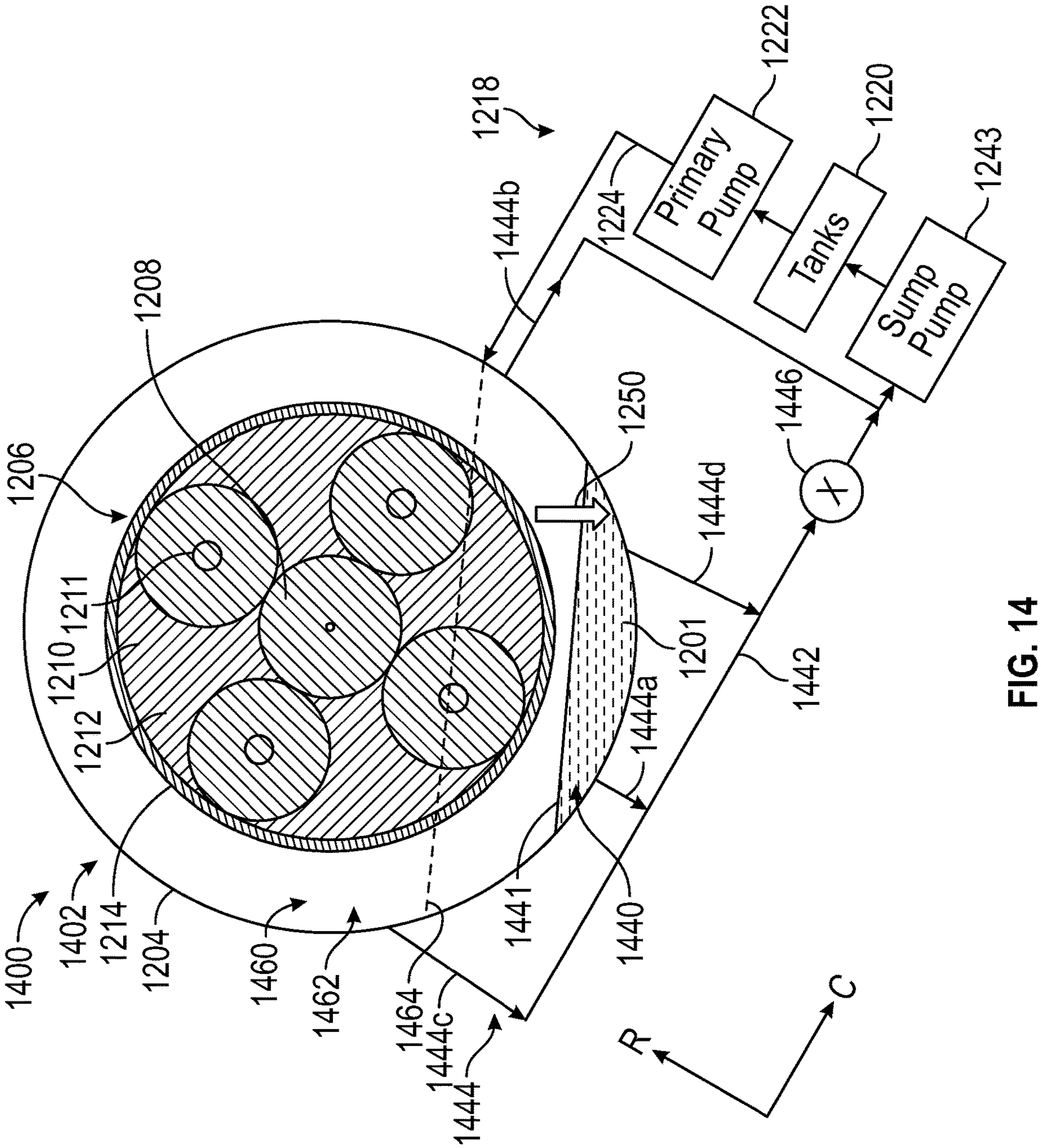
FIG. 14 is a schematic axial end cross-sectional view of a lubrication system for a gearbox assembly, according to another embodiment.

FIG. 14 is a schematic axial end cross-sectional view of a lubrication system 1400 for a gearbox assembly 1402, according to another embodiment. FIG. 14 shows the gearbox assembly 1402 in the second rotational position. The lubrication system 1400 and the gearbox assembly 1402 include many of the same components or similar components as the lubrication system 1300 and the gearbox assembly 1302 of FIGS. 13A to 13C, respectively.

The lubrication system 1400 includes a sump 1440 having a first lubricant level 1441, a sump line 1442, a plurality of drain ports 1444, one or more drain valves 1446, and an auxiliary lubrication system 1460 including a secondary reservoir 1462 having a second lubricant level 1464. The sump 1440 and the secondary reservoir 1462 are substantially similar to the sump 1340 and the secondary reservoir 1362 of FIGS. 13A to 13C, respectively. The plurality of drain ports 1444 includes a first drain port 1444*a*, a second drain port 1444*b*, a third drain port 1444*c*, and a fourth drain port 1444*d*. The first drain port 1444*a*, the third drain port 1444*c*, and the fourth drain port 1444*d* are substantially similar to the first drain port 1344*a*, the third drain port 1344*c*, and the fourth drain port 1344*d* of FIGS. 13A to 13C. A position of the second drain port 1444*b*, however, is different than the position of the second drain port 1344*b*, respectively, of FIGS. 13A to 13C. In particular, the second drain port 1444*b* is positioned approximately at the three o'clock position. Such a configuration helps to prevent the lubricant 1201 from draining from the gearbox assembly 1402 during an in-flight shutdown of the turbine engine (e.g., the turbine engine 10 of FIG. 1) while the turbine engine is windmilling and the gearbox assembly 1402 is in the second rotational position or in the third rotational position (e.g., the aircraft is turning, banking, or rolling left or right).

Figure 15A:
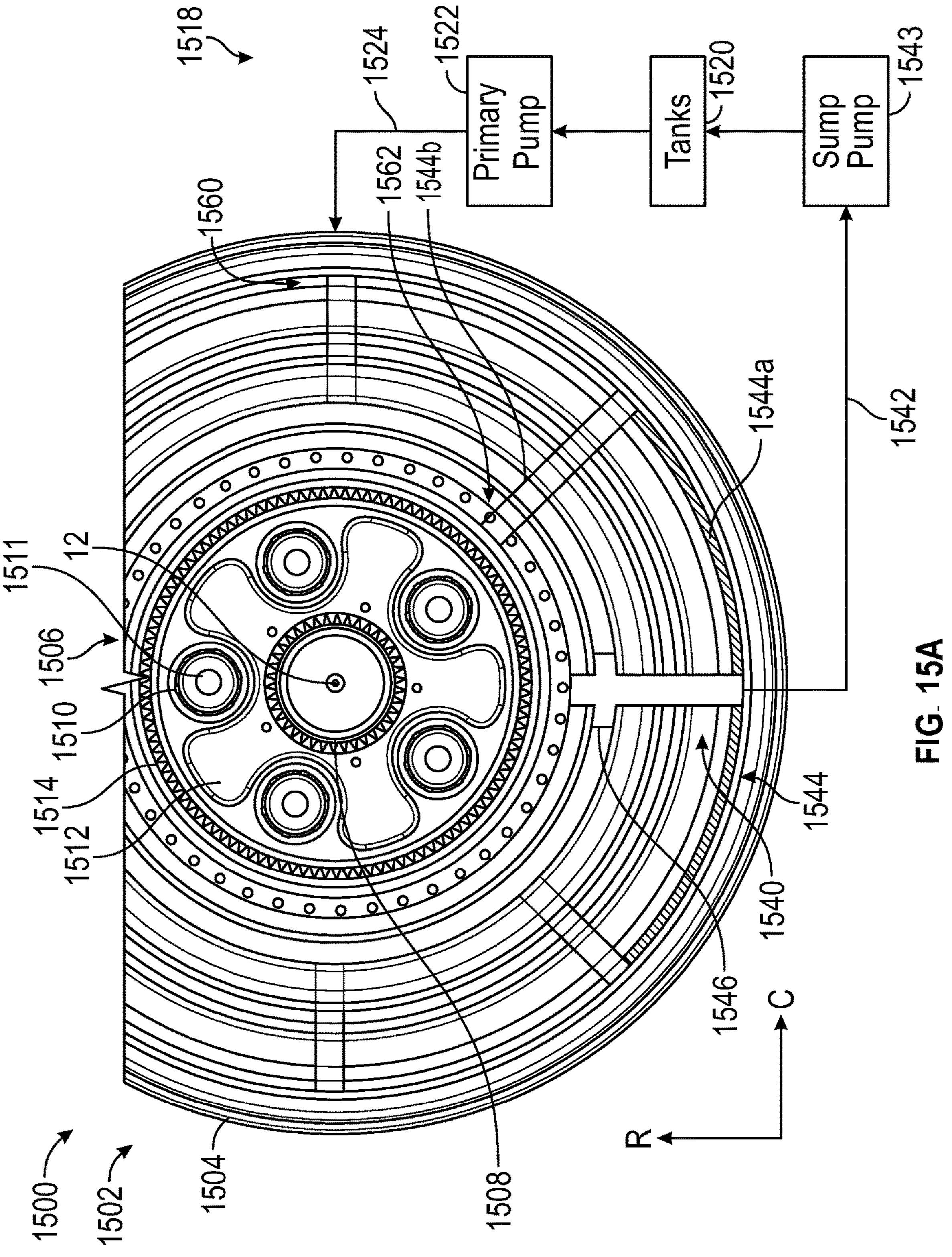
FIG. 15A is a schematic axial end cross-sectional view of a lubrication system for a gearbox assembly, according to another embodiment.
Figure 15B:
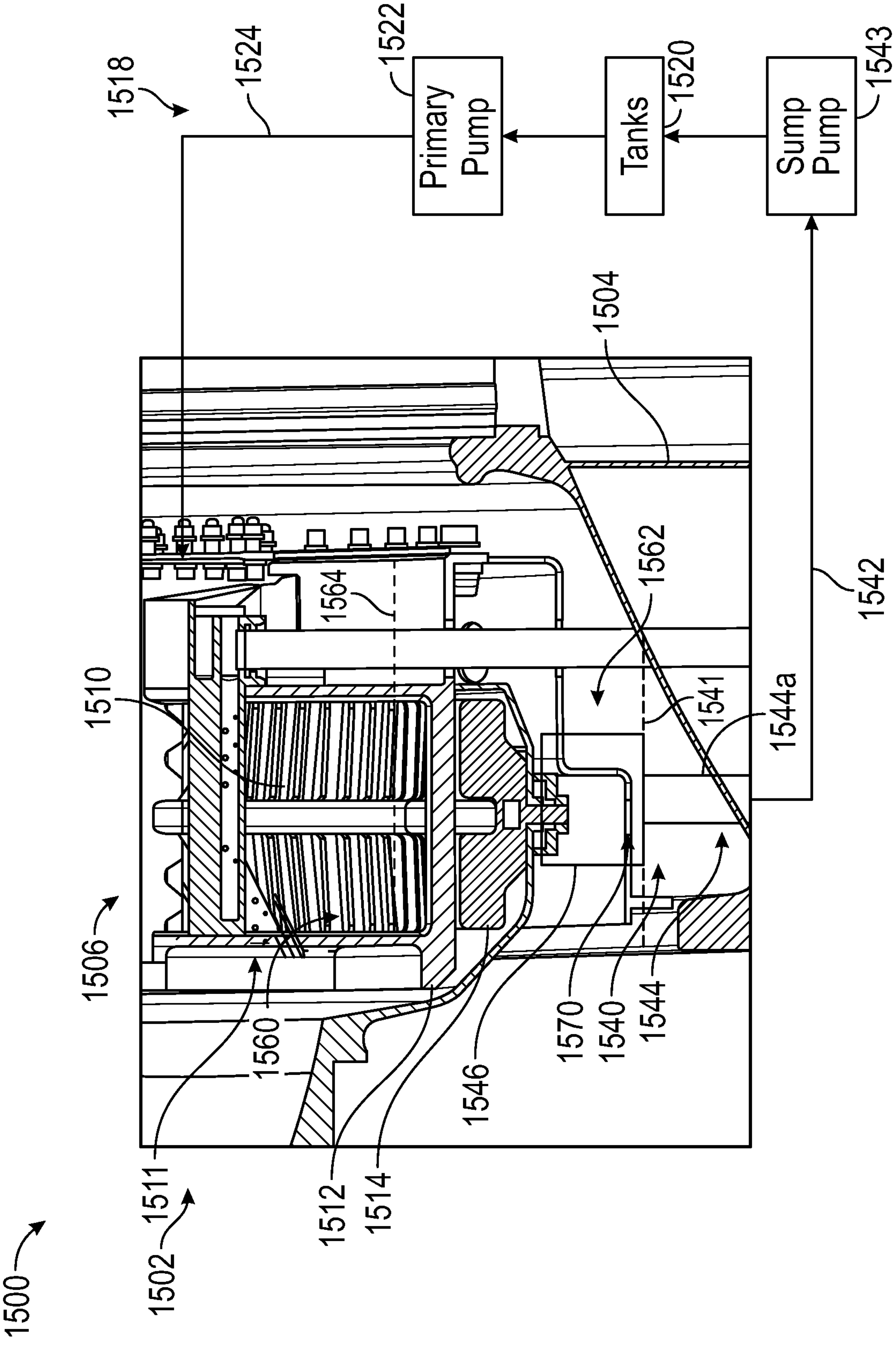
FIG. 15B is a schematic front side cross-sectional view of the lubrication system and the gearbox assembly of FIG. 15A, according to the present disclosure.

FIG. 15A is a schematic axial end cross-sectional view of a lubrication system 1500 for a gearbox assembly 1502, according to another embodiment. FIG. 15B is a schematic front side cross-sectional view of the lubrication system 1500 and the gearbox assembly 1502 of FIG. 15A, according to the present disclosure. The lubrication system 1500 and the gearbox assembly 1502 include many of the same components or similar components as the lubrication system 1200 and the gearbox assembly 1202 of FIG. 12, respectively.

The gearbox assembly 1502 includes a housing 1504 and a gear assembly 1506. The gear assembly 1506 includes a first gear 1508, one or more second gears 1510 secured by a planet carrier 1512, and a third gear 1514. Each of the one or more second gears 1510 rotates about one or more bearings 1511. In FIG. 15A, there are five second gears 1510. The lubrication system 1500 includes one or more tanks 1520 and a primary lubrication system 1518 including a primary pump 1522 and a primary lubricant supply line 1524. The lubrication system 1500 also includes a sump 1540 having a first lubricant level 1541, a sump line 1542, a sump pump 1543, a plurality of drain ports 1544, one or more drain valves 1546, and an auxiliary lubrication system 1560 including a secondary reservoir 1562 having a second lubricant level 1564 (FIG. 15B). The plurality of drain ports 1544 includes a first drain port 1544*a* and a second drain port 1544*b*. The first drain port 1544*a* is a strut drain that forms a portion of a strut. The lubrication system 1500 also includes a scavenge gutter 1570 that drains the lubricant 1201 that sprays off of the gears of the gear assembly 1506 as the gears rotate. The scavenge gutter 1570 includes one or more apertures in the planet carrier 1512 that operably direct the lubricant 1201 to the sump 1540. The lubrication system 1500 and the gearbox assembly 1502 operate substantially similarly as the lubrication system 1200 and the gearbox assembly 1202 of FIG. 12, respectively.

Figure 16:
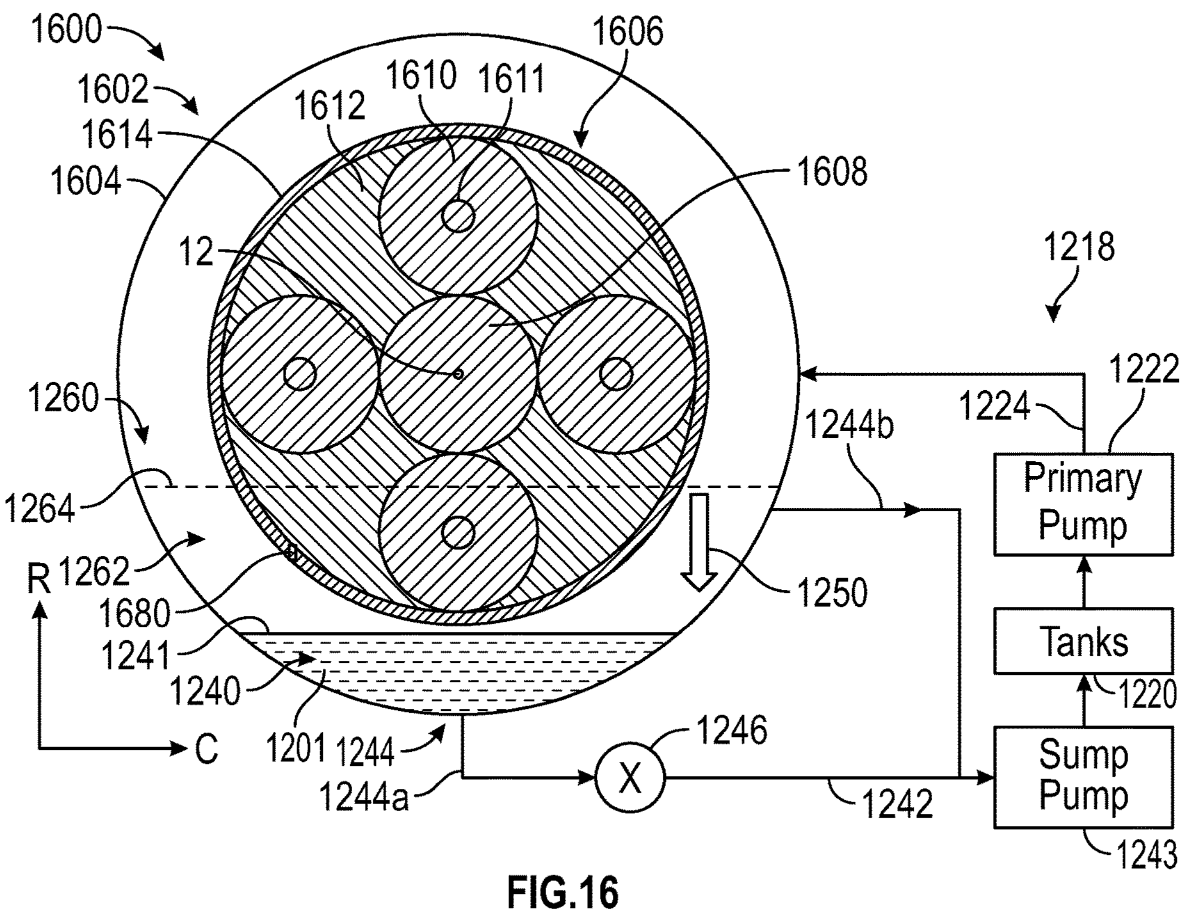
FIG. 16 is a schematic axial end cross-sectional view of a lubrication system for a gearbox assembly, according to another embodiment.

FIG. 16 is a schematic axial end cross-sectional view of a lubrication system 1600 for a gearbox assembly 1602, according to another embodiment. The lubrication system 1600 and the gearbox assembly 1602 include many of the same components or similar components as the lubrication system 1200 and the gearbox assembly 1202 of FIG. 12, respectively.

The gearbox assembly 1602 includes a housing 1604 and a gear assembly 1606. The gear assembly 1606 includes a first gear 1608, one or more second gears 1610 that are secured by a planet carrier 1612, and a third gear 1614. The one or more second gears include one or more bearings 1611 therein such that the one or more second gears 1610 rotate about the one or more bearings 1611. The lubrication system 1600 includes one or more scuppers 1680. The one or more scuppers 1680 are scoops that scoop the lubricant 1201 within the secondary reservoir 1262 onto one or more gears of the gear assembly 1606. The one or more scuppers 1680 are coupled to the third gear 1614. The lubrication system 1600 and the gearbox assembly 1602 operate substantially similarly as do the lubrication system 1200 and the gearbox assembly 1202 of FIG. 12, respectively.

The one or more scuppers 1680 rotate and, as the one or more scuppers 1680 rotate, the one or more scuppers 1680 pass through the lubricant 1201 within the secondary reservoir 1262 and scoop, or collect, a portion of the lubricant 1201 therein. Rotation of the third gear 1614 causes the one or more scuppers 1680 to rotate. The one or more scuppers 1680 continue to rotate after collecting the portion of the lubricant 1201 and distribute the lubricant 1201 to at least one of the gears of the gear assembly 1606.

Figure 17:
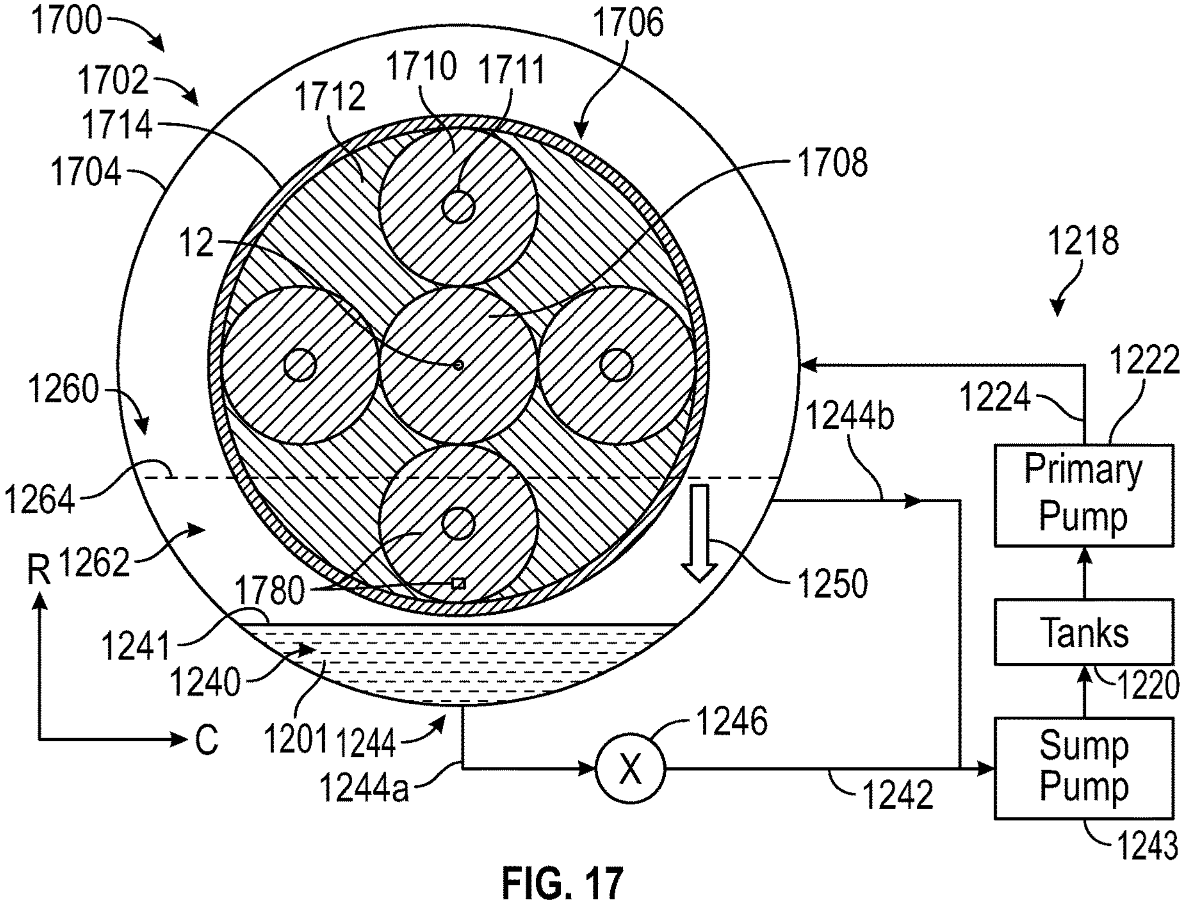
FIG. 17 is a schematic axial end cross-sectional view of a lubrication system for a gearbox assembly, according to another embodiment.

FIG. 17 is a schematic axial end cross-sectional view of a lubrication system 1700 for a gearbox assembly 1702, according to another embodiment. The lubrication system 1700 and the gearbox assembly 1702 include many of the same components or similar components as the lubrication system 1200 and the gearbox assembly 1202 of FIG. 12, respectively.

The gearbox assembly 1702 includes a housing 1704 and a gear assembly 1706. The gear assembly 1706 includes a first gear 1708, one or more second gears 1710 that are secured by a planet carrier 1712, and a third gear 1714. The one or more second gears include one or more bearings 1711 therein such that the one or more second gears 1710 rotate about the one or more bearings 1711. The lubrication system 1700 includes one or more scuppers 1780. The one or more scuppers 1780 are scoops that scoop the lubricant 1201 within the secondary reservoir 1262 onto one or more gears of the gear assembly 1706. The one or more scuppers 1780 are coupled to at least one of the one or more second gears 1710. The lubrication system 1700 and the gearbox assembly 1702 operate substantially similarly as do the lubrication system 1200 and the gearbox assembly 1202 of FIG. 12, respectively.

The one or more scuppers 1780 rotate and, as the one or more scuppers 1780 rotate, the one or more scuppers 1780 pass through the lubricant 1201 within the secondary reservoir 1262 and scoop, or collect, a portion of the lubricant 1201 therein. Rotation of the one or more second gears 1710 causes the one or more scuppers 1780 to rotate. The one or more scuppers 1780 continue to rotate after collecting the portion of the lubricant 1201 and distribute the lubricant 1201 to at least one of the gears of the gear assembly 1706.

Figure 18:
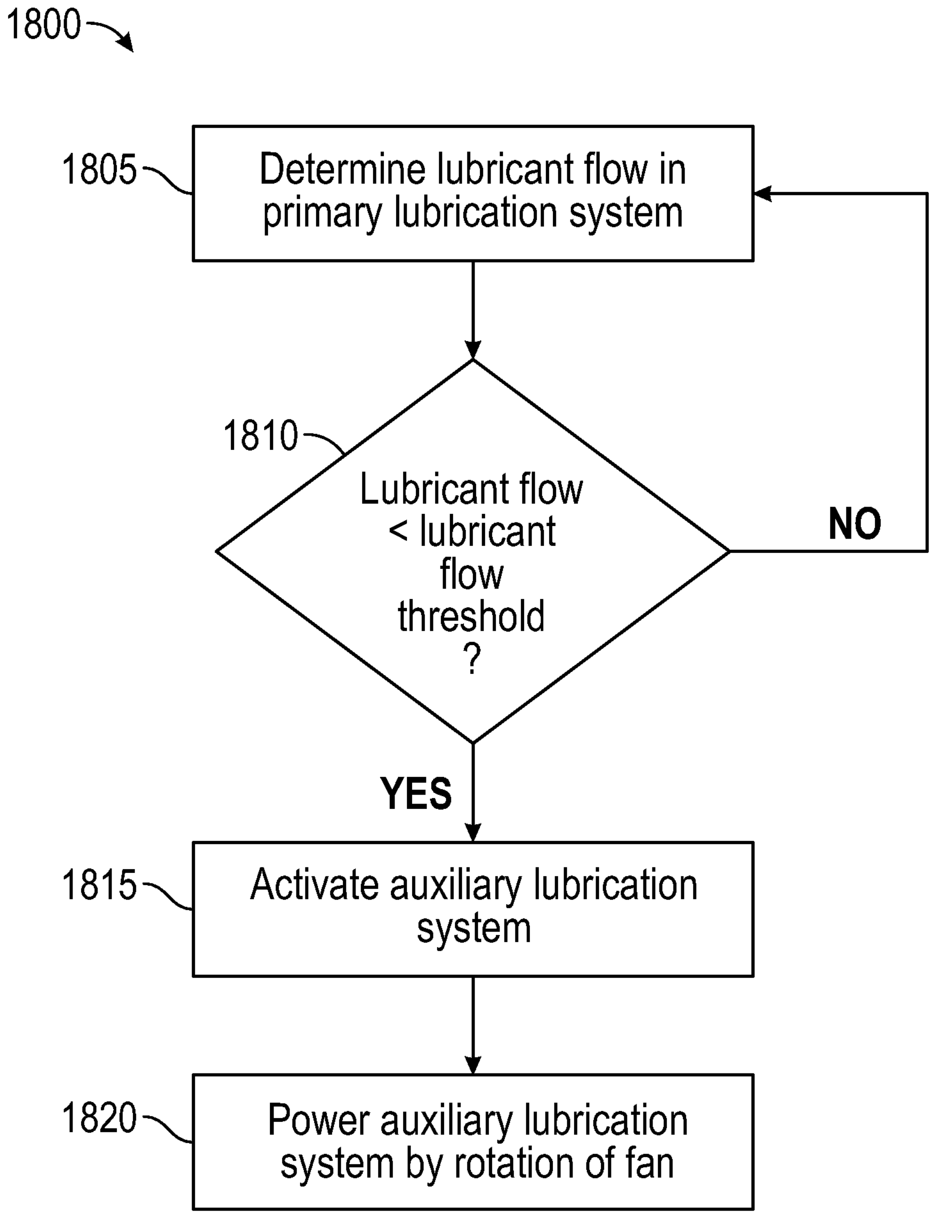
FIG. 18 is a flowchart depicting an exemplary method of operating a lubrication system for a turbine engine, according to the present disclosure.

FIG. 18 is a flowchart of a method 1800 of operating a lubrication system for a turbine engine, according to the present disclosure. The lubrication system can be any of the lubrication systems detailed herein. Further, the method 1800 can occur after the turbine engine has been shut down. In step 1805, the method 1800 includes determining a lubricant flow of lubricant in the primary lubrication system (e.g., any of the primary lubrication systems detailed herein). In one embodiment, step 1805 includes determining a lubricant pressure of the lubricant in the primary lubrication system. For example, the lubricant pressure of the lubricant in the primary lubrication system corresponds to the lubricant flow in the primary lubrication system. The method 1800 determines the lubricant pressure in the primary lubrication system by any of the methods detailed herein. For example, the method 1800 determines the lubricant pressure in the primary lubrication system by a primary pressure signal line, by one or more pressure sensors, or by any other method for determining the lubricant pressure of the lubricant in the primary lubrication system.

Step 1810 includes determining whether the lubricant flow is less than a lubricant flow threshold. The lubricant flow threshold can include a primary pressure threshold of the lubricant in the primary lubrication system. If the lubricant flow is greater than or equal to the lubricant flow threshold (e.g., the lubricant pressure of the lubricant in the primary lubrication system is greater than or equal to the primary pressure threshold), then the primary lubrication system is operating and supplying the lubricant to the rotating components. If the lubricant flow is less than the lubricant flow threshold (e.g., the lubricant pressure of the lubricant in the primary lubrication system is less than the primary pressure threshold), then the primary lubrication is not supplying lubricant, or not supplying an adequate amount of lubricant, to the rotating components. For example, the lubricant flow being less than the lubricant flow threshold indicates that there is an interruption of the lubricant flow in the primary lubrication system, that there is insufficient flow of the lubricant to the rotating components from the primary lubrication system, or that the primary lubrication system is inactive (e.g., during a shutdown of the turbine engine). The insufficient flow of the lubricant from the primary lubrication system can be due to, for example, an in-flight shutdown (IFSD), windmilling of the fan (e.g., on the ground or in the air with the turbine engine shut down), or other lubricant flow interruptions (e.g., loss of lubricant pressure of the lubricant in the primary lubrication system).

While the lubricant flow is determined based on the lubricant pressure of the lubricant in the primary lubrication system, the lubricant flow can be determined based on any parameter that corresponds to the lubricant flow in the primary lubrication system. In some embodiments, the method 1800 includes determining the lubricant flow based on a rotational speed of the turbo-engine (e.g., the turbo-engine 16 of FIG. 1). For example, the method 1800 can include determining a rotational speed of the HP shaft 34 (FIG. 1) or of the LP shaft 36 (FIG. 6). When the rotational speed of the turbo-engine is less than a turbo-engine rotational speed threshold, then the primary lubrication system is unable to provide a sufficient amount of lubricant to the rotating components to lubricate the rotating components.

In some embodiments, the method 1800 includes determining the lubricant flow based on a fuel pressure of the fuel 67 (FIG. 1) in the turbine engine 10 (FIG. 1). The method 1800 includes receiving an indication of the fuel pressure of the fuel 67 in the turbine engine 10. For example, the turbine engine 10 can include one or more fuel pressure sensors, or the like, for sensing the fuel pressure of the fuel 67 in the fuel system 80 (FIG. 1) of the turbine engine 10. The primary lubrication system will have insufficient lubricant flow if the fuel pressure of the fuel 67 in the turbine engine 10 is less than a fuel pressure threshold.

In some embodiments, the method 1800 includes determining the lubricant flow based on a hydraulic pressure of hydraulic fluid in the turbine engine 10. The method 1800 includes receiving an indication of the hydraulic pressure of the hydraulic fluid in the turbine engine 10. For example, the turbine engine 10 can include one or more hydraulic pressure sensors, or the like, for sensing the hydraulic pressure of the hydraulic fluid in the hydraulic system 90 (FIG. 1) of the turbine engine 10. The primary lubrication system will have insufficient lubricant flow if the hydraulic pressure of the hydraulic fluid in the turbine engine 10 is less than a hydraulic pressure threshold.

If the lubricant flow is greater than or equal to the lubricant flow threshold (step 1810: NO), then the method 1800 continues from step 1805 to determine the lubricant flow in the primary lubrication system. In step 1815, if the lubricant flow is less than the lubricant flow threshold (step 1810: YES), the method 1800 activates the auxiliary lubrication system (e.g., any of the auxiliary lubrication systems detailed herein). Activating the auxiliary lubrication system includes supplying the lubricant through the auxiliary lubrication system to the one or more rotating components. In some embodiments, activating the auxiliary lubrication system includes powering the auxiliary pump (e.g., any of the auxiliary pumps detailed herein) to pump the lubricant from the one or more tanks to the one or more rotating components. For example, the clutch (e.g., any of the clutches detailed herein) engage the pump shaft to power the auxiliary pump. In some embodiments, activating the auxiliary lubrication system includes closing the one or more drain valves (e.g., any of the drain valves disclosed herein) to fill the secondary reservoir.

Activating the auxiliary lubrication system can include active control of the auxiliary lubrication system via the controller. For example, the controller can control the auxiliary lubrication system to activate the auxiliary lubrication system (e.g., powering the auxiliary pump or closing the one or more drain valves) or passive control of the auxiliary lubrication system via a primary pressure signal line (e.g., any of the primary pressure signal lines detailed herein). In this way, the auxiliary lubrication system activates when the lubricant flow in the primary lubrication system is less than the lubricant flow threshold. The auxiliary lubrication system is inactive (e.g., the auxiliary pump is not powered or the one or more drain valves are open) when the lubricant flow is greater than the lubricant flow threshold. Thus, the auxiliary lubrication system only activates when the lubricant flow is less than the lubricant flow threshold, and the auxiliary lubrication system is otherwise inactive.

In step 1820, the method 1800 includes powering the auxiliary lubrication system by rotation of the fan (e.g., any of the fans detailed herein). For example, the auxiliary lubrication system is drivingly coupled to the fan of the turbine engine such that rotation of the fan powers the auxiliary lubrication system. In some embodiments, the auxiliary pump is coupled to the fan shaft such that the fan rotation causes the auxiliary pump to pump the lubricant, as detailed above with respect to FIGS. 2 to 9. In some embodiments, the rotation of the fan causes the gears of the gear assembly to rotate after the one or more drain valves close such that the lubricant drains into the secondary reservoir to fill the secondary reservoir, as detailed above with respect to FIGS. 12 to 17.

Powering the auxiliary lubrication system by rotation of the fan includes powering the auxiliary lubrication system in a first rotational direction of the fan, and powering the auxiliary lubrication system in a second rotational direction of the fan. The second rotational direction of the fan is opposite the first rotational direction. The first rotational direction is a rotational direction of the fan while the turbine engine is operating. The fan can rotate in the first rotational direction or the second rotational direction when the fan is windmilling. Thus, the method 1800 provides for powering the auxiliary lubrication system by rotation of the fan regardless of the rotational direction of the fan.

Accordingly, the present disclosure provides for supplying the lubricant to the one or more rotating components during a shutdown of the turbine engine or other loss of pressure scenarios (e.g., while the turbine engine is operating). The lubrication system herein supplies the lubricant during windmilling and loss of pressure scenarios regardless of a rotational direction of the fan. For example, the auxiliary lubrication system supplies the lubricant to the one or more rotating components whether the fan is rotating in a first rotational direction or in a second rotational direction that is opposite the first rotational direction. In some embodiments, the auxiliary lubrication system operates passively, for example, based on the lubricant pressure of the lubricant from the lubricant pressure signal line, and operates independently of the controller. In this way, the auxiliary lubrication system can operate even if there is a controller failure.

The lubrication system of FIGS. 12 to 17 herein supplies the lubricant during windmilling and loss of pressure scenarios without utilizing an additional pump, thereby reducing a weight of the turbine engine as compared to turbine engines without the benefit of the present disclosure. The secondary reservoir allows for lubricating the rotating components regardless of the rotation direction of the fan (e.g., clockwise or counterclockwise), and regardless of the rotational position of the gearbox assembly (e.g., when the aircraft is turning, banking, or rolling).

Further aspects of the present disclosure are provided by the subject matter of the following clauses.

A lubrication system for a turbine engine, the turbine engine including a fan having a fan shaft and one or more rotating components, the lubrication system comprising one or more tanks that store lubricant therein, a primary lubrication system supplying the lubricant from the one or more tanks to the one or more rotating components during normal operation of the turbine engine, and an auxiliary lubrication system comprising an auxiliary pump that is drivingly coupled to the fan shaft, the auxiliary lubrication system supplying the lubricant from the one or more tanks to the one or more rotating components based on a pressure of the lubricant in the primary lubrication system, wherein rotation of the fan shaft causes the auxiliary pump to pump the lubricant to the one or more rotating components.

The lubrication system of the preceding clause, the one or more rotating components being one or more bearings.

The lubrication system of any preceding clause, the turbine engine including a turbo-engine having one or more shafts, the one or more rotating components being the one or more shafts.

The lubrication system of any preceding clause, the one or more bearings being one or more engine bearings that allow rotation of the one or more shafts of the turbine engine.

The lubrication system of any preceding clause, the turbine engine including a gearbox assembly having a plurality of gears, the fan shaft being coupled to the turbo-engine through the gearbox assembly, the one or more rotating components being the plurality of gears.

The lubrication system of any preceding clause, the one or more bearings being one or more gearbox bearings of the gearbox assembly that allow rotation of the plurality of gears.

The lubrication system of any preceding clause, the auxiliary lubricant system supplying the lubricant to the one or more rotating components when the pressure of the lubricant in the primary lubrication system is less than a primary pressure threshold.

The lubrication system of any preceding clause, the auxiliary lubricant system being prevented from supplying the lubricant to the one or more rotating components when the pressure of the lubricant in the primary lubrication system is greater than a primary pressure threshold.

The lubrication system of any preceding clause, the primary lubrication system including a primary pump and a primary lubricant supply line, the primary pump pumping the lubricant from the one or more tanks to the one or more rotating components through the primary lubricant supply line.

The lubrication system of any preceding clause, further comprising a sump that collects the lubricant that drains from the one or more rotating components.

The lubrication system of any preceding clause, the sump being in fluid communication with the tank, the lubricant being supplied from the sump to the one or more tanks.

The lubrication system of any preceding clause, the auxiliary lubrication system comprising an auxiliary lubricant supply line, the auxiliary pump pumping the lubricant from the one or more tanks to the one or more rotating components through the auxiliary lubricant supply line.

The lubrication system of any preceding clause, further comprising one or more valves in fluid communication with the primary lubricant supply line and the auxiliary lubricant supply line.

The lubrication system of the preceding clause, the one or more valves including a first valve that opens to allow the lubricant to flow from the primary lubrication system to the one or more rotating components, and closes to prevent the lubricant from flowing from the primary lubrication system to the one or more rotating components.

The lubrication system of the preceding clause, the one or more valves including a second valve that opens to allow the lubricant to flow from the auxiliary lubrication system to the one or more rotating components, and closes to prevent the lubricant from flowing from the auxiliary lubrication system to the one or more rotating components.

The lubrication system of the preceding clause, the auxiliary pump including a pump shaft that is coupled to the fan shaft, rotation of the fan shaft causing the pump shaft to rotate such that the auxiliary pump pumps the lubricant.

The lubrication system of any preceding clause, the fan shaft including a fan shaft gear, and the pump shaft including a pump shaft gear that is intermeshed with the fan shaft gear.

The lubrication system of any preceding clause, the auxiliary pump being a bi-directional pump that pumps the lubricant to the one or more rotating components when the fan shaft rotates in a first rotational direction and when the fan shaft rotates in a second rotational direction that is opposite the first rotational direction.

The lubrication system of any preceding clause, the auxiliary lubrication system including a clutch that engages the pump shaft to operate the auxiliary pump or disengages the pump shaft to prevent operation of the auxiliary pump.

The lubrication system of any preceding clause, the clutch disengaging the pump shaft when the pressure of the lubricant in the primary lubrication system is greater than the primary pressure threshold.

The lubrication system of any preceding clause, the clutch engaging the pump shaft when the pressure of the lubricant in the primary lubrication system is less than the primary pressure threshold.

The lubrication system of any preceding clause, further comprising a lubricant pressure signal line that is in fluid communication with the primary lubrication system and the clutch, the lubricant pressure signal line causing the clutch to engage or to disengage based on the pressure of the lubricant in the primary lubrication system.

The lubrication system of any preceding clause, the clutch being coupled to a lubricant pressure switch that causes the clutch to engage or to disengage the pump shaft based on the pressure of the lubricant in the primary lubrication system.

The lubrication system of any preceding clause, the lubricant pressure switch closing to cause the clutch to disengage the pump shaft when the pressure of the lubricant in the primary lubrication system is greater than the primary pressure threshold.

The lubrication system of any preceding clause, the lubricant pressure switch opening to cause the clutch to engage the pump shaft when the pressure of the lubricant in the primary lubrication system is less than the primary pressure threshold.

The lubrication system of any preceding clause, further comprising a power supply in communication with the clutch and supplying power to the clutch to engage or to disengage the pump shaft.

The lubrication system of any preceding clause, the clutch disengaging the pump shaft when the power supply supplies power to the clutch.

The lubrication system of any preceding clause, the clutch engaging the pump shaft when the power supply does not provide power to the clutch.

The lubrication system of any preceding clause, further comprising a controller that is in communication with the clutch to engage or to disengage the pump shaft.

The lubrication system of any preceding clause, further comprising one or more pressure sensors that sense the pressure of the lubricant in the primary lubrication system.

The lubrication system of any preceding clause, the controller receiving the sensed pressure of the lubricant in the primary lubrication system from the one or more pressure sensors.

The lubrication system of any preceding clause, the controller controlling the clutch to disengage the pump shaft when the pressure of the lubricant in the primary lubrication system is greater than the primary pressure threshold.

The lubrication system of any preceding clause, the controller controlling the clutch to engage the pump shaft when the pressure of the lubricant in the primary lubrication system is less than the primary pressure threshold.

The lubrication system of any preceding clause, the controller being in communication with the lubricant pressure switch, the controller controlling the lubricant pressure switch to open or to close based on the pressure of the lubricant in the primary lubrication system.

The lubrication system of any preceding clause, further comprising a motor that powers the primary pump.

The lubrication system of any preceding clause, the motor being a hydraulic motor that is in fluid communication with the auxiliary pump through the auxiliary lubricant line, the auxiliary pump pumping the lubricant to the motor through the auxiliary lubricant line to power the motor, thereby causing the primary pump to pump the lubricant from the one or more tanks to the one or more rotating components.

The lubrication system of any preceding clause, further comprising a control signal switch that causes the clutch to engage or to disengage based on a control signal from the controller.

The lubrication system of any preceding clause, the control signal switch causing the clutch to disengage the pump shaft when the control signal switch receives a control signal from the controller.

The lubrication system of any preceding clause, the control signal switch causing the clutch to engage the pump shaft when the control signal switch does not receive the control signal from the controller.

The lubrication system of any preceding clause, the clutch being a centrifugal clutch that engages or disengages based on a rotational speed of the fan.

The lubrication system of any preceding clause, the clutch disengaging the pump shaft when the rotational speed of the fan is greater than a fan speed threshold.

The lubrication system of any preceding clause, the clutch engaging the pump shaft when the rotational speed of the fan is less than the fan speed threshold.

The lubrication system of any preceding clause, the auxiliary pump being a uni-directional pump that pumps the lubricant to the one or more rotating components based on a single rotational direction of the pump shaft.

The lubrication system of any preceding clause, the clutch being a first clutch, the lubrication system further comprising a second clutch and a third clutch, the second clutch and the third clutch being one-way clutches that rotate in opposite directions.

The lubrication system of any preceding clause, the third clutch being coupled to a reversing gear that reverses a rotational direction of the third clutch to the rotational direction of the pump shaft.

The lubrication system of any preceding clause, the second clutch and the third clutch being sprag clutches.

The lubrication system of any preceding clause, the one or more rotating components including one or more first rotating components and one or more second rotating components, the primary lubrication system supplying the lubricant to the one or more first rotating components, and the auxiliary lubrication system supplying the lubricant to the one or more second rotating components.

The lubrication system of any preceding clause, the auxiliary lubrication system comprising a pressure regulator, the pressure regulator directing at least a portion of the lubricant to the one or more tanks to bypass the one or more second rotating components during normal operation of the turbine engine.

The lubrication system of any preceding clause, the pressure regulator directing substantially all of the lubricant in the auxiliary lubrication system to the one or more second rotating components when the pressure of the lubricant in the primary lubrication system is less than the primary pressure threshold.

The lubrication system of any preceding clause, the one or more first rotating components being one or more engine bearings.

The lubrication system of any preceding clause, the one or more second rotating components being one or more gearbox bearings.

The lubrication system of any preceding clause, the auxiliary pump being a bi-directional pump.

The lubrication system of the preceding clause, the bi-directional pump including a first hollow interior and a second hollow interior, and a first piston within the first hollow interior and a second piston within the second hollow interior.

The lubrication system of the preceding clause, the first piston and the second piston being coupled to the pump shaft such that rotation of the pump shaft causes the first piston and the second piston to move up or to move down.

The lubrication system of any preceding clause, the bi-directional pump including an input flowpath having a first inlet in fluid communication with the first hollow interior and a second inlet in fluid communication with the second hollow interior.

The lubrication system of any preceding clause, the bi-directional pump including an output flowpath having a first outlet in fluid communication with the first hollow interior and a second outlet in fluid communication with the second hollow interior.

The lubrication system of any preceding clause, the bi-directional pump including a plurality of pump valves including a first valve in fluid communication with the first inlet, a second valve in fluid communication with the first outlet, a third valve in fluid communication with the second inlet, and a fourth valve in fluid communication with the second outlet.

The lubrication system of any preceding clause, the first valve opening to allow the lubricant to flow into the first hollow interior through the first inlet when the first piston moves down.

The lubrication system of any preceding clause, the second valve opening to allow the lubricant to flow into the outlet flowpath and out of the first hollow interior through the first outlet when the first piston moves up.

The lubrication system of any preceding clause, the third valve opening to allow the lubricant to flow into the second hollow interior through the second inlet when the second piston moves down.

The lubrication system of any preceding clause, the fourth valve opening to allow the lubricant to flow into the outlet flowpath and out of the second hollow interior through the second outlet when the second piston moves up.

The lubrication system of any preceding clause, the bi-directional pump including a hollow interior and a plurality of gears disposed within the hollow interior.

The lubrication system of any preceding clause, the bi-directional pump including a first inlet and a first outlet disposed at a first axial side of the hollow interior.

The lubrication system of any preceding clause, the bi-directional pump including a second inlet and a second outlet disposed at a second axial side of the hollow interior.

The lubrication system of any preceding clause, the bi-directional pump including a plurality of pump valves including a first pump valve in fluid communication with the first inlet, a second pump valve in fluid communication with the second inlet, a third pump valve in fluid communication with the first outlet, and a fourth pump valve in fluid communication with the second outlet.

The lubrication system of the preceding clause, the first pump valve and the fourth pump valve opening and the second pump valve and the third pump valve closing to allow the lubricant to flow from the input flowpath to the outlet flowpath through the first inlet and the second outlet when the fan rotates in a first rotational direction.

The lubrication system of any preceding clause, the second pump valve and the third pump valve opening and the first pump valve and the fourth pump valve closing to allow the lubricant to flow from the input flowpath to the outlet flowpath through the second inlet and the first outlet when the fan rotates in a second rotational direction.

A turbine engine comprising a fan and a turbo-engine, and a lubrication system. The fan is coupled to the turbo-engine. The turbine engine comprises one or more rotating components. The lubrication system being the lubrication system of any preceding clause.

A method of operating the lubrication system of any preceding clause, the method comprising supplying the lubricant through the primary lubrication system to the one or more rotating components during normal operation of the turbine engine, and supplying the lubricant through the auxiliary lubrication system to the one or more rotating components when a pressure of the lubricant in the primary lubrication system is less than a primary pressure threshold.

The method of the preceding clause, the one or more rotating components being one or more bearings.

The method of any preceding clause, the turbine engine including a turbo-engine having one or more shafts, the one or more rotating components being the one or more shafts.

The method of any preceding clause, the one or more bearings being one or more engine bearings that allow rotation of the one or more shafts of the turbine engine.

The method of any preceding clause, the turbine engine including a gearbox assembly having a plurality of gears, the fan shaft being coupled to the turbo-engine through the gearbox assembly, the one or more rotating components being the plurality of gears.

The method of the preceding clause, further comprising supplying the lubricant through the auxiliary lubrication system to the one or more rotating components when the pressure of the lubricant in the primary lubrication system is less than a primary pressure threshold.

The method any preceding clause, further comprising preventing the auxiliary lubricant system from supplying the lubricant to the one or more rotating components when the pressure of the lubricant in the primary lubrication system is greater than a primary pressure threshold.

The method of any preceding clause, the primary lubrication system including a primary pump and a primary lubricant supply line, the method further comprising pumping, with the primary pump, the lubricant from the one or more tanks to the one or more rotating components through the primary lubricant supply line.

The method of any preceding clause, further comprising collecting, with a sump, the lubricant that drains from the one or more rotating components.

The method of any preceding clause, further comprising supplying the lubricant from the sump to the one or more tanks.

The method of any preceding clause, the auxiliary lubrication system comprising an auxiliary lubricant supply line, the method further comprising pumping, with the auxiliary pump, the lubricant from the one or more tanks to the one or more rotating components through the auxiliary lubricant supply line.

The method of any preceding clause, further comprising one or more valves in fluid communication with the primary lubricant supply line and the auxiliary lubricant supply line.

The method of the preceding clause, the one or more valves including a first valve, the method further comprising opening the first valve to allow the lubricant to flow from the primary lubrication system to the one or more rotating components, and closing the first valve to prevent the lubricant from flowing from the primary lubrication system to the one or more rotating components.

The method of the preceding clause, the one or more valves including a second valve, the method further comprising opening the second valve to allow the lubricant to flow from the auxiliary lubrication system to the one or more rotating components, and closing the second valve to prevent the lubricant from flowing from the auxiliary lubrication system to the one or more rotating components.

The method of any preceding clause, the auxiliary pump including a pump shaft that is coupled to the fan shaft, the method further comprising causing the pump shaft to rotate such that the auxiliary pump pumps the lubricant when the fan shaft rotates.

The method of any preceding clause, the fan shaft including a fan shaft gear, and the pump shaft including a pump shaft gear that is intermeshed with the fan shaft gear.

The method of any preceding clause, the auxiliary pump being a bi-directional pump that pumps the lubricant to the one or more rotating components when the fan shaft rotates in a first rotational direction and when the fan shaft rotates in a second rotational direction that is opposite the first rotational direction.

The method of any preceding clause, further comprising engaging the pump shaft with a clutch to operate the auxiliary pump, and disengaging the pump shaft to prevent operation of the auxiliary pump.

The method of any preceding clause, further comprising disengaging the pump shaft with the clutch when the pressure of the lubricant in the primary lubrication system is greater than the primary pressure threshold.

The method of any preceding clause, further comprising engaging the pump shaft with the clutch when the pressure of the lubricant in the primary lubrication system is less than the primary pressure threshold.

The method of any preceding clause, the auxiliary lubrication system further comprising a lubricant pressure signal line that is in fluid communication with the primary lubrication system and the clutch, the method further comprising causing the clutch to engage or to disengage the pump shaft based on the pressure of the lubricant in the primary lubrication system from the lubricant pressure signal line.

The method of any preceding clause, the clutch being coupled to a lubricant pressure switch, the method further comprising causing, with the lubricant pressure switch, the clutch to engage or to disengage the pump shaft based on the pressure of the lubricant in the primary lubrication system.

The method of any preceding clause, further comprising closing the lubricant pressure switch to cause the clutch to disengage the pump shaft when the pressure of the lubricant in the primary lubrication system is greater than the primary pressure threshold.

The method of any preceding clause, further comprising opening the lubricant pressure switch to cause the clutch to engage the pump shaft when the pressure of the lubricant in the primary lubrication system is less than the primary pressure threshold.

The method of any preceding clause, the auxiliary lubrication system further comprising a power supply in communication with the clutch, the method further comprising supplying, with the power supply, power to the clutch to engage or to disengage the pump shaft.

The method of any preceding clause, further comprising disengaging the pump shaft with the clutch when the power supply supplies power to the clutch.

The method of any preceding clause, further comprising engaging the pump shaft with the clutch when the power supply does not provide power to the clutch.

The method of any preceding clause, further comprising controlling the clutch with a controller to engage or to disengage the pump shaft.

The method of any preceding clause, further comprising sensing the pressure of the lubricant in the primary lubrication system with one or more pressure sensors.

The method of any preceding clause, further comprising sending the sensed pressure of the lubricant in the primary lubrication system from the one or more pressure sensors to the controller.

The method of any preceding clause, further comprising controlling, with the controller, the clutch to disengage the pump shaft when the pressure of the lubricant in the primary lubrication system is greater than the primary pressure threshold.

The method of any preceding clause, further comprising controlling, with the controller, the clutch to engage the pump shaft when the pressure of the lubricant in the primary lubrication system is less than the primary pressure threshold.

The method of any preceding clause, further comprising controlling, with the controller, the lubricant pressure switch to open or to close based on the pressure of the lubricant in the primary lubrication system.

The method of any preceding clause, further comprising powering the primary pump with a motor.

The method of any preceding clause, the motor being a hydraulic motor that is in fluid communication with the auxiliary pump through the auxiliary lubricant line, the method further comprising pumping, with the auxiliary pump, the lubricant to the motor through the auxiliary lubricant line to power the motor, thereby causing the primary pump to pump the lubricant from the one or more tanks to the one or more rotating components.

The method of any preceding clause, further comprising causing, with a control signal switch, the clutch to engage or to disengage based on a control signal from the controller.

The method of any preceding clause, further comprising causing the clutch to disengage the pump shaft when the control signal switch receives a control signal from the controller.

The method of any preceding clause, further comprising causing the clutch to engage the pump shaft when the control signal switch does not receive the control signal from the controller.

The method of any preceding clause, the clutch being a centrifugal clutch, the method further comprising engaging or disengaging the pump shaft with the clutch based on a rotational speed of the fan.

The method of any preceding clause, further comprising disengaging the pump shaft with the clutch when the rotational speed of the fan is greater than a fan speed threshold.

The method of any preceding clause, further comprising engaging the pump shaft with the clutch when the rotational speed of the fan is less than the fan speed threshold.

The method of any preceding clause, the auxiliary pump being a uni-directional pump that pumps the lubricant to the one or more rotating components based on a single rotational direction of the pump shaft.

The method of any preceding clause, the clutch being a first clutch, the lubrication system further comprising a second clutch and a third clutch, the second clutch and the third clutch being one-way clutches that rotate in opposite directions.

The method of any preceding clause, the third clutch being coupled to a reversing gear that reverses a rotational direction of the third clutch to the rotational direction of the pump shaft.

The method of any preceding clause, the second clutch and the third clutch being sprag clutches.

The method of any preceding clause, the one or more rotating components including one or more first rotating components and one or more second rotating components, the method further comprising supplying the lubricant to the one or more first rotating components with the primary lubrication system, and supplying the lubricant to the one or more second rotating components with the auxiliary lubrication system.

The method of any preceding clause, the auxiliary lubrication system comprising a pressure regulator, the method further comprising directing, with the pressure regulator, at least a portion of the lubricant to the one or more tanks to bypass the one or more second rotating components during normal operation of the turbine engine.

The method of any preceding clause, further comprising directing, with the pressure regulator, substantially all of the lubricant in the auxiliary lubrication system to the one or more rotating components when the pressure of the lubricant in the primary lubrication system is less than the primary pressure threshold.

The method of any preceding clause, the one or more first rotating components being one or more engine bearings.

The method of any preceding clause, the one or more second rotating components being one or more gearbox bearings.

The method of any preceding clause, the auxiliary pump being a bi-directional pump.

The method of the preceding clause, the bi-directional pump including a first hollow interior and a second hollow interior, and a first piston within the first hollow interior and a second piston within the second hollow interior.

The method of the preceding clause, the first piston and the second piston being coupled to the pump shaft such that rotation of the pump shaft causes the first piston and the second piston to move up or to move down.

The method of any preceding clause, the bi-directional pump including an input flowpath having a first inlet in fluid communication with the first hollow interior and a second inlet in fluid communication with the second hollow interior.

The method of any preceding clause, the bi-directional pump including an output flowpath having a first outlet in fluid communication with the first hollow interior and a second outlet in fluid communication with the second hollow interior.

The method of any preceding clause, the bi-directional pump including a plurality of pump valves including a first valve in fluid communication with the first inlet, a second valve in fluid communication with the first outlet, a third valve in fluid communication with the second inlet, and a fourth valve in fluid communication with the second outlet.

The method of any preceding clause, further comprising opening the first valve to allow the lubricant to flow into the first hollow interior through the first inlet when the first piston moves down.

The method of any preceding clause, further comprising opening the second valve to allow the lubricant to flow into the outlet flowpath and out of the first hollow interior through the first outlet when the first piston moves up.

The method of any preceding clause, further comprising opening the third valve to allow the lubricant to flow into the second hollow interior through the second inlet when the second piston moves down.

The method of any preceding clause, further comprising opening the fourth valve to allow the lubricant to flow into the outlet flowpath and out of the second hollow interior through the second outlet when the second piston moves up.

The method of any preceding clause, the bi-directional pump including a hollow interior and a plurality of gears disposed within the hollow interior.

The method of any preceding clause, the bi-directional pump including a first inlet and a first outlet disposed at a first axial side of the hollow interior.

The method of any preceding clause, the bi-directional pump including a second inlet and a second outlet disposed at a second axial side of the hollow interior.

The method of any preceding clause, the bi-directional pump including a plurality of pump valves including a first pump valve in fluid communication with the first inlet, a second pump valve in fluid communication with the second inlet, a third pump valve in fluid communication with the first outlet, and a fourth pump valve in fluid communication with the second outlet.

The method of the preceding clause, further comprising opening the first pump valve and the fourth pump valve and closing the second pump valve and the third pump valve to allow the lubricant to flow from the input flowpath to the outlet flowpath through the first inlet and the second outlet when the fan rotates in a first rotational direction.

The method of any preceding clause, further comprising opening the second pump valve and the third pump valve and closing the first pump valve and the fourth pump valve to allow the lubricant to flow from the input flowpath to the outlet flowpath through the second inlet and the first outlet when the fan rotates in a second rotational direction.

A lubrication system for a gearbox assembly for a turbine engine, the gearbox assembly having a gear assembly including one or more gears and one or more bearings, the lubrication system comprising a sump in fluid communication with the gearbox assembly, the sump being a primary reservoir having a first lubricant level, and a secondary reservoir in the gearbox assembly, the secondary reservoir having a second lubricant level that is greater than the first lubricant level, the lubrication system filling the secondary reservoir with lubricant between the first lubricant level and the second lubricant level such that the one or more gears collects the lubricant in the secondary reservoir to supply the lubricant from the secondary reservoir to the one or more gears or to the one or more bearings.

The lubrication system of the preceding clause, the one or more gears including a first gear, one or more second gears, and a third gear.

The lubrication system of the preceding clause, the first gear being a sun gear, the one or more second gears being planet gears, and the third gear being a ring gear.

The lubrication system of any preceding clause, the gear assembly being an epicyclic gear assembly.

The lubrication system of any preceding clause, the gear assembly coupled to a fan.

The lubrication system of any preceding clause, the lubrication system filling the secondary reservoir with the lubricant during a shutdown of the turbine engine.

The lubrication system of any preceding clause, the one or more bearings being journal bearings.

The lubrication system of any preceding clause, the first gear being coupled to an input shaft of the turbine engine.

The lubrication system of any preceding clause, the one or more second gears being secured by a planet carrier.

The lubrication system of any preceding clause, the planet carrier being coupled to an output shaft of the turbine engine.

The lubrication system of any preceding clause, the third gear being coupled to an output shaft of the turbine engine.

The lubrication system of any preceding clause, the input shaft being a low-pressure shaft of the turbine engine.

The lubrication system of any preceding clause, the output shaft being a fan shaft of the fan.

The lubrication system of any preceding clause, the sump being positioned at approximately a six o'clock position of the gearbox assembly.

The lubrication system of any preceding clause, further comprising a tank that stores the lubricant therein, a lubricant pump, and a lubricant supply line in fluid communication with the tank and the gearbox assembly.

The lubrication system of any preceding clause, the lubricant pump pumping the lubricant from the tank to the gearbox assembly through the lubricant supply line during operation of the turbine engine.

The lubrication system of any preceding clause, the lubricant draining from the gear assembly to fill the sump and the secondary reservoir.

The lubrication system of any preceding clause, the sump including a sump line in fluid communication with the sump and the tank, and the lubricant draining from the sump to the tank through the sump line.

The lubrication system of any preceding clause, further comprising a sump pump in fluid communication with the sump and the sump line, the sump pump pumping the lubricant or air from the sump and through the sump line to the tank.

The lubrication system of any preceding clause, the sump line including a plurality of drain ports in fluid communication with the sump line and with the gearbox assembly, the lubricant draining through the plurality of drain ports into the sump line.

The lubrication system of any preceding clause, the plurality of drain ports including a first drain port in fluid communication with the sump and a second drain port in fluid communication with the secondary reservoir.

The lubrication system of any preceding clause, the first drain port being positioned at approximately the six o'clock position of the gearbox assembly.

The lubrication system of any preceding clause, the first drain port being positioned at a bottom of the gearbox assembly.

The lubrication system of any preceding clause, the second drain port being positioned radially above the first drain port and in fluid communication with the secondary reservoir.

The lubrication system of any preceding clause, the second drain port being positioned at approximately the second lubricant level such that the lubricant drains through the second drain port at the second lubricant level.

The lubrication system of any preceding clause, the second drain port being positioned between a three o'clock position and a four o'clock position of the gearbox assembly.

The lubrication system of any preceding clause, further comprising one or more drain valves within the sump line, the one or more drain valves opening to allow the lubricant to drain through the sump line and closing to prevent the lubricant from draining through the sump line.

The lubrication system of the preceding clause, the one or more drain valves opening or closing based on at least one of a pressure of the lubricant in the lubrication system, a pressure of fuel in the turbine engine, or a pressure of hydraulics in the turbine engine.

The lubrication system of any preceding clause, the one or more drain valves opening to allow the lubricant to drain through the sump line when the at least one of the pressure of the lubricant in the lubrication system, the pressure of the fuel in the turbine engine, or the pressure of the hydraulics in the turbine engine is greater than a pressure threshold.

The lubrication system of any preceding clause, the one or more drain valves closing to prevent the lubricant from draining through the sump line when the at least one of the pressure of the lubricant in the lubrication system, the pressure of the fuel in the turbine engine, or the pressure of the hydraulics in the turbine engine is less than the pressure threshold.

The lubrication system of any preceding clause, further comprising a controller that controls the one or more drain valves to open and to close.

The lubrication system of any preceding clause, the lubrication system supplying the lubricant to the gearbox assembly through the lubricant supply line during operation of the turbine engine.

The lubrication system of any preceding clause, the lubrication system filling the secondary reservoir at a shutdown of the turbine engine.

The lubrication system of any preceding clause, the one or more drain valves closing to prevent the lubricant from draining through the sump line to fill the secondary reservoir.

The lubrication system of any preceding clause, the lubrication system supplying the lubricant to the one or more gears or to the one or more bearings during windmilling of the fan.

The lubrication system of any preceding clause, the one or more drain valves opening when the controller is powered on.

The lubrication system of any preceding clause, the controller powering on when a speed of a turbo-engine of the turbine engine is 5% to 10% of a maximum speed of the turbo-engine.

The lubrication system of any preceding clause, the one or more drain valves closing when the controller powers off.

The lubrication system of any preceding clause, the controller powering off when the speed of the turbo-engine is less than 5% of the maximum speed of the turbo-engine.

The lubrication system of any preceding clause, the first lubricant level of the sump being below the gears of the gear assembly such that the gears are prevented from contacting the lubricant in the sump during operation of the turbine engine.

The lubrication system of any preceding clause, the second lubricant level of the secondary reservoir being at least at one of the one or more gears such that the at least one of the one or more gears contacts the lubricant in the secondary reservoir.

The lubrication system of any preceding clause, the plurality of drain ports including a third drain port and a fourth drain port in fluid communication with the gearbox assembly and the sump line.

The lubrication system of any preceding clause, the third drain port being positioned on a first circumferential side of the first drain port, and the fourth drain port being positioned on a second circumferential side of the first drain port.

The lubrication system of any preceding clause, the fourth drain port being positioned between the first drain port and the second drain port.

The lubrication system of any preceding clause, the third drain port being positioned between the six o'clock positioned and a nine o'clock position of the gearbox assembly.

The lubrication system of any preceding clause, the fourth drain port being positioned between the six o'clock position and the three o'clock position.

The lubrication system of any preceding clause, the lubricant draining through the first drain port when the gearbox assembly is at a first rotational position.

The lubrication system of any preceding clause, the lubricant draining through the third drain port when the gearbox assembly is at a second rotational position.

The lubrication system of any preceding clause, the lubricant draining through the fourth drain port when the gearbox assembly is at a third rotational position.

The lubrication system of any preceding clause, each of the plurality of drain ports including a drain valve of the one or more drain valves for allowing the lubricant to drain through each of the plurality of drain ports when the drain valve is open and preventing the lubricant from draining through each of the plurality of drain ports when the drain valve is closed.

The lubrication system of any preceding clause, the first drain port being a strut drain.

The lubrication system of any preceding clause, further comprising a scavenge gutter that drains the lubricant that sprays off of the gears of the gear assembly.

A turbine engine comprising a fan and a turbo-engine, a gearbox assembly, and a lubrication system. The fan being coupled to the turbo-engine through the gearbox assembly. The gearbox assembly including one or more gears and one or more bearings. The lubrication system being the lubrication system of any preceding clause.

A method of operating the lubrication system of any preceding clause, the method comprising filling the secondary reservoir with the lubricant between the first lubricant level and the second lubricant level, collecting the lubricant in the secondary reservoir with the one or more gears, and supplying the lubricant from the secondary reservoir to the one or more gears or to the one or more bearings with the lubricant collected by the one or more gears.

The method of the preceding clause, further comprising filling the secondary reservoir with the lubricant during a shutdown of the turbine engine.

The method of any preceding clause, the lubrication system further comprising a tank that stores the lubricant therein, a lubricant pump, and a lubricant supply line in fluid communication with the tank and the gearbox assembly, the method further comprising pumping the lubricant from the tank to the gearbox assembly through the lubricant supply line during operation of the turbine engine.

The method of any preceding clause, further comprising draining the lubricant from the gear assembly to fill the sump and the secondary reservoir.

The method of any preceding clause, the sump including a sump line in fluid communication with the sump and the tank, the method further comprising draining the lubricant from the sump to the tank through the sump line.

The method of any preceding clause, the lubrication system further comprising a sump pump in fluid communication with the sump and the sump line, the method further comprising pumping, with the sump pump, the lubricant or air from the sump through the sump line to the tank.

The method of any preceding clause, the sump line including a plurality of drain ports in fluid communication with the sump line and with the gearbox assembly, the method further comprising draining the lubricant through the plurality of drain ports into the sump line.

The method of any preceding clause, the plurality of drain ports including a first drain port in fluid communication with the sump and a second drain port in fluid communication with the secondary reservoir.

The method of any preceding clause, the lubrication system further comprising one or more drain valves within the sump line, the method further comprising opening the one or more drain valves to allow the lubricant to drain through the sump line, and closing the one or more drain valves to prevent the lubricant from draining through the sump line.

The method of any preceding clause, further comprising opening and closing the one or more drain valves based on at least one of a pressure of the lubricant in the lubrication system, a pressure of fuel in the turbine engine, or a pressure of hydraulics in the turbine engine.

The method of any preceding clause, further comprising opening the one or more drain valves to allow the lubricant to drain through the sump line when the at least one of the pressure of the lubricant in the lubrication system, the pressure of the fuel in the turbine engine, or the pressure of the hydraulics in the turbine engine is greater than a pressure threshold.

The method of any preceding clause, further comprising closing the one or more drain valves to prevent the lubricant from draining through the sump line when the at least one of the pressure of the lubricant in the lubrication system, the pressure of the fuel in the turbine engine, or the pressure of the hydraulics in the turbine engine is less than the pressure threshold.

The method of any preceding clause, further comprising controlling, with a controller, the one or more drain valves to open and to close the one or more drain valves.

The method of any preceding clause, further comprising supplying the lubricant to the gearbox assembly through the lubricant supply line during operation of the turbine engine.

The method of any preceding clause, further comprising filling the secondary reservoir at a shutdown of the turbine engine.

The method of any preceding clause, further comprising closing the one or more drain valves to prevent the lubricant from draining through the sump line to fill the secondary reservoir.

The method of any preceding clause, further comprising supplying the lubricant to the one or more gears or to the one or more bearings during windmilling of the fan.

The method of any preceding clause, further comprising opening when the controller is powered on.

The method of any preceding clause, further comprising powering the controller on when a speed of a turbo-engine of the turbine engine is 5% to 10% of a maximum speed of the turbo-engine.

The method of any preceding clause, further comprising closing the one or more drain valves when the controller powers off.

The method of any preceding clause, further comprising powering off the controller when the speed of the turbo-engine is less than 5% of the maximum speed of the turbo-engine.

The method of any preceding clause, the first lubricant level of the sump being below the gears of the gear assembly such that the gears are prevented from contacting the lubricant in the sump during operation of the turbine engine.

The method of any preceding clause, the second lubricant level of the secondary reservoir being at least at one of the one or more gears such that the at least one of the one or more gears contacts the lubricant in the secondary reservoir.

The method of any preceding clause, the plurality of drain ports including a third drain port and a fourth drain port in fluid communication with the gearbox assembly and the sump line.

The method of any preceding clause, further comprising draining the lubricant through the first drain port when the gearbox assembly is at a first rotational position.

The method of any preceding clause, further comprising draining the lubricant through the third drain port when the gearbox assembly is at a second rotational position.

The method of any preceding clause, further comprising draining the lubricant through the fourth drain port when the gearbox assembly is at a third rotational position.

The method of any preceding clause, each of the plurality of drain ports including a drain valve of the one or more drain valves for allowing the lubricant to drain through each of the plurality of drain ports when the drain valve is open and preventing the lubricant from draining through each of the plurality of drain ports when the drain valve is closed.

The method of any preceding clause, further comprising draining the lubricant that sprays off of the gears of the gear assembly through a scavenge gutter.

A method of operating a lubrication system for a turbine engine having a fan and one or more rotating components, the lubrication system including a primary lubrication system and an auxiliary lubrication system, the method comprising supplying lubricant to the one or more rotating components from the primary lubrication system during a normal operation of the turbine engine, determining whether a lubricant flow of the lubricant in the primary lubrication system is less than a lubricant flow threshold, activating the auxiliary lubrication system to supply the lubricant to the one or more rotating components from the auxiliary lubrication system, and powering the auxiliary lubrication system by rotation of the fan.

The method of the preceding clause, the lubrication system being the lubrication system of any preceding clause.

The method of any preceding clause, the method being the method of any preceding clause.

The method of any preceding clause, the turbine engine being the turbine engine of any preceding clause.

The method of any preceding clause, further comprising determining the lubricant flow in the primary lubrication system.

The method of any preceding clause, determining the lubricant flow including determining a pressure of the lubricant in the primary lubrication system.

The method of any preceding clause, the lubrication system further comprising a pressure signal line, and determining the pressure of the lubricant in the primary lubrication system including receiving an indication of the pressure of the lubricant in the primary lubrication system from the pressure signal line.

The method of any preceding clause, the lubrication system further comprising one or more pressure sensors, and determining the pressure of the lubricant in the primary lubrication system including receiving an indication of the pressure of the lubricant in the primary lubrication system from the one or more pressure sensors.

The method of any preceding clause, determining whether the lubricant flow of the lubricant in the primary lubrication system is less than the lubricant flow threshold including determining whether the pressure of the lubricant in the primary lubrication system is less than a primary pressure threshold.

The method of any preceding clause, determining the lubricant flow including determining a pressure of fuel in the turbine engine.

The method of any preceding clause, determining whether the lubricant flow of the lubricant in the primary lubrication system is less than the lubricant flow threshold including determining whether the pressure of the fuel in the turbine engine is less than a fuel pressure threshold.

The method of any preceding clause, the turbine engine further including a turbo-engine, and determining the lubricant flow including determining a rotational speed of the turbo-engine.

The method of any preceding clause, determining whether the lubricant flow of the lubricant in the primary lubrication system is less than the lubricant flow threshold including determining whether the rotational speed of the turbo-engine is less than a turbo-engine rotational speed threshold.

The method of any preceding clause, further comprising supplying the lubricant to the one or more rotating components from the primary lubrication system if the lubricant flow is greater than or equal to the lubricant flow threshold.

The method of any preceding clause, activating the auxiliary lubrication system including supplying the lubricant through the auxiliary lubrication system to the one or more rotating components.

The method of any preceding clause, the auxiliary lubrication system comprising an auxiliary pump that is drivingly coupled to the fan, and activating the auxiliary lubrication system including powering the auxiliary pump to pump the lubricant to the one or more rotating components from the auxiliary lubrication system.

The method of any preceding clause, the auxiliary lubrication system comprising a clutch that engages or disengages the auxiliary pump, and activating the auxiliary lubrication system including engaging the clutch to power the auxiliary pump by rotation of the fan.

The method of any preceding clause, the auxiliary lubrication system comprising one or more drain valves and a secondary reservoir, and activating the auxiliary lubrication system including closing the one or more drain valves to fill the secondary reservoir with the lubricant.

The method of any preceding clause, the turbine engine further comprising a controller, and activating the auxiliary lubrication system including controlling the auxiliary lubrication system with the controller to activate the auxiliary lubrication system.

The method of any preceding clause, activating the auxiliary lubrication system including passively controlling the auxiliary lubrication system based on the lubricant flow to activate the auxiliary lubrication system.

The method of any preceding clause, further comprising inactivating the auxiliary lubrication system if the lubricant flow is greater than or equal to the lubricant flow threshold.

The method of any preceding clause, powering the auxiliary lubrication system by rotation of the fan including powering the auxiliary lubrication system in a first rotational direction of the fan, and powering the auxiliary lubrication system in a second rotational direction of the fan.

The method of the preceding clause, the second rotational direction being opposite the first rotational direction.

A method of operating a lubrication system for a turbine engine having a fan and one or more rotating components, the lubrication system including a primary lubrication system and an auxiliary lubrication system, the method comprising supplying lubricant to the one or more rotating components from the primary lubrication system during a normal operation of the turbine engine, determining whether at least one of a fuel pressure in the turbine engine is less than a fuel pressure threshold or a hydraulic pressure in the turbine engine is less than a hydraulic pressure threshold, and activating the auxiliary lubrication system to supply the lubricant to the one or more rotating components from the auxiliary lubrication system when the at least one of the fuel pressure in the turbine engine is less than the fuel pressure threshold or the hydraulic pressure in the turbine engine is less than the hydraulic pressure threshold.

The method of the preceding clause, further comprising supplying the lubricant to the one or more rotating components from the primary lubrication system if the fuel pressure is greater than or equal to the fuel pressure threshold and the hydraulic pressure is greater than or equal to the hydraulic pressure threshold.

The method of any preceding clause, activating the auxiliary lubrication system includes supplying the lubricant through the auxiliary lubrication system to the one or more rotating components.

The method of any preceding clause, the auxiliary lubrication system comprising one or more drain valves and a secondary reservoir, and activating the auxiliary lubrication system including closing the one or more drain valves to fill the secondary reservoir with the lubricant.

The method of any preceding clause, the turbine engine further comprising a controller, and activating the auxiliary lubrication system including controlling the auxiliary lubrication system with the controller to activate the auxiliary lubrication system.

The method of any preceding clause, activating the auxiliary lubrication system including passively controlling the auxiliary lubrication system based on the fuel pressure or the hydraulic pressure to activate the auxiliary lubrication system.

The method of any preceding clause, further comprising inactivating the auxiliary lubrication system if the fuel pressure is greater than or equal to the fuel pressure threshold and the hydraulic pressure is greater than or equal to the hydraulic pressure threshold.

The method of any preceding clause, further comprising powering the auxiliary lubrication system by rotation of the fan.

The method of any preceding clause, the turbine engine further including a turbo-engine, and the method further comprising determining a rotational speed of the turbo-engine.

The method of any preceding clause, further comprising determining whether the rotational speed of the turbo-engine is less than a turbo-engine rotational speed threshold, and activating the auxiliary lubrication system to supply the lubricant to the one or more rotating components from the auxiliary lubrication system when the rotational speed of the turbo-engine is less than the turbo-engine rotational speed threshold.

The method of any preceding clause, the auxiliary lubrication system comprising an auxiliary pump that is drivingly coupled to the fan, and activating the auxiliary lubrication system including powering the auxiliary pump to pump the lubricant to the one or more rotating components from the auxiliary lubrication system.

The method of any preceding clause, the auxiliary lubrication system comprising a clutch that engages or disengages the auxiliary pump, and activating the auxiliary lubrication system including engaging the clutch to power the auxiliary pump by rotation of the fan.

The method of any preceding clause, powering the auxiliary lubrication system by rotation of the fan including powering the auxiliary lubrication system in a first rotational direction of the fan, and powering the auxiliary lubrication system in a second rotational direction of the fan.

The method of any preceding clause, the second rotational direction being opposite the first rotational direction.

The method of any preceding clause, further comprising shutting down the turbine engine, and activating the auxiliary lubrication system to supply the lubricant to the one or more rotating components from the auxiliary lubrication system when the turbine engine is shut down.

The method of any preceding clause, further comprising determining a lubricant flow in the primary lubrication system based on at least one of the fuel pressure or the hydraulic pressure.

The method of any preceding clause, further comprising determining the lubricant flow based on a lubricant pressure of the lubricant in the primary lubrication system.

The method of any preceding clause, the lubrication system further comprising a pressure signal line, and determining the lubricant pressure of the lubricant in the primary lubrication system including receiving an indication of the lubricant pressure of the lubricant in the primary lubrication system from the pressure signal line.

The method of any preceding clause, the turbine engine further comprising one or more pressure sensors, and determining the at least one of the lubricant pressure of the lubricant in the primary lubrication system, the fuel pressure in the turbine engine, or the hydraulic pressure in the turbine engine including receiving an indication of the lubricant pressure, the fuel pressure, or the hydraulic pressure from the one or more pressure sensors.

The method of any preceding clause, further comprising determining whether the lubricant pressure of the lubricant in the primary lubrication system is less than a primary pressure threshold, and activating the auxiliary lubrication system to supply the lubricant to the one or more rotating components from the auxiliary lubrication system when the lubricant pressure of the lubricant in the primary lubrication system is less than the primary pressure threshold.

A lubrication system for a turbine engine having a fan and one or more rotating components. The lubrication system comprises a primary lubrication system that supplies lubricant to the one or more rotating components during normal operation of the turbine engine, and an auxiliary lubrication system that is activated to supply the lubricant to the one or more rotating components when at least one of a fuel pressure in the turbine engine is less than a fuel pressure threshold or a hydraulic pressure in the turbine engine is less than a hydraulic pressure threshold.

The lubrication system of the preceding clause, the primary lubrication system supplying the lubricant to the one or more rotating components if the fuel pressure is greater than or equal to the fuel pressure threshold and the hydraulic pressure is greater than or equal to the hydraulic pressure threshold.

The lubrication system of any preceding clause, activating the auxiliary lubrication system includes supplying the lubricant through the auxiliary lubrication system to the one or more rotating components.

The lubrication system of any preceding clause, the auxiliary lubrication system comprising one or more drain valves and a secondary reservoir, and activating the auxiliary lubrication system including the one or more drain valves closing to fill the secondary reservoir with the lubricant.

The lubrication system of any preceding clause, the turbine engine further comprising a controller, and activating the auxiliary lubrication system including controlling the auxiliary lubrication system with the controller to activate the auxiliary lubrication system.

The lubrication system of any preceding clause, activating the auxiliary lubrication system including passively controlling the auxiliary lubrication system based on the fuel pressure or the hydraulic pressure to activate the auxiliary lubrication system.

The lubrication system of any preceding clause, the auxiliary lubrication system inactivating if the fuel pressure is greater than or equal to the fuel pressure threshold and the hydraulic pressure is greater than or equal to the hydraulic pressure threshold.

The lubrication system of any preceding clause, the auxiliary lubrication system being powered by rotation of the fan.

The lubrication system of any preceding clause, the turbine engine further including a turbo-engine.

The lubrication system of any preceding clause, the auxiliary lubrication system activating to supply the lubricant to the one or more rotating components when the rotational speed of the turbo-engine is less than a turbo-engine rotational speed threshold.

The lubrication system of any preceding clause, the auxiliary lubrication system comprising an auxiliary pump that is drivingly coupled to the fan, and the auxiliary pump pumps the lubricant to the one or more rotating components from the auxiliary lubrication system when the auxiliary lubrication system is activated.

The lubrication system of any preceding clause, the auxiliary lubrication system comprising a clutch that engages or disengages the auxiliary pump, and the auxiliary lubrication system is activated by engaging the clutch to power the auxiliary pump by rotation of the fan.

The lubrication system of any preceding clause, the auxiliary lubrication system is powered in a first rotational direction of the fan, and in a second rotational direction of the fan.

The lubrication system of any preceding clause, the second rotational direction being opposite the first rotational direction.

The lubrication system of any preceding clause, the auxiliary lubrication system is activated to supply the lubricant to the one or more rotating components from the auxiliary lubrication system when the turbine engine is shut down.

The lubrication system of any preceding clause, the lubrication system further comprising a pressure signal line that provides an indication of a lubricant pressure of the lubricant in the primary lubrication system.

The lubrication system of any preceding clause, the turbine engine further comprising one or more pressure sensors that provide an indication of at least one of the lubricant pressure of the lubricant in the primary lubrication system, the fuel pressure in the turbine engine, or the hydraulic pressure in the turbine engine.

The lubrication system of any preceding clause, the auxiliary lubrication system activating to supply the lubricant to the one or more rotating components from the auxiliary lubrication system when the lubricant pressure of the lubricant in the primary lubrication system is less than a primary pressure threshold.

A turbine engine comprising a fan and a turbo-engine, and the lubrication system of any preceding clause. The fan is coupled to the turbo-engine. The turbine engine comprises one or more rotating components.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A method of operating a lubrication system for a turbine engine that includes a fan, a hydraulic system containing a hydraulic fluid, a fuel system containing a fuel, and one or more rotating components that receive a lubricant from the lubrication system, the lubrication system including one or more tanks that store the lubricant, a primary lubrication system, and an auxiliary lubrication system, and the hydraulic system including one or more hydraulic fluid reservoirs containing the hydraulic fluid and one or more hydraulic lines to supply the hydraulic fluid to one or more hydraulic control systems, the method comprising:

supplying the lubricant from the one or more tanks to the one or more rotating components via the primary lubrication system during a normal operation of the turbine engine;

detecting at least one of a fuel pressure of the fuel in the fuel system or a hydraulic pressure of the hydraulic fluid being supplied from the one or more hydraulic fluid reservoirs through the one or more hydraulic lines to the one or more hydraulic control systems;

determining whether the at least one of the fuel pressure is less than a fuel pressure threshold or the hydraulic pressure is less than a hydraulic pressure threshold; and activating the auxiliary lubrication system to supply the lubricant to the one or more rotating components from the auxiliary lubrication system when the at least one of the fuel pressure is less than the fuel pressure threshold or the hydraulic pressure is less than the hydraulic pressure threshold.

2. The method of claim 1, further comprising supplying the lubricant to the one or more rotating components from the primary lubrication system if the fuel pressure is greater than or equal to the fuel pressure threshold and the hydraulic pressure is greater than or equal to the hydraulic pressure threshold.

3. The method of claim 1, wherein the auxiliary lubrication system comprises one or more drain valves and a secondary reservoir, and activating the auxiliary lubrication system includes closing the one or more drain valves to fill the secondary reservoir with the lubricant.

4. The method of claim 1, wherein the turbine engine further comprises a controller, and activating the auxiliary lubrication system includes controlling the auxiliary lubrication system with the controller to activate the auxiliary lubrication system.

5. The method of claim 1, wherein activating the auxiliary lubrication system includes passively controlling the auxiliary lubrication system based on the fuel pressure or the hydraulic pressure to activate the auxiliary lubrication system.

6. The method of claim 1, further comprising inactivating the auxiliary lubrication system if the fuel pressure is greater than or equal to the fuel pressure threshold and the hydraulic pressure is greater than or equal to the hydraulic pressure threshold.

7. The method of claim 1, further comprising shutting down the turbine engine, and activating the auxiliary lubrication system to supply the lubricant to the one or more rotating components from the auxiliary lubrication system when the turbine engine is shut down.

8. The method of claim 1, further comprising powering the auxiliary lubrication system by rotation of the fan.

9. The method of claim 1, wherein the turbine engine further includes a turbo-engine, and the method further comprises determining a rotational speed of the turbo-engine.

10. The method of claim 9, further comprising determining whether the rotational speed of the turbo-engine is less than a turbo-engine rotational speed threshold, and activating the auxiliary lubrication system to supply the lubricant to the one or more rotating components from the auxiliary lubrication system when the rotational speed of the turbo-engine is less than the turbo-engine rotational speed threshold.

11. The method of claim 1, wherein the auxiliary lubrication system comprises an auxiliary pump that is drivingly coupled to the fan, and activating the auxiliary lubrication system includes powering the auxiliary pump to pump the lubricant to the one or more rotating components from the auxiliary lubrication system.

12. The method of claim 11, wherein the auxiliary lubrication system comprises a clutch that engages or disengages the auxiliary pump, and activating the auxiliary lubrication system includes engaging the clutch to power the auxiliary pump by rotation of the fan.

13. The method of claim 1, wherein powering the auxiliary lubrication system by rotation of the fan includes powering the auxiliary lubrication system in a first rotational direction of the fan, and powering the auxiliary lubrication system in a second rotational direction of the fan.

14. The method of claim 13, wherein the second rotational direction is opposite the first rotational direction.

15. The method of claim 1, further comprising determining a lubricant flow in the primary lubrication system based on at least one of the fuel pressure or the hydraulic pressure.

16. The method of claim 15, further comprising determining the lubricant flow based on a lubricant pressure of the lubricant in the primary lubrication system.

17. The method of claim 16, wherein the lubrication system further comprises a pressure signal line, and determining the lubricant pressure of the lubricant in the primary lubrication system includes receiving an indication of the lubricant pressure of the lubricant in the primary lubrication system from the pressure signal line.

18. The method of claim 16, wherein the turbine engine further comprises one or more pressure sensors, and determining the at least one of the lubricant pressure of the lubricant in the primary lubrication system, the fuel pressure in the turbine engine, or the hydraulic pressure in the turbine engine includes receiving an indication of the lubricant pressure, the fuel pressure, or the hydraulic pressure from the one or more pressure sensors.

19. The method of claim 16, further comprising determining whether the lubricant pressure of the lubricant in the primary lubrication system is less than a primary pressure threshold, and activating the auxiliary lubrication system to supply the lubricant to the one or more rotating components from the auxiliary lubrication system when the lubricant pressure of the lubricant in the primary lubrication system is less than the primary pressure threshold.

20. A turbine engine for an aircraft, the turbine engine comprising:

a fan having a fan shaft, the fan generating compressed air during a normal operation of the turbine engine;

a hydraulic system including one or more hydraulic fluid reservoirs for storing a hydraulic fluid, one or more hydraulic lines in fluid communication with the one or more hydraulic fluid reservoirs, and one or more hydraulic control systems, the hydraulic system being configured to provide the hydraulic fluid from the one or more hydraulic fluid reservoirs to the one or more hydraulic control systems to actuate one or more components in the turbine engine;

a fuel system containing a fuel, the fuel system being configured to provide a flow of the fuel; and a lubrication system configured to provide a lubricant to one or more rotating components within the turbine engine, the lubrication system comprising:

one or more tanks to store the lubricant;

a primary lubrication system that supplies lubricant to the one or more rotating components from the one or more tanks during the normal operation of the turbine engine; and an auxiliary lubrication system comprising an auxiliary pump and a clutch, and the auxiliary pump being drivingly coupled to the fan shaft when the clutch is in an engaged state, wherein the clutch is in the engaged state when at least one of a detected fuel pressure of the fuel in the fuel system is less than a fuel pressure threshold or a detected hydraulic pressure of the hydraulic fluid in the hydraulic system is less than a hydraulic pressure threshold.

* * * * *